United States Patent
Mehta et al.

(10) Patent No.: US 10,698,960 B2
(45) Date of Patent: Jun. 30, 2020

(54) CONTENT VALIDATION AND CODING FOR SEARCH ENGINE OPTIMIZATION

(71) Applicant: MetaSense Digital Marketing Management Inc., West Berlin, NJ (US)

(72) Inventors: Jatin V. Mehta, Voorhees, NJ (US); Stephen Joslyn Myers, New Castle, DE (US)

(73) Assignee: MetaSense Digital Marketing Management Inc., West Berlin, NJ (US)

( * ) Notice: Subject to any disclaimer, the term of this patent is extended or adjusted under 35 U.S.C. 154(b) by 347 days.

(21) Appl. No.: 15/834,228

(22) Filed: Dec. 7, 2017

(65) Prior Publication Data
US 2018/0165364 A1    Jun. 14, 2018

Related U.S. Application Data

(60) Provisional application No. 62/431,449, filed on Dec. 8, 2016.

(51) Int. Cl.
| | | |
|---|---|---|
| G06F 17/00 | (2019.01) | |
| G06F 16/951 | (2019.01) | |
| G06F 9/54 | (2006.01) | |
| G06F 16/21 | (2019.01) | |

(Continued)

(52) U.S. Cl.
CPC ............ *G06F 16/951* (2019.01); *G06F 9/54* (2013.01); *G06F 16/212* (2019.01); *G06F 16/2365* (2019.01); *G06F 21/64* (2013.01)

(58) Field of Classification Search
None
See application file for complete search history.

(56) References Cited

U.S. PATENT DOCUMENTS

| | | |
|---|---|---|
| 6,604,099 B1 | 8/2003 | Chung et al. |
| 8,473,473 B2 | 6/2013 | Wang et al. |
| 8,554,635 B2 | 10/2013 | England et al. |

(Continued)

OTHER PUBLICATIONS

Vlad Merezhevich. HTML (self tutorial) pp. 6-7, 10-13, 16-17, 23, 34, 56, 76, 82-86, 89, 91.

*Primary Examiner* — Hung D Le
(74) *Attorney, Agent, or Firm* — Ashok Tankha

(57) ABSTRACT

A method and a content validation and coding system (CVCS) for validating and coding content of an electronic document for search engine optimization (SEO) are provided. The CVCS integrates with application programming interfaces (APIs) of search engines and/or media platforms. The CVCS creates a categorized repository of schema codes. The CVCS executes a web crawler for crawling and indexing an electronic document to be coded and content related thereto, from one or more search engines and/or media platforms via the APIs, and identifies structured data and content in the electronic document. The CVCS validates the identified content based on analytic criteria and determines optimal schema codes from the categorized repository and/or dynamically generated supplementary schema codes. The CVCS generates a structured data code map (SDCM) of the optimal schema codes and codes the validated content with the optimal schema codes within the identified structured data using the SDCM for SEO.

20 Claims, 33 Drawing Sheets

(51) Int. Cl.
    *G06F 16/23*     (2019.01)
    *G06F 21/64*     (2013.01)

(56) References Cited

U.S. PATENT DOCUMENTS

| | | | |
|---|---|---|---|
| 8,930,330 B1 * | 1/2015 | Arguelles | G06Q 10/10 |
| | | | 707/694 |
| 9,514,240 B2 | 12/2016 | Kamel et al. | |
| 9,817,801 B2 | 11/2017 | Nijjer et al. | |
| 10,073,919 B2 * | 9/2018 | Kirkby | G06F 16/958 |
| 2002/0161680 A1 * | 10/2002 | Tarnoff | G06F 21/6218 |
| | | | 705/35 |
| 2003/0041147 A1 * | 2/2003 | van den Oord | G06F 16/986 |
| | | | 709/227 |
| 2006/0075120 A1 * | 4/2006 | Smit | G06F 16/951 |
| | | | 709/227 |
| 2009/0094137 A1 | 4/2009 | Toppenberg et al. | |
| 2011/0072002 A1 * | 3/2011 | Kirkby | G06F 16/951 |
| | | | 707/711 |
| 2015/0058712 A1 | 2/2015 | Berk et al. | |
| 2016/0299981 A1 | 10/2016 | Lu et al. | |
| 2017/0103167 A1 * | 4/2017 | Shah | G06F 40/40 |
| 2018/0081976 A1 * | 3/2018 | Dejuan | G06Q 30/0623 |

\* cited by examiner

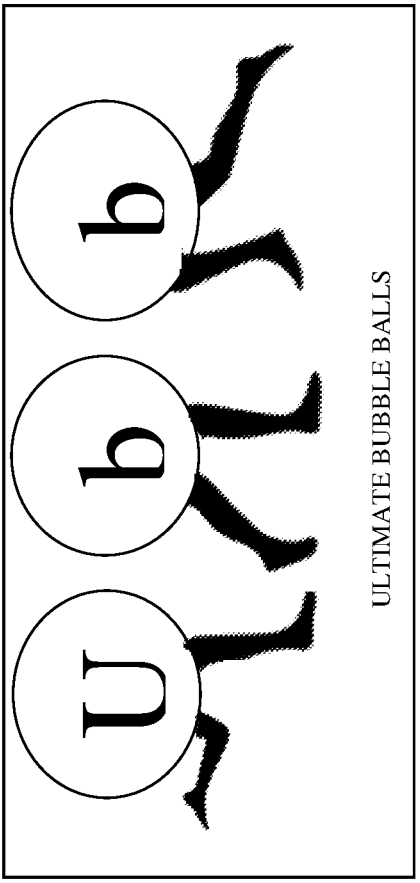

601

| +HOME | +ABOUT THE BUBBLES | +LET'S PLAY BALL | +SPECIAL EVENTS | +BUBBLE BALL IN ACTION | +WAIVERS |

+CONTACT US

ULTIMATE BUBBLE BALLS

THE ULTIMATE BUBBLE BALL SOCCER EXPERIENCE

Utah's own Ultimate Bubble balls is the focal point of the hottest new sporting and outdoor activity sweeping the globe – Bubble Ball Soccer now available right here in Salt Lake City!

That's right. Bubble Ball Soccer – which sometimes goes by names of Bumper Ball, Loopy Ball, Zorb or Body Zorbing – is the bounciest game of bumping and bopping ever created. Watch this video and see the fun in action.

GREATEST GAME EVER PLAYED – ZORB SOCCER WITH CHAMPION 4K

| | | |
|---|---|---|
| ← Service | | ALL (1) ▼ |
| Service | | 0 ERRORS  0 WARNINGS  ∧ |
| @type | | Service |
| serviceType | proprietary iMetadex TM coding and MetaSense SEO services | |
| name | | SEO and iMetadex TM improves rankings |
| description | | Get more traffic with an SEO Plan perfect for your business |
| provider | | |
| @type | | LocalBusiness |
| name | | MetaSense |
| image | | http://www.metasensemarketing.com/wp-content/uploads/2016/03/logo.png |
| telephone | | (866) 875-6382 |
| priceRange | | Depends |
| address | | |
| @type | | PostalAddress |
| name | | 403 Commerce Ln #5, West Berlin, NJ 08091, USA |
| areaServed | | |
| @type | | State |
| name | | New Jersey |
| name | | Philadelphia |
| name | | Delaware |

FIG. 9D

SEO ToolBox

SEO Report for http://www.metasensemarketing.com

SEO Report, Dec 04, 2017

1001

| 100/100 SEO SCORE | 1/1 PASSED CHECKS | 0/1 FAILED CHECKS | 0/1 WARNINGS |

ADVANCED SEO

Microdata Schema Test

✓ Congratulations! Your website is using HTML Microdata specifications in order to markup structured data.

→ Type: http://schema.org/Article
→ Properties:
   name: Home
   headline: Home
   mainEntityOfPage: Subitem
   url: http://www.metasensemarketing.com/
   image: Subitem
   author: http://www.metasensemarketing.com/author/metasensemarketing/
   description: Home
   datePublished: 2017-05-23 05:33:21
   dateModified: 2017-11-08 06:18:03
   publisher: Subitem

FIG. 10

CONTENT VALIDATION AND CODING FOR SEARCH ENGINE OPTIMIZATION

CROSS-REFERENCE TO RELATED APPLICATIONS

This application claims priority to and the benefit of the provisional patent application titled "Content Validation And Coding For Search Engine Optimization", application No. 62/431,449, filed in the United States Patent and Trademark Office on Dec. 8, 2016. The specification of the above referenced patent application is incorporated herein by reference in its entirety.

BACKGROUND

An online collaborative organization such as schema.org sponsored by Google Inc., Microsoft Corporation, Yahoo! Inc., and Yandex, Ltd., creates, maintains, and promotes schemas for structured data on the Internet and in electronic documents, for example, webpages, electronic mail (email) messages, etc. The schema.org vocabularies can be used with many different encodings, for example, the resource description framework in attributes (RDFa), microdata, and JavaScript object notation for linked data (JSON-LD). These vocabularies cover entities and relationships between entities and actions, and can be extended through a well-documented extension model. Multiple websites use schema.org to markup their webpages and email messages. Many applications, for example, from Google Inc., Microsoft Corporation, Pinterest, Inc., Yandex, Ltd., etc., use the schema.org vocabularies to power rich, extensible experiences. The schema.org vocabularies are developed by an open community process using the public-schemaorg@w3.org mailing list and through the GitHub® open source technology and software development platform of GitHub, Inc. A shared vocabulary of schemas allows webmasters and developers to decide on a schema. Each schema comprises multiple item properties. Google Inc. and schema.org collaboratively provide the schema vocabularies and schema markups to improve indexing of a website. While schema.org and structured data are supported by multiple search engines, for example, the Google® search engine to help websites get indexed in a more organized and efficient manner, multiple websites still do not use schema codes to markup website content. Moreover, there is a need to target schema codes that are most relevant to businesses and their websites.

Website management plugins, for example, WordPress® plugins of WordPress Foundation provide an automated process for website indexing. While conventional website management plugins extend functionality and support addition of new features to websites, these plugins lack sufficient functionality to focus on the schemas that help businesses and effectively alter coding of the websites. Since these plugins typically operate at the backend of a website, these plugins cannot demonstrate an improvement in the effectiveness of the coded website beyond a testing that displays the coded website being error free. Snippet use of conventional website management plugins is limited in scope and customization, and is ineffective in improving indexing. While approximately 15% of websites searched comprise schema markups, these websites use the schema codes for specific content such as recipes or movie reviews. While structured data of websites is open and available for use, the usage of the schema codes is either inadequate or there is no system that makes use of the schema codes. There is a need to focus the schema markup for websites to improve indexing of the websites.

Search engine optimization is a process of enhancing visibility of a website or a webpage in results provided by a web search engine to maximize the number of visitors viewing the website or the webpage. Search engine optimization ensures that the website has a high ranking and appears high on a list of search engine results. Survey responses by search engine optimization professionals provided the following weighting of thematic clusters of ranking factors. 19.15% of page-level link features, for example, page rank, trust rank, quantity of links that link, anchor text distribution, quality of link sources, etc.; 20.94% of domain-level link authority features, for example, quantity of links to a domain, trust and/or quality of the links to the domain, domain level page rank, etc.; 14.94% of page level and keyword and content features, for example, term frequency-inverse document frequency (TF*IDF), topic modeling scores on content, content quality and/or relevance, etc.; 9.8% of page-level, keyword-agnostic features, for example, content length, readability, uniqueness, load speed, etc.; 8.59% of domain level brand features, for example, offline usage of brand and/or domain name, mentions of brand and/or domain in news, media, and/or press, entity association, etc.; 8.06% of user, usage and traffic or query data, for example, traffic or usage signals from browsers, toolbars, and/or clickstream, quantity, diversity, and/or click through rate (CTR) of queries, etc.; 7.24% of social metrics, for example, quantity and/or quality of tweeted links, Facebook® shares of Facebook, Inc., Google®+1s, etc.; 6.98% of domain level keyword usage, for example, exact match keyword domains, partial keyword matches, etc.; and 5.21% of domain level, keyword agnostic features, for example, domain name length, top-level domain (TLD) extension, domain hypertext transfer protocol (HTTP) response time, etc. Backlinks associated with the page-level link features and the domain-level link authority features are a search engine optimization boost to a website. There is a need for a method and a system that harnesses structured data optimally to enhance search engine optimization of websites with respect to the above.

Schema.org provides a comprehensive list of specific categories that are used for developing schema codes for websites and indexing websites for enhancing their rankings, driving traffic, and increasing awareness in search engines. Schema.org provides a system for indexing multiple websites. Schema.org approved search engine optimization algorithms use snippets of content of a website and may ignore critical indicators related to a business that optimize the website. Digital marketing companies provide services at a high premium, and hence are often unaffordable. The approaches of these digital marketing companies are manual and complicated, making them user unfriendly and ineffective in improving traffic to the website.

Usefulness of search engines depends on the relevance of a search result listing displayed by the search engines. Conventional systems typically crawl website content from multiple platforms separately, thereby limiting the scope of the search and decreasing efficiency and relevance of the search results displayed on a search engine results page. Conventional systems do not crawl and analyze content related to a website, combined from multiple platforms.

Hence, there is a long felt need for a method and a system for validating and coding content of an electronic document, for example, a website, a webpage of a website, an electronic mail, etc., for search engine optimization. Moreover, there is a need for a method and a system for identifying and highlighting content of an electronic document for adding schema codes and for identifying and weighing the schema codes to add to the content of the electronic document. Furthermore, there is a need for a method and an automated system that focus and consider specific schema codes with related structured data tags and item properties of the schema codes to index a website to increase rankings of the website, drive traffic to the website, and increase awareness of the website in search engines. Furthermore, there is a need for analyzing errors in structured data of a website automatically and modifying the structured data for businesses. Furthermore, there is a need for a method and a system for bridging the gap between multiple platforms such as search engines and media platforms by combining the media platforms with the search engines to create a complete view of an indexing capability of a website. Furthermore, there is a need for crawling and analyzing content of the website in addition to content related to the website from all the search engines and media platforms combined, and searching for linked data of the website to increase the indexing capability of the website for search engine optimization.

SUMMARY OF THE INVENTION

This summary is provided to introduce a selection of concepts in a simplified form that are further disclosed in the detailed description of the invention. This summary is not intended to determine the scope of the claimed subject matter.

The method and the system disclosed herein address the above recited needs for validating and coding content of an electronic document, for example, a website, a webpage of a website, an electronic mail, etc., for search engine optimization. The method and the system disclosed herein also identify and highlight content of an electronic document for adding schema codes, and identify and weigh the schema codes to add to the content of the electronic document. The method and the automated system disclosed herein also focus and consider specific schema codes with related structured data tags and item properties of the schema codes to index a website to increase rankings of the website, drive traffic to the website, and increase awareness of the website in search engines. The method and the system disclosed herein analyze errors in structured data of a website automatically and modifying the structured data for businesses. The method and the system disclosed herein also bridge the gap between multiple platforms such as search engines and media platforms by combining the media platforms with the search engines to create a complete view of an indexing capability of a website. Furthermore, the method and the system disclosed herein crawl and analyze content of the website in addition to content related to the website from all the search engines and media platforms combined, and search for linked data of the website to increase the indexing capability of the website for search engine optimization.

The method disclosed herein employs a content validation and coding system (CVCS) comprising at least one processor configured to execute computer program instructions for validating and coding content of an electronic document for search engine optimization. The CVCS is integrated with application programming interfaces (APIs) of multiple search engines and multiple media platforms The CVCS creates a categorized repository of schema codes using one or more collaborative schema data sources. The schema codes comprise structured data tags in a markup language code. The CVCS receives an electronic document to be coded with the schema codes in the created categorized repository from an input data source. The CVCS executes a web crawler for crawling and indexing the received electronic document and content related to the received electronic document from one or more of the search engines, or one or more of the media platforms, or any combination thereof, via one or more of the APIs. The CVCS identifies structured data and content in the received electronic document by performing an analysis of the crawled and indexed electronic document and content.

The content validation and coding system (CVCS) validates the identified content based on analytic criteria. The CVCS determines optimal schema codes from the created categorized repository and/or dynamically generated supplementary schema codes for application to the validated content. The CVCS generates a structured data code map of the determined optimal schema codes to be coded in the received electronic document. The generated structured data code map defines an optimal placement of the determined optimal schema codes in the received electronic document. The CVCS codes the validated content with the determined optimal schema codes within the identified structured data of the received electronic document using the generated structured data code map for search engine optimization.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIG. 6A exemplarily illustrates a screenshot of a website input into the content validation and coding system for validating and coding content of the website for search engine optimization.

FIG. 8A exemplarily illustrates a screenshot of a website validated and coded by the content validation and coding system for search engine optimization.

FIGS. 8B-8F exemplarily illustrate screenshots of a graphical user interface provided by the content validation and coding system for testing the validated and coded website shown in FIG. 8A, for search engine optimization.

FIGS. 9A-9E exemplarily illustrate screenshots of a graphical user interface provided by the content validation and coding system for testing a webpage of the validated and coded website shown in FIG. 8A, for search engine optimization.

FIG. 10 exemplarily illustrates a screenshot of a graphical user interface provided by the content validation and coding system, displaying a search engine optimization report generated by the content validation and coding system for the validated and coded website shown in FIG. 8A.

DETAILED DESCRIPTION OF THE INVENTION

Figure 1:
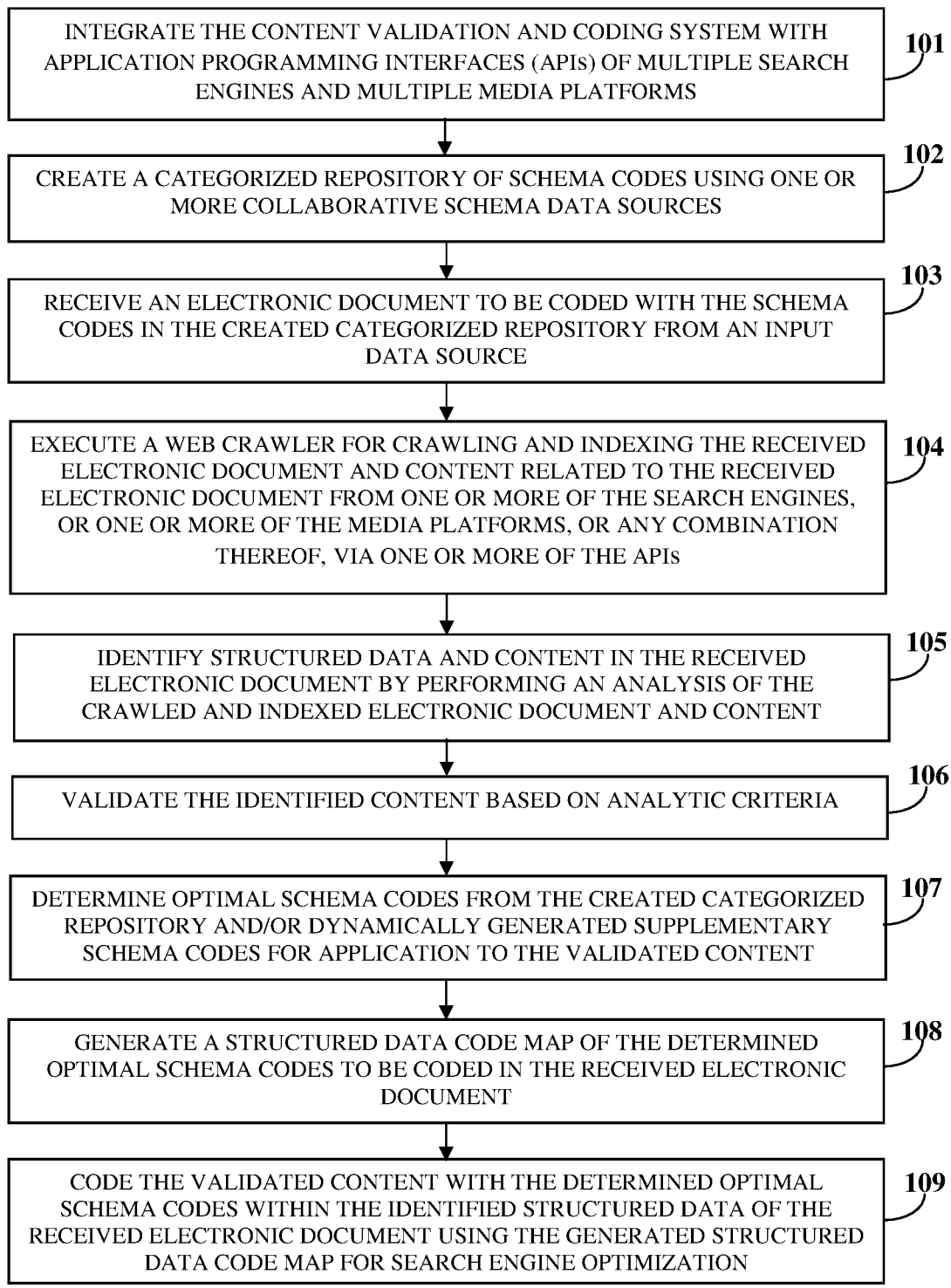
FIG. 1 illustrates a method for validating and coding content of an electronic document for search engine optimization.

FIG. 1 illustrates a method for validating and coding content of an electronic document for search engine optimization. As used herein, "content of an electronic document" refers to information contained in an electronic document in one or more content formats, for example, a text format, an image format, an audio format, a video format, an audiovisual format, a multimedia format, etc. Also, as used herein, "electronic document" refers to a collection of data and content comprising, for example, textual content, image content, audio content, video content, audiovisual content, multimedia content, etc., in an electronic format. The electronic document is, for example, a website such as a business website, a webpage of a website such as a personal page, a sports team page, etc., an electronic mail (email), etc. Content of the electronic document comprises, for example, text on a homepage of a website that indicates a business address. Also, as used herein, "validating content" refers to determining relevant content in an electronic document that can be coded with targeted schema codes for search engine optimization. Also, as used herein, "coding" refers to applying schema codes to relevant content in an electronic document. The method disclosed herein is incorporated, for example, in a dashboard, an application, a product, or a service.

The method disclosed herein employs a content validation and coding system (CVCS) comprising at least one processor configured to execute computer program instructions for validating and coding content of an electronic document, for example, a website, for search engine optimization. For purposes of illustration, the detailed description refers to the electronic document being a website; however the scope of the method and the system disclosed herein is not limited to the electronic document being a website, but may be extended to include other electronic documents, for example, webpages, electronic mail (email) messages, etc., that can be coded for search engine optimization. In various embodiments, the method disclosed herein utilizes artificial intelligence, machine learning, a big data architecture framework, a geographic information system (GIS) framework, and different technology tools comprising, for example, the IBM Watson® cognitive technology tool of International Business Machines Corporation (IBM Corp) for validating and coding content of an electronic document for search engine optimization. In an embodiment, the CVCS is implemented as a web based platform hosted on a server or a network of servers accessible via a network, for example, the internet, a wireless network, a mobile telecommunication network, etc. In another embodiment, the CVCS is implemented in a cloud computing environment. As used herein, "cloud computing environment" refers to a processing environment comprising configurable computing physical and logical resources, for example, networks, servers, storage media, virtual machines, applications, services, etc., and data distributed over a network, for example, the internet. In another embodiment, the CVCS comprises a software application downloadable and usable on a user device, for example, a personal computer, a tablet computing device, a mobile computer, a mobile phone, a smart phone, a laptop, a personal digital assistant, a portable computing device, a wearable device such as the Google Glass® of Google Inc., the Apple Watch® of Apple Inc., the Android Smartwatch® of Google Inc., etc., a touch centric device, a workstation, a client device, a server, a portable electronic device, a network enabled computing device, an interactive network enabled communication device, any other suitable computing equipment, combinations of multiple pieces of computing equipment, etc., and configured to perform functions of the CVCS.

In the method disclosed herein, the content validation and coding system (CVCS) is integrated 101 with application programming interfaces (APIs) of multiple search engines and multiple media platforms using API key integration. The CVCS implements API key integration, for example, with the Google® search engine of Google Inc., the Bing® search engine of Microsoft Corporation, the Yahoo® search engine of Yahoo! Inc., and the Yandex® search engine of Yandex, Ltd. The CVCS also implements API key integration with media platforms, for example, Twitter® of Twitter Inc., Twitter® cards of Twitter Inc., Facebook® of Facebook, Inc., Open Graph of Facebook, Inc., blogs, news feeds, Instagram® of Instagram, LLC, YouTube® of Google Inc., etc. Using API key integration, the CVCS calls the APIs of the search engines and the media platforms. In an embodiment, the CVCS is integrated with the APIs of the search engines and the media platforms using an item property (itemprop) of a schema code. In an example, the CVCS accesses uniform resource locators (URLs) of one or more media platforms using the sameAs itemprop. The sameAs itemprop is a URL of a reference electronic document that unambiguously indicates the identity of the electronic document. In an example, the CVCS uses the sameAs itemprop for social media pages of a business to carry a connection that is both validated by schema.org and valued by the Google® search engine. In an embodiment, the sameAs itemprop allows the CVCS to crawl content related to the electronic document from multiple media platforms using a web crawler. The CVCS scans the electronic document for one or more interface elements of the media platforms, for example, social media buttons, icons, etc. The CVCS follows links to the URLs of the media platforms via the interface elements. The CVCS creates the sameAs itemprop for specific schema codes, for example, a local business schema code and individual schema codes contained within a given topic or a category. A generic computer using a generic program cannot integrate with APIs of multiple search engines and multiple media platforms in accordance with the method steps disclosed above, to allow crawling and analysis of content related to an electronic document, combined from multiple search engines and media platforms.

The content validation and coding system (CVCS) creates 102 a categorized repository of schema codes using one or more collaborative schema data sources. As used herein, "collaborative schema data sources" refer to data sources that collaboratively collect and maintain multiple schema codes that improve search engine optimization of an electronic document, for example, a website. An example of a collaborative schema data source is schema.org sponsored by Google Inc., Microsoft Corporation, Yahoo! Inc., and Yandex, Ltd. Although the detailed description refers to "schema.org" being used as the collaborative schema data source, the scope of the method and the CVCS disclosed herein is not limited to "schema.org" being used as the collaborative schema data source, but may be extended to include any other collaborative schema data source that collaboratively collects and maintains multiple schema codes that can be used for search engine optimization of an electronic document. The CVCS takes the massive index of item properties in all schemas for businesses and business websites and drills the index down into the item properties that have the most impact for search engine optimization. The categorized repository stores and manages a group of schema codes including one or more versions of the schema codes and associated databases. The categorized repository comprises a grouping of schema codes relevant to a business entity, which focuses on what a website of the business entity needs. The schema codes comprise structured data tags in a markup language code, for example, a hypertext markup language (HTML) code, an extensible markup language (XML) code, an extensible hypertext markup language (XHTML) code, etc. As used herein, "structured data tags" refer to on-page markup that allows search engines to understand the content of the electronic document, and use the content to improve a search result listing. The structured data pairs a name with a value. The structured data tags are, for example, markup language tags such as HTML tags that can be added to an electronic document, for example, a website or an electronic mail, to allow the search engines to categorize and index the content of the electronic document optimally.

The collaborative schema data sources comprise schema codes that optimize an electronic document, for example, a website, to allow the website to be indexed fast by multiple search engines, for example, the Google® search engine of Google Inc., the Bing® search engine of Microsoft Corporation, the Yahoo!® search engine of Yahoo! Inc., Ask.com® of Ask Jeeves, Inc., Aol.com® of America Online, Inc., the Baidu® search engine of Baidu.com, Inc., the DuckDuckGo search engine of DuckDuckGo, Inc., the Wolframalpha® search engine of Wolfram Group LLC, etc. The collaborative schema data source, for example, the schema.org vocabulary comprises entities and relationships between entities and actions and can be extended through a well-documented extension model. The collaborative schema data sources provide a comprehensive list of specific categories to allow the content validation and coding system (CVCS) to determine optimal schema codes for the electronic document. The CVCS improves the indexing capability of search engines by providing prominent categories for business websites with accurate classifications. The CVCS utilizes the categorized repository of schema codes to provide a collection of structured data tags, for example, hypertext markup language (HTML) tags relevant to a category of a uniform resource location (URL) of an electronic document. The CVCS utilizes the relevant structured data tags to markup the electronic document for improved crawling of the content of the electronic document.

The categorized repository generated by the content validation and coding system (CVCS) comprises a subset of schema codes of the collaborative schema data sources that belongs to CVCS specified categories. The CVCS implements different programming technologies comprising, for example, artificial intelligence with and without a rule based system, for generating the categorized repository. The CVCS generates the categorized repository of schema codes based on best practices and search engine optimization guidelines established and supported by multiple search engines, for example, the Google® search engine and other software as a service (SaaS) or cloud software as a service (CSaaS) search engine optimization platforms, for example, the MOZ® platform of SEOmoz, Inc., the SEMRush® platform of SEMrush, Inc. The CVCS dynamically updates the categorized repository based on updates of the schema codes in the collaborative schema data sources and supplementary data comprising, for example, data allowed by different search engines that facilitate better functioning and effectiveness of the CVCS. The schema codes of the collaborative schema data sources comprise multiple structured data tags that a web crawler recognizes and that the search engines accept. The CVCS creates the categorized repository of schema codes using the collaborative schema data sources, for example, with "local business" as a CVCS specified category. The created categorized repository of schema codes uses structured data tags relevant to business websites. A generic computer using a generic program cannot create a categorized repository of schema codes using one or more collaborative schema data sources in accordance with the method steps disclosed above. An example of the categorized repository of schema codes is provided below:

```html
<div itemscope itemtype="https://schema.org/AnimalShelter">
<div itemscope itemtype="https://schema.org/AutomotiveBusiness">
<div itemscope itemtype="https://schema.org/AutoBodyShop">
<div itemscope itemtype="https://schema.org/AutoDealer">
<div itemscope itemtype="https://schema.org/AutoPartsStore">
<div itemscope itemtype="https://schema.org/AutoRental">
<div itemscope itemtype="https://schema.org/AutoRepair">
<div itemscope itemtype="https://schema.org/AutoWash">
<div itemscope itemtype="https://schema.org/GasStation">
<div itemscope itemtype="https://schema.org/MotorcycleDealer">
<div itemscope itemtype="https://schema.org/MotorcycleRepair">
<div itemscope itemtype="https://schema.org/ChildCare">
<div itemscope itemtype="https://schema.org/Dentist">
<div itemscope itemtype="https://schema.org/DryCleaningOrLaundry">
<div itemscope itemtype="https://schema.org/EmergencyService">
<div itemscope itemtype="https://schema.org/FireStation">
<div itemscope itemtype="https://schema.org/Hospital">
<div itemscope itemtype="https://schema.org/PoliceStation">
<div itemscope itemtype="https://schema.org/EmploymentAgency">
<div itemscope itemtype="https://schema.org/EntertainmentBusiness">
<div itemscope itemtype="https://schema.org/AdultEntertainment">
<div itemscope itemtype="https://schema.org/AmusementPark">
<div itemscope itemtype="https://schema.org/ArtGallery">
<div itemscope itemtype="https://schema.org/Casino">
<div itemscope itemtype="https://schema.org/ComedyClub">
<div itemscope itemtype="https://schema.org/MovieTheater">
<div itemscope itemtype="https://schema.org/NightClub">
<div itemscope itemtype="https://schema.org/FinancialService">
<div itemscope itemtype="https://schema.org/AccountingService">
<div itemscope itemtype="https://schema.org/AutomatedTeller">
<div itemscope itemtype="https://schema.org/BankOrCreditUnion">
<div itemscope itemtype="https://schema.org/InsuranceAgency">
<div itemscope itemtype="https://schema.org/FoodEstablishment">
<div itemscope itemtype="https://schema.org/Bakery">
<div itemscope itemtype="https://schema.org/BarOrPub">
<div itemscope itemtype="https://schema.org/Brewery">
<div itemscope itemtype="https://schema.org/CafeOrCoffeeShop">
<div itemscope itemtype="https://schema.org/FastFoodRestaurant">
<div itemscope itemtype="https://schema.org/IceCreamShop">
<div itemscope itemtype="https://schema.org/Restaurant">
<div itemscope itemtype="https://schema.org/Winery">
<div itemscope itemtype="https://schema.org/GovernmentOffice">
<div itemscope itemtype="https://schema.org/PostOffice">
<div itemscope itemtype="https://schema.org/HealthAndBeautyBusiness">
<div itemscope itemtype="https://schema.org/BeautySalon">
<div itemscope itemtype="https://schema.org/DaySpa">
<div itemscope itemtype="https://schema.org/HairSalon">
<div itemscope itemtype="https://schema.org/HealthClub">
<div itemscope itemtype="https://schema.org/NailSalon">
<div itemscope itemtype="https://schema.org/TattooParlor">
<div itemscope itemtype="https://schema.org/HomeAndConstructionBusiness">
<div itemscope itemtype="https://schema.org/Electrician">
<div itemscope itemtype="https://schema.org/GeneralContractor">
<div itemscope itemtype="https://schema.org/HVACBusiness">
<div itemscope itemtype="https://schema.org/HousePainter">
<div itemscope itemtype="https://schema.org/Locksmith">
<div itemscope itemtype="https://schema.org/MovingCompany">
<div itemscope itemtype="https://schema.org/Plumber">
<div itemscope itemtype="https://schema.org/RoofingContractor">
<div itemscope itemtype="https://schema.org/InternetCafe">
<div itemscope itemtype="https://schema.org/LegalService">
<div itemscope itemtype="https://schema.org/Attorney">
<div itemscope itemtype="https://schema.org/Notary">
<div itemscope itemtype="https://schema.org/Library">
<div itemscope itemtype="https://schema.org/LodgingBusiness">
<div itemscope itemtype="https://schema.org/BedAndBreakfast">
<div itemscope itemtype="https://schema.org/Campground">
<div itemscope itemtype="https://schema.org/Hostel">
<div itemscope itemtype="https://schema.org/Hotel">
<div itemscope itemtype="https://schema.org/Mote;">
<div itemscope itemtype="https://schema.org/Resort">
<div itemscope itemtype="https://schema.org/MedicalBusiness">
<div itemscope itemtype="https://schema.org/Dentist">
<div itemscope itemtype="https://schema.org/Pharmacy">
<div itemscope itemtype="https://schema.org/Physician">
<div itemscope itemtype="https://schema.org/ProfessionalService">
<div itemscope itemtype="https://schema.org/RadioStation">
<div itemscope itemtype="https://schema.org/RealEstateAgent">
<div itemscope itemtype="https://schema.org/RecyclingCenter">
<div itemscope itemtype="https://schema.org/SelfStorage">
<div itemscope itemtype="https://schema.org/ShoppingCenter">
<div itemscope itemtype="https://schema.org/SportsActivityLocation">
```

```
<div itemscope itemtype="https://schema.org/BowlingAlley">
<div itemscope itemtype="https://schema.org/ExerciseGym">
<div itemscope itemtype="https://schema.org/GolfCourse">
<div itemscope itemtype="https://schema.org/HealthClub">
<div itemscope itemtype="https://schema.org/PublicSwimmingPool">
<div itemscope itemtype="https://schema.org/SkiResort">
<div itemscope itemtype="https://schema.org/SportsClub">
<div itemscope itemtype="https://schema.org/StadiumOrArena">
<div itemscope itemtype="https://schema.org/TennisComplex">
<div itemscope itemtype="https://schema.org/Store">
<div itemscope itemtype="https://schema.org/AutoPartsStore">
<div itemscope itemtype="https://schema.org/BikeStore">
<div itemscope itemtype="https://schema.org/BookStore">
<div itemscope itemtype="https://schema.org/ClothingStore">
<div itemscope itemtype="https://schema.org/ComputerStore">
<div itemscope itemtype="https://schema.org/ConvenienceStore">
<div itemscope itemtype="https://schema.org/DepartmentStore">
<div itemscope itemtype="https://schema.org/ElectronicsStore">
<div itemscope itemtype="https://schema.org/Florist">
<div itemscope itemtype="https://schema.org/FurnitureStore">
<div itemscope itemtype="https://schema.org/GardenStore">
<div itemscope itemtype="https://schema.org/GroceryStore">
<div itemscope itemtype="https://schema.org/HardwareStore">
<div itemscope itemtype="https://schema.org/HobbyShop">
<div itemscope itemtype="https://schema.org/HomeGoodsStore">
<div itemscope itemtype="https://schema.org/JewelryStore">
<div itemscope itemtype="https://schema.org/LiquorStore">
<div itemscope itemtype="https://schema.org/MensClothingStore">
<div itemscope itemtype="https://schema.org/MobilePhoneStore">
<div itemscope itemtype="https://schema.org/MovieRentalStore">
<div itemscope itemtype="https://schema.org/MusicStore">
<div itemscope itemtype="https://schema.org/OfficeEquipmentStore">
<div itemscope itemtype="https://schema.org/OutletStore">
<div itemscope itemtype="https://schema.org/PawnShop">
<div itemscope itemtype="https://schema.org/PetStore">
<div itemscope itemtype="https://schema.org/ShoeStore">
<div itemscope itemtype="https://schema.org/SportingGoodsStore">
<div itemscope itemtype="https://schema.org/TireShop">
<div itemscope itemtype="https://schema.org/ToyStore">
<div itemscope itemtype="https://schema.org/WholesaleStore">
<div itemscope itemtype="https://schema.org/TelevisionStation">
<div itemscope itemtype="https://schema.org/TouristInformationCenter">
<div itemscope itemtype="https://schema.org/TravelAgency">
<div itemscope itemtype="https://schema.org/MedicalOrganization">
<div itemscope itemtype="https://schema.org/Dentist">
<div itemscope itemtype="https://schema.org/Hospital">
<div itemscope itemtype="https://schema.org/Pharmacy">
<div itemscope itemtype="https://schema.org/Physician">
```

In the method disclosed herein, the content validation and coding system (CVCS) receives 103 an electronic document to be coded with the schema codes in the created categorized repository, for example, from an input data source of a business entity. The CVCS receives the electronic document through a direct access to files of the electronic document stored at the backend or through an indirect access to the source code of the electronic document. For example, the CVCS fetches a hypertext markup language (HTML) source code of the received electronic document and writes the fetched HTML source code into a log file. The input to the CVCS is a uniform resource locator (URL) of the electronic document, for example, a website. The input data, for example, the URL or a list of URLs, inputted via a graphical user interface (GUI) provided by the CVCS, is transformed, processed, and executed by a heuristically based coded algorithm in the CVCS for validating and coding content of the electronic document for search engine optimization. The CVCS executes the heuristically based coded algorithm as a search engine optimization algorithm for optimizing a website and facilitating and improving search engine indexing of the website. The heuristically based coded algorithm implements a step change for improving traffic to the website. The CVCS provides a search engine optimization tool that optimizes the website through a cloud based software as a service (CSaaS) platform. The CVCS facilitates a high ranking of the website on a search engine results page and drives brand recognition, website visits, and sales. The CVCS executes the heuristically based coded algorithm along with the cloud based SaaS model to improve the effectiveness of the website. The CVCS provides the heuristically based coded algorithm along with the cloud based SaaS model to all small and medium sized enterprises (SMEs) and improves the search engine optimization market.

The content validation and coding system (CVCS) executes 104 a web crawler for crawling and indexing the received electronic document and content related to the received electronic document from one or more of the search engines, or one or more of the media platforms, or any combination thereof, via one or more of the application programming interfaces (APIs). The content related to the received electronic document is, for example, a business page on media platforms, for example, social media platforms such as Facebook® of Facebook, Inc., Twitter® cards of Twitter, Inc., etc. The CVCS analyzes the data from all combined major search engines and combines media platforms, for example, social media platforms with the search engines to create a complete view of the indexing capability of the electronic document. For example, the CVCS analyzes the uniform resource locators (URLs) of a website on social media sites, for example, Twitter® cards, Open Graph of Facebook, Inc., etc. The CVCS generates a text file, for example, a robot.txt file comprising instructions for the web crawler to crawl the received electronic document and content related to the received electronic document from one or a combination of search engines and/or media platforms. The CVCS renders the robot.txt file to the web crawler. An example of the instructions contained in the robot.txt file is provided below:

```
User-agent: Googlebot
Disallow:
User-agent: Googlebot-Image
Disallow:
User-agent: MSNBot
Disallow:
User-agent: Slurp
Disallow:
User-agent: Teoma
Disallow:
User-agent: Gigabot
Disallow:
User-agent: Scrubby
Disallow:
User-agent: Robozilla
Disallow:
User-agent: Nutch
Disallow:
User-agent: ia_archiver
Disallow:
User-agent: baiduspider
Disallow:
User-agent: yahoo-mmcrawler
Disallow:
User-agent: psbot
Disallow:
User-agent: asterias
Disallow:
User-agent: yahoo-blogs/v3.9
Disallow:
User-agent: *
Disallow:
Disallow: /cgi-bin/
Sitemap: http://www.metasensemarketing.com/sitemap.xml
```

The web crawler crawls and indexes the received electronic document and the content related the received electronic document from one or a combination of search engines and/or media platforms using the robot.txt file and the application programming interface (API) key integration. For example, the web crawler crawls and indexes text on a homepage of a website that indicates a business address and crawls and indexes the content related to the received electronic document, for example, the business' Facebook® page from one or a combination of search engines and/or media platforms using the robot.txt file and the API key integration. The robot.txt file instructs the web crawler on how to crawl the received electronic document and about one or more parts of the received electronic document to be crawled or accessed and/or parts that cannot be accessed. The robot.txt file provides instructions that are relevant to the received electronic document and instructs the web crawler to visit the uniform resource locator (URL) of the electronic document and collect the data available at that URL. The content validation and coding system (CVCS) places a request to the APIs of the search engines and/or the media platforms by implementing API key integration. In an embodiment, the CVCS integrates the robot.txt file with a list of API keys to identify detailed data relating to the URL. The CVCS implements API key integration with multiple search engines and media platforms for searching any linked data from the received electronic document and for allowing the web crawler to crawl and index content related to the received electronic document from these search engines and media platforms.

The content validation and coding system (CVCS) passes a code, for example, an application programming interface (API) key to call each of the APIs of the search engines and the media platforms and to allow the web crawler to access the search engines and the media platforms. The API key tracks and controls use of each of the APIs by the web crawler. The web crawler automatically identifies the category of the uniform resource locator (URL) of the received electronic document, crawls the world wide web for content including, for example, web pages, images, files, videos, etc., and other detectable documents, and systematically traverses multiple interlinked pages on the world wide web to fetch the content related to the category of the URL. The web crawler performs caching and indexing of the crawled content based on the category of the URL. The web crawler ranks the indexed content on the level of relevance and the order of importance. The CVCS combines the crawled and indexed content collected from the received electronic document and the content related to the received electronic document from the search engines and/or the media platforms together into a document for further processing and application of optimal schema codes. A generic computer using a generic program cannot combine the crawled and indexed content from the received electronic document and from a combination of the search engines and the media platforms using API key integration for enhanced indexing of the electronic document in accordance with the method steps disclosed above.

The content validation and coding system (CVCS) identifies 105 structured data and content in the received electronic document by performing analysis of the crawled and indexed electronic document and content. As used herein, "structured data" refers to coding added to an electronic document, for example, a website that assists search engines in indexing the website fast and effectively displaying website listings in the results of the search engines. The structured data is similar to a card catalog of a library for use over the internet. The structured data is configured, for example, as a hypertext markup language (HTML) markup that can be integrated into the electronic document. A collaborative schema data source or a third party organization, for example, schema.org that multiple search engines comply with, vets the structured data. The structured data is a format of a database that follows rules and structure to allow the search engines to scan the electronic document quickly and effectively. Instead of metatag keywords that were used for affecting search rankings of websites, search engines use the structured data in the technical forefront of search engine optimization. The CVCS analyzes each electronic document, for example, each webpage of a website to identify the structured data by scanning the source code of the webpage for structured data tags. The CVCS also analyzes the website to identify webpages of the website that comprise content, for example, text, images, etc., that can utilize the schema codes. The CVCS also analyzes content related to the website, for example, a business' Facebook® page to identify linked data of the website that can utilize the schema codes. A generic computer using a generic program cannot identify structured data and content in the received electronic document by performing an analysis of the crawled and indexed electronic document and content collected from the received electronic document and the content related to the received electronic document from the search engines and/or the media platforms in accordance with the method steps disclosed above.

In an embodiment, the content validation and coding system (CVCS) analyzes the crawled and indexed electronic document and content and identifies and fixes errors in the identified structured data in the received electronic document automatically. The CVCS compares the crawled and indexed electronic document and content with the categorized repository of schema codes and dynamically generated schema codes to identify the errors. For example, the CVCS utilizes open source website code testing tools, for example, the Google® structured data testing tool of Google Inc., to run a check on the crawled and indexed electronic document and content to find errors in the identified structured data in the received electronic document based on predefined guidelines provided by schema.org. The CVCS also runs a spell-check for typographical errors, for example, between < > and </> characters. A generic computer using a generic program cannot automatically analyze the crawled and indexed electronic document and content for errors in the identified structured data in the received electronic document in accordance with the method steps disclosed above.

In an embodiment, the content validation and coding system (CVCS) scores and weights the crawled and indexed electronic document and content according to values created by the CVCS for structured data markup. The CVCS scores and weights the crawled and indexed electronic document and content based on a 10 point scale. The CVCS executes the web crawler to parse the crawled and indexed electronic document and content based on the 10 point scale for categories related to each attribute of structured data, for example, to each itemscope. The CVCS executes the web crawler to parse the crawled and indexed electronic document and content based on a basic counting method of what item properties exist for a given schema on a page. The basic counting method refers to a 10 point scoring method implemented by the CVCS to score any schema and item property (itemprop) related to the given schema. A table displaying the scores assigned to the item properties related to an offer schema code by the CVCS based on the 10 point scale is provided below:

| Detected Item Property | Add to Score |
|---|---|
| acceptedPaymentMethod | +1 |
| PaymentMethod | +1 |
| addOn | +1 |
| advanceBookingRequirement | +1 |
| aggregateRating | +1 |
| areaServed | +1 |
| GeoShape | +1 |
| availability | +1 |
| availabilityEnds | +1 |
| availabilityStarts | +1 |
| availableAtOrFrom | +1 |
| availableDeliveryMethod | +1 |
| businessFunction | +1 |
| category | +1 |
| deliveryLeadTime | +1 |
| eligibleCustomerType | +1 |
| eligibleDuration | +1 |
| eligibleQuantity | +1 |
| eligibleRegion | +1 |
| eligibleTransactionVolume | +1 |
| gtin12 | +1 |
| gtin13 | +1 |
| gtin14 | +1 |
| gtin8 | +1 |
| includesObject | +1 |
| ineligibleRegion | +1 |
| inventoryLevel | +1 |
| itemCondition | +1 |
| itemOffered | +1 |

-continued

| | Add to Score |
|---|---|
| Service | +1 |
| mpn | +1 |
| offeredBy | +1 |
| Person | +1 |
| Inverse property: makesOffer. | +1 |
| price | +1 |
| priceCurrency | +1 |
| priceSpecification | +1 |
| priceValidUntil | +1 |
| review | +1 |
| seller | +1 |
| Person | +1 |
| serialNumber | +1 |
| sku | +1 |
| validFrom | +1 |
| validThrough | +1 |
| warranty | +1 |
| Properties from Thing | |
| additionalType | +1 |
| alternateName | +1 |
| description | +1 |
| disambiguatingDescription | +1 |
| image | +1 |
| mainEntityOfPage | +1 |
| Inverse property: mainEntity. | +1 |
| name | +1 |
| potentialAction | +1 |
| sameAs | +1 |
| subjectOf | +1 |
| Event | +1 |
| Inverse property: about. | +1 |
| url | +1 |

After assigning the scores to the item properties of the offer schema code, the content validation and coding system (CVCS) calculates the total of the assigned scores. The CVCS weights the item properties of the offer schema code based on the total score. The CVCS identifies the item properties of the schema that are more relevant to a business, for which the business would want to be searched, indexed, and found. The CVCS assigns additional weights to the scores of the most relevant item properties identified by the CVCS. In this example, the CVCS identifies businessFunction, eligibleCustomerType, eligibleQuantity, etc., as shown in the table below, as the relevant item properties for the offer schema code and assigns additional weights to the scores of the identified item properties. A table displaying the additional weights assigned to the scores of the relevant item properties by the CVCS is provided below:

| Detected Item Property | Add to Score |
|---|---|
| businessFunction | +7 |
| eligibleCustomerType | +6 |
| eligibleQuantity | +2 |
| eligibleRegion | +8 |
| seller | +5 |
| areaServed | +9 |
| description | +4 |
| name | +10 |
| PotentialAction | +3 |
| price | +1 |

In an embodiment, the content validation and coding system (CVCS) scores and weights the identified content of the received electronic document according to values created by the CVCS for structured data markup as disclosed above. On identifying the content in the received electronic document, the content validation and coding system (CVCS), using artificial intelligence and several programming methods, validates 106 the identified content based on analytic criteria. The CVCS utilizes a metamodeling class method provided by a programming language for validating the identified content. The CVCS also utilizes constructors of the programming language to instantiate abstract classes and/or methods created and/or used. The CVCS compares the identified content of the electronic document with the categorized repository of schema codes to determine the content that is relevant to a business entity that provided the electronic document. The CVCS identifies content that provides information comprising, for example, business type, services, offers, products, postal address, service area, business hours, key business employees, key business executives, reviews and testimonials, articles, blogs, creative works, any relevant keyword phrases in the articles, blogs, creative works, etc., that is relevant to the business. The CVCS tests whether the collaborative schema data source, for example, schema.org supports the identified content and also whether the identified content is correctly coded for an electronic document. That is, the CVCS checks that there are no typographical errors in symbols or language of the identified content.

If the electronic document contains content of an unsupported type, the content validation and coding system (CVCS) corrects errors in the electronic document using the following methods. In one method, the CVCS checks whether any of the types, for example, reviews, comments, images, breadcrumbs, etc., that schema.org supports, are relevant for the CVCS to use for coding the identified content. If the electronic document contains content of an unsupported type and the CVCS does not find a match, the CVCS does not mark up or code the identified content. In a second method, the CVCS uses a less specific markup type. For example, schema.org has no "professor" type. However, if the website has a directory of professors in an "about us" webpage of the website, the CVCS uses a "person" type to mark up the identified content, that is, the information for each professor in the directory. In a third method, the CVCS defines a new type for the identified content by utilizing an extension system of schema.org. In a fourth method, if the electronic document has coding content that is incorrect due to a typographical error, then the CVCS identifies the error and corrects the typographical error or incorrect symbol. In a fifth method, the CVCS searches for one error that search engines are particularly concerned with, that is, the location of the markup code in the electronic document. The CVCS marks up or codes only the identified content that is visible to users who visit and view the electronic document and not the identified content in hidden structure data tags or other hidden page elements. Search engines, for example, the Google® search engine penalize websites with schema codes placed in hidden page elements.

In an embodiment, the content validation and coding system (CVCS) validates the identified content as follows: The CVCS sends the generated robot.txt file to a uniform resource locator (URL) of a website to crawl the website and extract the code of the website. The CVCS stores the extracted code in a database. Using a metamodel, the CVCS sifts through database categories and sifts out unwanted data from the extracted code, retaining only content that the metamodel recognizes as valid for structured data. The CVCS refines the stored code in the database and determines the valid content for application of the schema codes. The CVCS communicates with one or more of the collaborative schema data sources, for example, schema.org, to determine valid content for application of the schema codes. The CVCS filters out content that is deemed invalid by the collaborative schema data sources. Consider an example where the CVCS identifies a mailing address on a website and determines that the identified mailing address does not contain schema properties. In this example, the CVCS communicates with schema.org to determine that the mailing address is valid content for application of a schema code. The CVCS then creates a code for determining a schema code from the created categorized repository of schema codes to apply to the valid mailing address. A generic computer using a generic program cannot validate the identified content of the received electronic document in accordance with the method steps disclosed above.

The content validation and coding system (CVCS) determines 107 optimal schema codes from the created categorized repository and/or dynamically generated supplementary schema codes for application to the validated content. As used herein, "optimal schema codes" refer to schema codes or code snippets that the CVCS determines are relevant for application to the validated content of the electronic document. The CVCS identifies which schema codes are most relevant for a website for application of the schema codes quickly to the website. The CVCS sifts through the schema codes and structured data tags in the created categorized repository and targets the optimal schema codes with the structured data tags that are relevant to a business entity that provided the electronic document and a ranking requirement of the business entity. For example, the CVCS identifies "location" as a significant factor for a business entity to optimize the website of the business entity for traffic. The CVCS identifies and weighs schema codes, for example, an offer schema code and a product schema code. The CVCS assigns a higher weight to the offer schema code than to the product schema code as the offer schema code allows location based item properties. The CVCS determine the categories of the validated content in the website. The CVCS analyzes the existing schema codes and adds the schema codes to the validated content of the website. If the CVCS is unable to determine the category of the validated content of the website, then the CVCS does not code that piece of content of the website.

The content validation and coding system (CVCS) identifies and weighs the schema codes by a combination of analyzing the content of the website and the content related to the website from one or more search engines and/or media platforms, analyzing the categorized repository of schema codes, and determining optimal schema codes that are relevant to search. The CVCS filters the schema codes, for example, using search engine optimization best practices documentation, the content present on the website, and the categorized repository to determine the optimal schema codes. The categorized repository comprises categories that affect a website's content, for example, local business, postal address, hours, product, offerings, services, articles, reviews, etc. Of each individual structured data tag, the CVCS drills down on the specific item properties that affect a website's content based on multiple websites designed, the results gained from designing those websites, and an understanding of what businesses try to be found for in search engines with keywords. The CVCS utilizes the search engine optimization best practices defined based on standards set, for example, by Google Inc., SEOmoz, Inc., etc., and search engine optimization campaigns. Businesses try to be found for their name, their industry, their location and local area, and the services they provide. The CVCS therefore focuses the coding on those areas. The search engine optimization guidelines implemented to apply the schema codes into a website's content are written directly into the hypertext markup language (HTML) code of the website. The CVCS focuses the indexing schema codes into what will have the strongest impact and most relevance for a business and its website based on search engine optimization best practices and data for what businesses are trying to be found.

The content validation and coding system (CVCS) determines the optimal schema codes based on a business type or an industry type and search ranking factors listed, for example, by a guide of search engine optimization best practices. The search ranking factors in a hierarchy comprise, for example, business name, location of the business, services offered by the business, business details, phrases about services offered by the business, phrases that help the CVCS identify the location of the business, new content that is categorized as a piece of creative work or a specific piece of creative work, reviews related to the business, people relevant to the business, etc. The CVCS implements a guideline or a standard on how to code the determined optimal schema codes into a website's content. The use of these optimal schema codes with new content updates creates a more powerful optimization for a website. By utilizing the method disclosed herein on each new article, whitepaper, review, blog post, and biography of a website, the CVCS adds in backend coding assistance to the website's overall optimization effort.

In an embodiment, the content validation and coding system (CVCS) dynamically generates supplementary schema codes using a plugin tool. The supplementary schema codes comprise, for example, rich snippets used to describe structured data markup that can be added to the received electronic document to allow search engines to interpret the content of the electronic document. As used herein, "rich snippets" refers to additional pieces of information about the electronic document that appear on a search engine result page. The CVCS identifies the correct structured data, also referred herein as the "optimal schema codes", from the entire list of the schema codes in the created categorized repository and the dynamically generated supplementary schema codes to apply to the validated content of the received electronic document. In an embodiment, the CVCS implements and adheres to predefined guidelines, for example, guidelines provided by Google Inc., for generating and/or implementing the supplementary schema codes, for example, rich snippets. To create structured data code for a particular part of a website, the CVCS selects supplementary schema codes that adhere to the predefined guidelines. The CVCS implements the predefined guidelines to generate rich snippets. For example, a blogPosting schema requires an author structured data markup to be valid according to the predefined guidelines. When the CVCS determines the optimal schema codes for a blog posting, the CVCS implements the predefined guidelines and generates structured data tags for author. A generic computer using a generic program cannot determine optimal schema codes from the created categorized repository and/or the dynamically generated supplementary schema codes for application to the validated content in accordance with the method steps disclosed above.

In an example, the content validation and coding system (CVCS) creates a structured data tag for a local business as follows:
<div itemscope itemtype="http://schema.org/LocalBusiness">
Within the structured data tags for a local business, the content validation and coding system (CVCS) also provides a nested set of structured data tags for a postal address and span elements of the postal address as follows:

```
<div itemprop="address" itemscope
    itemtype="http://schema.org/PostalAddress">
<span itemprop="streetAddress">
</span>
<span itemprop="addressLocality">
</span>
<span itemprop="addressRegion">
</span>
<span itemprop="postalCode">
</span>
</div>
```

The content validation and coding system (CVCS) provides item properties for the local business as follows:

```
<span itemprop="name">
</span>
<span itemprop="description">
</span>
<span itemprop="telephone">
</span>
<span itemprop="email">
</span>
<time itemprop="openingHours" datetime="Tu,We,Th,Fr 10:00-18:30">
```

In the item properties above, the content validation and coding system (CVCS) defines specific opening hours for a business entity, for example, as a weekly time range, starting with days, and then times per day. The CVCS lists multiple days with commas "," that separate each day. The CVCS specifies day or time ranges using a hyphen "-". The CVCS specifies days using two letter combinations, for example, Mo, Tu, We, Th, Fr, Sa, Su. The CVCS specifies times in a 24-hour format. For example, the CVCS specifies 3 pm as 15:00. Therefore, the CVCS specifies the opening hours of the business entity as follows:

```
<time itemprop="openingHours" datetime="Tu,Th
    16:00-20:00">Tuesdays and Thursdays 4-8pm</time>.
```

If the business entity is open 7 days a week, then the content validation and coding system (CVCS) specifies the opening hours of the business entity as:

```
<time itemprop="openingHours" datetime="Mo-Su">Monday through Sunday, all day</time>.
```

The content validation and coding system (CVCS) generates 108 a structured data code map of the determined optimal schema codes to be coded in the received electronic document. As used herein, "structured data code map" refers to a graphical representation that provides a visualization of relationships between the structured data tags of the optimal schema codes. The generated structured data code map defines an optimal placement of the determined optimal schema codes in the received electronic document. The generated structured data code map specifies locations in the validated content where the determined optimal schema codes should be optimally placed. The generated structured data code map allows the determined optimal schema codes to be input into the electronic document optimally to improve search engine optimization of the electronic document. In an embodiment, the CVCS renders the validated content and the determined optimal schema codes to the heuristically based coded algorithm of the CVCS that utilizes preprogrammed functions in a spreadsheet, for example, an Excel® spreadsheet of Microsoft Corporation, to calculate and determine the optimal placement of the determined optimal schema codes in the received electronic document. That is, in method steps 107 and 108, the CVCS determines which schema codes are placed where in the electronic document. In an embodiment, the CVCS uses Visual Studio® of Microsoft Corporation to generate the structured data code map. In an embodiment, the generated structured data code map is in the form of a tag cloud, that is, a visual representation of structured data tags on a website.

In an example, the CVCS generates the structured data code map by executing the heuristically based coded algorithm on the source code of the received electronic document. The CVCS determines the structured data markup of the received electronic document from the source code of the received electronic document. The CVCS identifies if any schema codes exist for the determined structured data markup. If no schema code exists, the CVCS creates a valid schema code or determines an optimal schema code from the categorized repository and/or the dynamically generated supplementary schema codes for the determined structured data markup and adds the created valid schema or the determined optimal schema code to the item property of the determined structured data markup. The CVCS validates the created schema code or the determined optimal schema code and compares the created schema code or the determined optimal schema code with predefined guidelines set, for example, by Google Inc. The CVCS generates the structured data code map for coding the received electronic document with the created valid schema code or the determined optimal schema code.

In an embodiment, the content validation and coding system (CVCS) dynamically identifies errors in the structured data in the received electronic document and fixes the identified the errors automatically using the generated structured data code map. The CVCS facilitates navigation of the identified structured data and the identified content in the received electronic document and uses the generated structured data code map to identify errors, for example, typographical errors, syntax errors, data type errors, etc. The CVCS facilitates optimal placement of the determined optimal schema codes in the received electronic document by allowing navigation of the received electronic document. The CVCS tracks the determined optimal schema codes that have to be coded in the received electronic document using the generated structured data code map. In an embodiment, the CVCS renders the generated structured data code map on a graphical user interface (GUI) displayed on a user device to allow users to hover over the generated structured data code map. The CVCS renders tooltips on the GUI to allow users to rectify the errors in the structured data. The CVCS provides the tooltips, information related to the structured data code map, and relationships between the content and the structured data in the received electronic document for the optimal placement of the determined optimal schema codes in the received electronic document. The CVCS renders insertion points in the received electronic document via the generated structured data code map for optimally placing the determined schema codes in the received electronic document. The CVCS allows users to explore additional relationships of the identified structured data, the identified content, and the determined optimal schema codes using the generated structured data code map. The optimal placement of the determined schema codes in the received electronic document using the generated structured data code map allows the electronic document to be optimally displayed on a search engine results page.

In an embodiment, the content validation and coding system (CVCS) dynamically generates one or more sitemaps from the generated structured data code map. A sitemap is a markup language file, for example, an extensible markup language (XML) file that lists uniform resource locators (URLs) in the electronic document. The sitemaps provide an archive of pages in the received electronic document. In an embodiment, the CVCS dynamically generates the sitemaps that list out every URL in the received electronic document, along with metadata for each URL that includes information about the received electronic document from the generated structured data code map. The metadata comprises, for example, time of the last update made to the structured data and the content at the URL, frequency of changes made to the structured data and the content at the URL, significance of the URL in relation to other URLs of the electronic document, etc. The CVCS renders the dynamically generated sitemaps to external intelligence systems for allowing optimal recognition and indexing of the received electronic document. For example, the dynamically generated sitemaps allow a machine learning artificial intelligence system such as RankBrain of Google Inc., to recognize and index the electronic document optimally. The dynamically generated sitemaps allow external intelligence systems to access areas of the electronic document that are not available through a browsable interface, or are isolated, or are not linked optimally together. The dynamically generated sitemaps facilitate crawling of the received electronic document and indexing of the content. A generic computer using a generic program cannot generate a structured data code map of the determined optimal schema codes to be coded in the received electronic document for the optimal placement of the determined schema codes in the received electronic document and cannot generate corresponding sitemaps dynamically in accordance with the method steps disclosed above.

The content validation and coding system (CVCS) codes 109 the validated content with the determined optimal schema codes within the identified structured data of the received electronic document using the generated structured data code map for search engine optimization. The CVCS executes the heuristically based coded algorithm that automatically analyzes, classifies, and then recodes the received electronic document for search engine optimization. The CVCS applies the determined optimal schema codes and item properties to the right content on a webpage by identifying which content on the webpage benefits from the determined optimal schema codes. For example, the CVCS codes a website of a business entity to allow search engines to index the website when content is posted on the website. The CVCS provides control over the search results. The coding of the validated content in the website with the determined optimal schema codes by the CVCS shapes the information the listings display on a search engine results page, thereby providing instructions on the content of the website and the method of indexing the content of the website to the search engines. By adding the optimal schema codes to new content, for example, articles and blogs posted on websites, the CVCS makes that content easier to index. The CVCS structures the content of the website to be keyword strong and follows best practices of search engine optimization for easier and efficient web crawling. The CVCS applies the determined optimal schema codes directly to the coding of a website. When the CVCS receives the input uniform resource locator (URL) of the electronic document, the CVCS implements the generated structured data code map onto the structured data of the electronic document, for example, the hypertext markup language (HTML) code of the website, thereby automatically applying the determined optimal schema codes in the structured data markup language to the HTML code. In an embodiment, if the received electronic document, for example, a website is integrated with the application programming interface (API) key provided by the CVCS, then the CVCS allows users to initiate code changes onto the HTML code of the website.

The content validation and coding system (CVCS) determines the optimal schema codes and applies the determined optimal schema codes to the validated content of the website. However, if the CVCS is unable to determine the category of the content of the website, then the CVCS does not apply the optimal schema codes to that content of the website. The CVCS provides backend codes that are faster and effective for the websites of business entities. The CVCS utilizes the optimal schema codes to improve the optimization of the website. The optimal schema codes in the content, with the keyword strong quality and with the search engine optimization best practices, improve page-level link features and domain-level link authority features of the website. The page-level link features define the quality and quantity of links aimed at a single page of the website. The domain-level link authority features define the quality and quantity of links aimed at the entire website. The improvement in the page-level link features and the domain-level link authority features of the website facilitates enhanced ranking of the website on a search engine result page.

In an embodiment, the content validation and coding system (CVCS) codes the validated content with the determined optimal schema codes within the identified structured data of the received electronic document in a direct mode. In the direct mode, the CVCS codes the web site by coding the hypertext markup language (HTML) directly into the website. In another embodiment, the CVCS codes the validated content with the determined optimal schema codes within the identified structured data of the received electronic document in an automated mode using a plugin tool. In the automated mode, the CVCS codes the website, that is, adds rich snippets to the website, by using a plugin tool to generate optimal schema codes. The CVCS adds relevant keywords using the structured data tags, for example, "keyword" and "description". The CVCS coding the HTML directly is more effective than coding using the plugin tool to generate optimal schema codes as coding the HTML directly provides more options and provides control over utilizing the structured data tags, thereby providing effective search engine optimization potential. The CVCS operates on page level content and keyword content using the schema codes. The schema codes facilitate easy and efficient content identification and web crawling by the search engines. The identification of the page level content and the keyword content using schema codes is similar to a card catalog description. The schema codes identify what the page level content and the keyword content are and the search engines process the schema codes that are used for the identification. The CVCS directly affects the page level and keyword content features and enhances the optimization of the website in the page level and keyword content features.

Coding of the validated content comprising keyword relevant content such as a piece of creative work or an article, and ongoing content native to a website, with the determined optimal schema codes by the content validation and coding system (CVCS) improves user, usage and traffic or query data, the page level, keyword-agnostic features, and page level keyword and content features of the website. The CVCS also combines authoritative backlinks to the content of the website to enhance search engine optimization in the page-level link features and domain-level link authority features. Authoritative backlinks are backlinks from authoritative sources about a given topic. The term "backlinks" refer to links for a topic from a web resource such as a website. An authoritative source is a web resource provided by an expert who is recognized in a field of expertise related to the topic. Search engines, for example, the Google® search engine do not show structured data schema in rich snippets and rich cards for time-sensitive content that is no longer relevant. The Google® search engine also does not show a rich snippet or a rich card for content that is linked or alluded to but not directly available on a webpage. The Google® search engine takes action against the schema codes that markup the content that is not visible to users and also the schema codes that markup irrelevant or misleading content such as fake reviews or content unrelated to the focus of a webpage.

The content validation and coding system (CVCS) tags a business entity's products, offers, and services using a product structured data tag, an offer structured data tag, and a service structured data tag respectively. A product is defined as a thing that the business entity produces. Most business entities offer vague services and provide less information about the vague services. The product structured data tag limits the search engine indexing to the business entity's electronic document. The CVCS uses the product structured data tag for a specific thing, name, brand, and price of the product. The service structured data tag and the offer structured data tag are more flexible than the product structured data tag. The CVCS tags a business entity's products using the product structured data tags in a product schema code as follows:

```
<div itemscope itemtype="https://schema.org/Product">
<span itemprop="name">
</span>
<span itemprop="brand">
</span>
</div>
```

The content validation and coding system (CVCS) uses the offer structured data tag to tag the services and products offered by the business entity. An offer relates to what a business offers. The CVCS can use the offer structured data tag instead of the product structured data tag or the service structured data tag. The offer structured data tag is more flexible than the product structured data tag. The business entity's potential action is, for example, "Call now" or "Sign up now". The business entity's business function is, for example, "We will replace your tires." The CVCS tags the business entity's offer using the "offer" structured data tags in an offer schema code as follows:

```
<div itemscope itemtype="https://schema.org/Offer">
<span itemprop="businessFunction">
</span>
<span itemprop="eligibleCustomerType">
</span>
<span itemprop="eligibleQuantity">
```

-continued

```
    </span>
    <span itemprop="eligibleRegion">
    </span>
    <span itemprop="seller">
    </span>
    <span itemprop="description">
    </span>
    <span itemprop="name">
    </span>
    <span itemprop="potentialAction">
    </span>
    <span itemprop="price">
    </span>
    <span itemprop="priceCurrency" content="USD">$</span><span
    itemprop="price" content="1000.00">1,000.00</span>
</div>
```

The service structured data tag is substantially flexible as the service structured data tag provides a service type and a service area. For example, "photocopying" is a name of a service, "black and white printing", "color printing", "stapling", and "binding" are service types of the photocopying service. The content validation and coding system (CVCS) uses the service and the service types to describe a business. Service area ties location to the service and thus to the business entity. The CVCS ties the business entity's product to produces. For example, a cleaning business entity provides cleaning services and produces a cleaning product. The CVCS adds the services structured data tag and the produces structured data tag in a service schema code as follows:

```
<div itemscope itemtype="http://schema.org/service">
    <span itemprop="description">
    </span>
    <span itemprop="provider">
    </span>
    <span itemprop="serviceArea">
    </span>
    <span itemprop="produces">
    </span>
    <span itemprop="serviceType">
    </span>
    <span itemprop="name">
    </span>
    <span itemprop="serviceOutput">
    </span>
</div>
```

The electronic document, for example, a website, comprises content, for example, articles, blogs, reviews, and person related information. In addition to coding the website by tagging the website as a business, and the products and the services provided by the website, the content validation and coding system (CVCS) applies optimal schema codes to relevant content, for example, articles, blogs, reviews, and person content in the website. The CVCS also creates keyword related content of the business entity and the keyword related content that describes topics the business entity is a part of and the interests of the business entity. The keyword related content with the optimal schema codes improves the user, usage, and traffic or query data. The content in the website offers text for the website's visitors to read and by offering the text on a regular consistent basis, the CVCS increases search engine optimization and search rankings of the business entity. The CVCS creates the content for the website and codes the content with the optimal schema codes to allow the search engines to index the content optimally. The CVCS ensures that relevant and valid content is positioned to be indexed optimally, thereby enhancing search engine optimization when backlinks link to this content. The CVCS search engine optimization service adds backlinks to the coded content through media platforms and social media.

The content validation and coding system (CVCS) uses the following types of schema codes to code the content. The schema code for creative work is provided below.
<div itemscope itemtype="https://schema.org/CreativeWork">

The content validation and coding system (CVCS) also provides specific schema codes for specific types of creative work, for example, articles and blogs as follows:

```
<div itemscope itemtype="https://schema.org/Article">
<div itemscope itemtype="https://schema.org/Blog">
```

The content validation and coding system (CVCS) codes the articles and blogs using the article schema code and the blog schema code based on a predefined format. In an embodiment, the use of metatag keywords in articles, blogs, and creative work allows the CVCS to get keywords from the content indexed optimally. The schema codes generate errors if the CVCS does not follow a predefined format, for example, a Google® specified format to code the articles and blogs. A predefined format requires author credit, date published property, and an image. When the CVCS identifies content that does not meet the predefined format requirements, the CVCS applies a general schema code for creative work. In an embodiment, the CVCS applies a specific schema code based on the type of creative work, that is, an article or a blog. The item properties for the article schema code and the blog schema code are as follows:

```
    <span itemprop="name">
    </span>
    <span itemprop="articleBody">
    </span>
    <span itemprop="about">
    </span>
    <span itemprop="author">
    </span>
    <span itemprop="name">
    </span>
    <span itemprop="description">
    </span>
    <span itemprop="audience">
    </span>
    <span itemprop="creator">
    </span>
    <span itemprop="genre">
    </span>
    <span itemprop="provider">
    </span>
    <span itemprop="publisher">
    </span>
    <span itemprop="potentialAction">
    </span>
    <span itemprop="datePublished">
    </span>
    <span itemprop="headline">
    </span>
    <span itemprop="image">
    </span>
    <span itemprop="keywords">
    </span>
</div>
```

Similar to articles and blogs, the content validation and coding system (CVCS) codes reviews in the business entity's website using a review schema code based on a predefined format. Rich snippets use structured data to display star ratings of reviews of, for example, books, movies, and restaurants. Rich snippets are used to describe structured data markup that website operators can add to the existing hypertext markup language (HTML) code of a website, to allow search engines to interpret the content in the website. A best practice for a business entity is to obtain and display reviews and testimonials on a website and obtain reviews through external sources, for example, Yelp® of Yelp Inc., Foursquare® of Foursquare Labs, Inc., and Google Inc. Google® reviews get structured data added automatically, but Google Inc., has created rules to vet value of the reviews and to prevent a user from misusing the structured data and the reviews. The CVCS follows the coding rules and creates error free review structured data tags. The CVCS utilizes the following schema code for reviews.

```
<div itemscope itemtype="https://schema.org/Review">
<span itemprop="itemReviewed">
<span itemprop="reviewBody">
<span itemprop="reviewRating">
<span itemprop="author">
<span itemprop="about">
<span itemprop="name">
<span itemprop="keywords">
```

The content validation and coding system (CVCS) also codes person related content on a website using a person schema code. The CVCS determines person related content on "about" and "biography" webpages. The CVCS focuses the person schema code on the person related content when the person related content is relevant to the business entity and goals of the business entity. The CVCS focuses on which item properties are helpful for search requests and for optimizing indexing. The person schema code offers an item property for birth date, death dates, job title, etc., that can be coded into a website's content for a particular person. These item properties are among 50 specific item properties for the person schema code and another 10 specific item properties for the thing schema code of which a person is a subset. A person schema code comprises structured data tags, for example, for birth dates, death dates, job title, etc. Examples of the structured data tags of the person schema code are as follows:

```
<div itemscope itemtype="https://schema.org/Person">
<span itemprop="name">
<span itemprop="honorificPrefix">
<span itemprop="honorificSuffix">
<span itemprop="jobTitle">
<span itemprop="owns">
<span itemprop="makesOffer">
```

The person schema codes can be used in the "about" webpage or the "biography" webpage of the website. The content validation and coding system (CVCS) tests and weighs the item properties that have the most value to a website of a business entity. In an example, if the CVCS adds a schema code to a website on the "about us" webpage that has a paragraph about the company's chief executive officer (CEO), the CVCS determined that job title is relevant and is likely to be an available item property. The CVCS assigns a better weight to the job title item property and ignores the birthdate item property and the death date item property. The CVCS gives a lesser weightage to the birthdate and the death date item properties as the birthdate and the death date item properties are not relevant to the business entity's website. The CVCS considers the item properties that are relevant to the business entity and focuses on the item properties that are helpful for search requests and also helpful in indexing and increasing the traffic to the business entity's website. The CVCS filters the extraneous, irrelevant information or noise of the business entity's website that the CVCS does not create, manage, or maintain, and retains the noise that optimizes the business entity's website. A generic computer using a generic program cannot code the validated content with the determined optimal schema codes within the identified structured data of the received electronic document using the generated structured data code map for search engine optimization in accordance with the method steps disclosed above.

In the method disclosed herein, after coding the validated content with the determined optimal schema codes within the identified structured data of the electronic document, the content validation and coding system (CVCS) renders the electronic document with the coded content to a web crawler to interpret and index the electronic document for search engine optimization. Similar to a card catalog system of a library, the CVCS organizes the content into schema codes through the use of structured data tags that web crawlers recognize and use to interpret the content. The schema codes comprise structured data tags in hypertext markup language (HTML) code that assist the web crawler in interpreting the content of the website. The CVCS implements the schema codes in a website to provide a summary of the content of the webpages of the website to platforms of, for example, Google Inc., Yahoo! Inc., Microsoft Corporation, Pinterest, Inc., Yandex, Ltd., and their robots. In an embodiment, the CVCS tests the electronic document with the coded content and fixes the errors in the electronic document. The CVCS may obtain schema coding errors after testing the electronic document. For example, an article in an electronic document requires a publication date, a review requires star ratings, etc. The CVCS makes adjustments, determines optimal schema codes, and codes the validated content of the electronic document with the determined optimal schema codes based on revisions in schema coding errors. The CVCS utilizes open source website code testing tools, for example, the Google® structured data testing tool of Google Inc., to test the content of the electronic document.

Consider an example where the content validation and coding system (CVCS) is used for validating and coding content of a website of a business entity named Enviro Pools, that installs solar heating and wood burning furnaces into pools in Connecticut. The CVCS creates a local business categorized repository of schema codes using one or more collaborative schema data sources. The local business categorized repository comprises a list of schema codes relevant to a local business. The CVCS receives the website from a database of Enviro Pools. The CVCS opens the website to code and explores the categorized repository with the schema codes to determine the type of business entity. The CVCS executes a web crawler for crawling and indexing the website and content related to the website from one or more search engines and/or one or more media platforms via one or more application programming interfaces. The CVCS identifies the structured data and content in the website by performing an analysis of the crawled and indexed website and content. The CVCS writes a schema code snippet in plain text using a notepad document or a ".txt" application. The CVCS copies and pastes the schema code snippet to the website after completion.

The content validation and coding system (CVCS) creates an overall structured data tag, herein referred to as a "div tag", for the type "local business". The <div> tag is called a block element. The <div> tag starts the schema code snippet and </div> tag closes the schema code snippet. The <div> tags should be closed. A <span> tag is an inline element. The <span> tag can be used inside paragraphs or content of the website of any format. The <span> tag provides flexibility to utilize the schema code snippets that fit the content of the website to improve search engine optimization. The <span> tag should also be closed with a </span> tag. The CVCS copies a uniform resource locator (URL) of the local business schema code and pastes the URL on the notepad or a .txt application. The URL of the local business schema code is as follows:

https://schema.org/LocalBusiness

The content validation and coding system (CVCS) validates the identified content in the website of Enviro Pools based on analytic criteria. The CVCS also determines optimal schema codes from the local business categorized repository to apply the optimal schema codes to the validated content. The CVCS appropriately identifies aspects for the schema code snippets to work for the website. The CVCS generates a structured data code map of the determined optimal schema codes to be coded in the website. The CVCS codes the validated content in the website with the determined optimal schema codes using the generated structured data code map. The CVCS creates schema code snippets using optimal schema codes. The CVCS creates the <div> tag based on the identified aspects. Therefore, for the business entity, the local business tag that starts the schema code snippet is as follows:

<div itemscope=" " itemtype="http://schema.org/LocalBusiness">

An itemtype designation specifies to a search engine, for example, the Google® search engine that local business is a specific thing. An itemprop is a property of the itemtype. The content validation and coding system (CVCS) uses the <span> tag to code itemprop, as the <span> tags are used in the content of the website and also between the <div> tags. The CVCS creates a name property inside the local business schema code snippet to provide a name of the local business as follows:

```
<div itemscope="" itemtype="http://schema.org/LocalBusiness">
<span itemprop="name">Enviro Pools</span>
</div>
```

The name itemprop informs the Google® search engine that the local business is named Enviro Pools. The content validation and coding system (CVCS) adds opening hours, postal address, description, telephone, etc. The CVCS provides separate <div> tags to postal address and opening hours as follows:

```
<div itemscope="" itemtype="http://schema.org/LocalBusiness">
<p><span itemprop="name"><strong>Enviro Pools </strong></span></p>
<div itemprop="address" itemscope=""
itemtype="http://schema.org/PostalAddress"><span
itemprop="postOfficeBoxNumber">PO Box 406</span>
<p><span itemprop="addressLocality">Morris</span>, <span
itemprop="addressRegion">CT</span> <span
itemprop="postalCode">06763</span></p>
<p>Phone: <span itemprop="telephone"><a
href="tel:860-567-1228">(860) 567-
1228</a></span></p>
```

```
</div>
<p> </p>
<p><span itemprop="description">Fully Licensed</span></p>
<p><span itemprop="description">HIC: 0602724</span></p>
<p><span itemprop="description">SP1: 0282957</span> </p>
<p><span itemprop="description">ST1: 0401220</span> </p>
<p> </p>
<p><time datetime="Mo,Tu,We,Th,Fr,Sa 08:00-17:00"
itemprop="openingHours"><strong>Hours: Mon to Sat: 8AM to
5PM</strong></time></p>
</div>
```

The content validation and coding system (CVCS) can also add a schema code snippet that defines the local business' services. The CVCS intends to add all the relevant schema codes to the content of the local business website. The relevant schema codes are search terms for what the Google® search engine recognizes the websites. The CVCS uses the categorized repository for the service schema code and codes the content related to services from Enviro Pools as follows:

<div itemscope=" " itemtype="https://schema.org/Service">

The content validation and coding system (CVCS) can add a provider itemprop, a name itemprop, a serviceArea itemprop, and a description itemprop directly to the content of the website as follows:

```
<div itemscope="" itemtype="https://schema.org/Service">
<p style="text-autospace:none;"><span itemprop="provider">Enviro
Pool & Home Solutions</span> is the leading provider of <span
itemprop="name">Solar Pool Heating</span> throughout <span
itemprop="serviceArea">Northwest Connecticut and Eastern New
York</span>. This service is <span itemprop="description">an amazing
and effective way to heat your pool, save money and protect the
environment</span>. </p>
</div>
```

The provider is the name of the business entity or provider of the service. The name itemprop is the name of the actual service. The servicearea itemprop is used to identify a local region that allows search engines to identify the content of the local business website. The description itemprop is a marketing tag used to involve more keywords in the schema code snippet. The optimal schema codes and item properties allow the content validation and coding system (CVCS) to organize the website faster and allow the Google® search engine to identify the content faster, and allow web crawling.

To evaluate working of the website, an operator or the content validation and coding system (CVCS) uses a structured data testing tool provided, for example, by Google®. The structured data testing tool does not require a domain name or a verified site to evaluate the working of the website. The website should be active in a CVCS provided demo platform to validate the website. The operator copies the uniform resource locator (URL) of the web site that contains the validated content coded with the optimal schema codes, clicks fetch on the URL, and pastes the URL into an input field provided on a graphical user interface (GUI) of the structured data testing tool. The operator then clicks a validate button on the GUI of the structured data testing tool. The operator views the website's code on a window positioned, for example, at the left hand side of the GUI, and the added optimal schema codes on the right hand side of the GUI. The structured data testing tool generates a validation result. The structured data testing tool displays a phrase, for example, "all good" on the GUI to indicate an error free validation. The structured data testing tool also displays error messages on the GUI if the structured data testing tool finds errors during validation. The structured data testing tool provides a tab on the GUI for viewing the errors. The operator clicks on the tab and clicks on the errors to view the errors. The structured data testing tool displays information about the errors on the GUI. For example, a brand itemprop for a service schema code generates errors. The usage of the provider schema code for the brand itemprop eliminates the error.

The content validation and coding system (CVCS) renders the Local Business schema code snippet for Enviro Pools on the structured data testing tool as follows:

```
name: Enviro Pool & Home Solutions, LLC
description: Fully Licensed
description: HIC: 0602724
description: SP1: 0282957
description: ST1: 0401220
openingHours: Mo,Tu,We,Th,Fr,Sa 08:00-17:00
address [PostalAddress]:
postOfficeBoxNumber: PO Box 406
addressLocality: Morris
addressRegion: CT
postalCode: 06763
telephone: (860) 567-1228
```

The content validation and coding system (CVCS) renders the code of the website for identification of the content of the website by the Google® search engine. The operator clicks on a custom search result filters tab on the graphical user interface (GUI) of the structured data testing tool. The Google® search engine recognizes the code of the website for the content. The optimal schema codes show the core level of indexing of the website. From the validated and coded content of the website in this example, the Google® search engine recognizes localbusiness, administrativearea-name-northern-Connecticut, solar pool heating, etc. The CVCS renders the website of Enviro Pools to a web crawler to interpret and index the website for search engine optimization. The recognized content pushes the website's search engine optimization forward in searches on the Google® search engine.

The data input, for example, the uniform resource locator (URL) of the electronic document, to the content validation and coding system (CVCS) is transformed by the heuristically based coded algorithm as follows: The CVCS receives the URL and generates a robot.txt file that instructs the web crawler to crawl the electronic document and content related to the electronic document from one or a combination of one or more search engines and/or media platforms. The CVCS utilizes the instructions provided by the robot.txt file to allow the web crawler to visit the URL and collect the available content at the visited URL. The CVCS implements application programming interface (API) key integration to access the search engines and media platforms to collect the content related to the visited URL. The CVCS combines the content together into a document and compares the content to functions of the heuristically based coded algorithm for validation and coding as disclosed in the detailed description of FIG. 1, thereby transforming the received URL into an optimally coded electronic document. The web crawler performs caching and indexing of the crawled content based on the category of the visited URL. In an embodiment, the web crawler ranks the indexed content on the level of relevance and the order of importance. Furthermore, on determining the optimal schema codes to be applied to the validated content of the electronic document, the CVCS generates the structured data code map that defines an optimal placement of the determined optimal schema codes into the electronic document. By coding the validated content with the determined optimal schema codes within the identified structured data of the electronic document using the generated structured data code map, the CVCS transforms the received electronic document into an optimally coded electronic document that is optimized for search engines and that allows improved indexing, increased ranking, and increased visibility thereof in results provided by the search engines, thereby driving increased traffic to the optimally coded electronic document.

The method and the content validation and coding system (CVCS) disclosed herein provide an improvement in search engine optimization computer related technology as follows. The CVCS provides a repository of schema codes collectively gathered from major collaborative schema data sources. The CVCS targets the schema codes that are most relevant to businesses and their websites. The CVCS takes a massive structured data cataloging system, for example, schema.org and creates a subsystem of the massive structured data cataloging system using the structured data tags that are relevant to the business websites. The CVCS modifies structured data for businesses. The CVCS focuses on the structured data tags and indexing that business websites need, while modifying the websites for search engine optimization. The CVCS implements application programming interface (API) integration for crawling a website with major search engines and media platforms, and combines optimization between both search engines and media platforms. The method disclosed herein automates the implementation of structured data in a website and integrates with multiple search engines and media platforms under one platform, that is, the CVCS. Furthermore, the method disclosed herein optimizes websites for structured data and bridges the gap between search engines and media platforms. The CVCS allows implementation of optimal schema codes on websites by any user, without the user having to understanding the coding. The CVCS utilizes the structured data code map for defining an optimal placement of the optimal schema codes in the web site during coding of the website. The software implementation of the CVCS is an improvement in the search engine optimization computer related technology. The CVCS combines aspects of optimization between data crawled from media platforms with search engines to create a complete picture of the indexing capability of the uniform resource locator (URL) of the website.

In the method disclosed herein, the design and the flow of interactions between the content validation and coding system (CVCS), the input data source, the collaborative schema data sources, the search engines, and the media platforms are deliberate, designed, and directed. Every uniform resource locator (URL) of the electronic document received by the CVCS via a graphical user interface (GUI) provided by the CVCS is configured by the CVCS to steer the URL towards a finite set of predictable outcomes. The CVCS implements one or more specific computer programs to direct the URL towards a set of end results. The interactions designed by the CVCS allow the CVCS to integrate with application programming interfaces (APIs) of the search engines and the media platforms, collect the schema codes in a categorized repository, and collect content of the electronic document and related content from a combination of the search engines and the media platforms, and from this content, through the use of other, separate and autonomous computer programs, validate the content of the electronic document and determine the optimal schema codes to be applied within the structured data of the electronic document. This content validation and optimal schema code determination are used as triggers to code the electronic document for search engine optimization. To integrate the CVCS with the APIs of the search engines and the media platforms, create the categorized repository of schema codes using collaborative schema data sources, execute the web crawler to crawl the content of the received electronic document and the content from both search engines and media platforms via the APIs, identify the structured data and content in the received electronic document, validate the identified content, determine the optimal schema codes, generate a structured data code map, and code the validated content with the determined schema codes within the identified structured data of the received electronic document using the structured data code map requires eight or more separate computer programs and subprograms, the execution of which cannot be performed by a person using a generic computer with a generic program.

The focus of the method and the content validation and coding system (CVCS) disclosed herein is on an improvement to search engine optimization computer related functionality itself, and not on economic or other tasks for which a generic computer is used in its ordinary capacity. Accordingly, the method and the CVCS disclosed herein are not directed to an abstract idea. Rather, the method and the CVCS disclosed herein are directed to a specific improvement to the way the computing system of the CVCS operates, embodied in, for example, integrating the CVCS with the application programming interfaces (APIs) of the search engines and the media platforms, creating the categorized repository of schema codes using collaborative schema data sources, executing the web crawler to crawl the content of the received electronic document and the content from both search engines and media platforms via the APIs, combining the content crawled from both search engines and media platforms in one platform, identifying the structured data and content in the received electronic document, validating the identified content, determining the optimal schema codes, generating a structured data code map and dynamic sitemaps, coding the validated content with the determined optimal schema codes within the identified structured data of the received electronic document using the structured data code map, for example, directly into the source code of the uniform resource locator (URL) of the received electronic document, etc.

Figure 2:
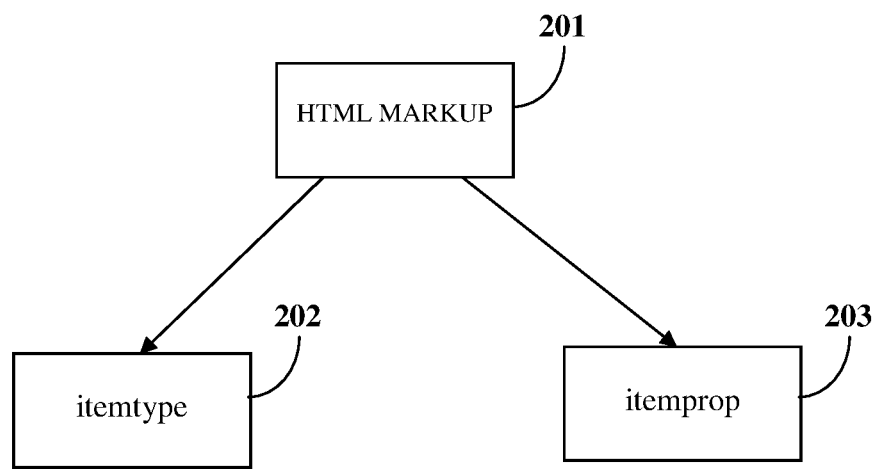
FIG. 2 illustrates a data structure diagram showing creation of structured data tags using hypertext markup language markup for generating a structured data code map.

FIG. 2 illustrates a data structure diagram showing creation of structured data tags using hypertext markup language (HTML) markup 201 for generating a structured data code map. The content validation and coding system (CVCS) creates a visual map of the relationship between the HTML markup 201 and the structured data tags as exemplarily illustrated in FIG. 2. The CVCS utilizes the schema codes in the created categorized repository as a baseline to generate the visual map and fills in the gaps during coding. The CVCS utilizes the visual map to identify locations of optimal placement for the determined optimal schema codes. The CVCS utilizes, for example, the HTML markup 201 to create the structure data tags such as itemtype 202 and itemprop 203 as exemplarily illustrated in FIG. 2, for generating the structured data code map.

Figure 3:
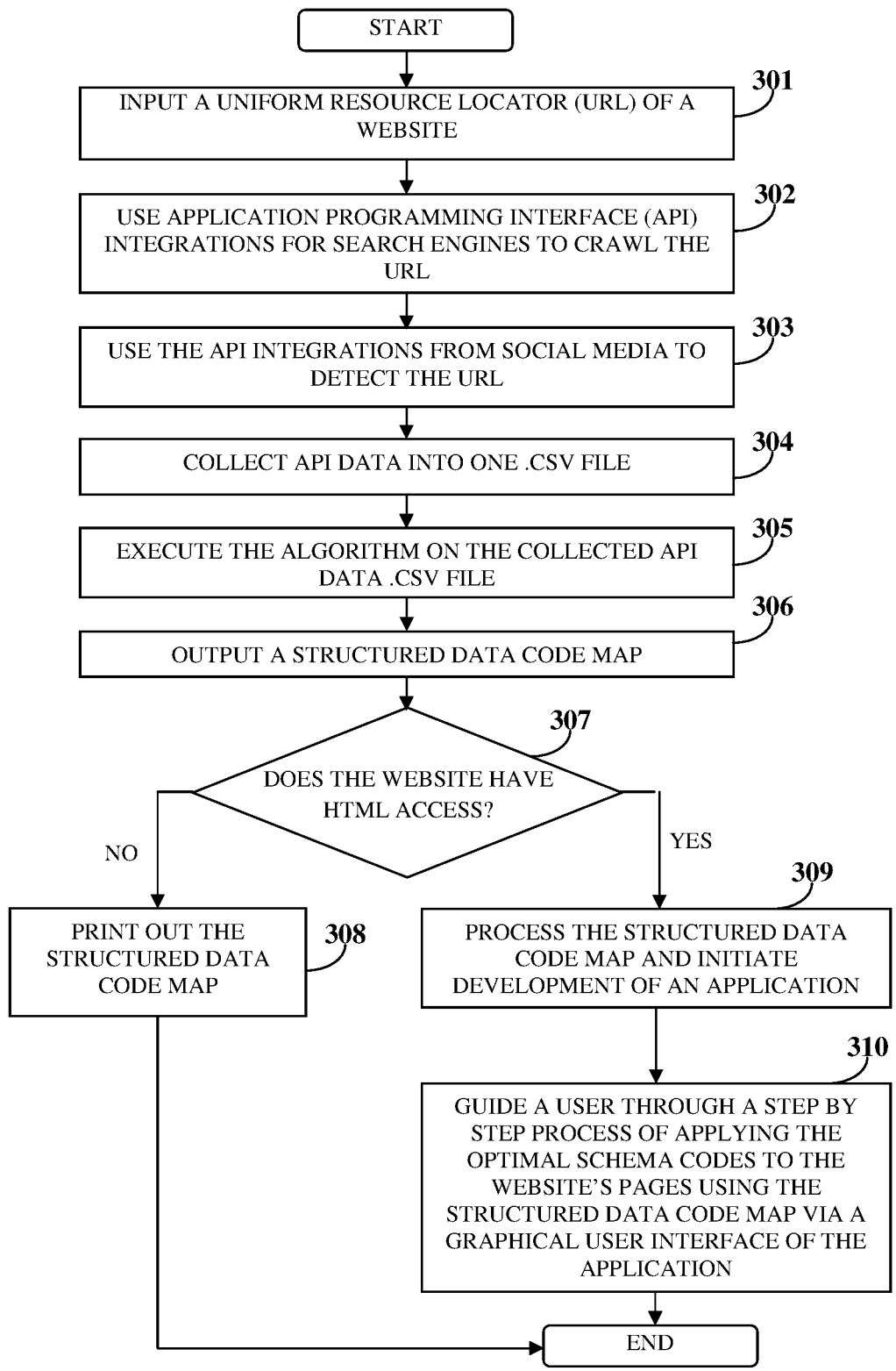
FIG. 3 exemplarily illustrates a flowchart comprising the steps performed by a content validation and coding system for validating and coding content of an electronic document for search engine optimization.

FIG. 3 exemplarily illustrates a flowchart comprising the steps performed by the content validation and coding system (CVCS) for validating and coding content of an electronic document, hereinafter referred to as a "website", for search engine optimization. The CVCS receives an input 301 of a uniform resource locator (URL) of the website. The CVCS uses 302 the application programming interface (API) integrations for search engines to crawl the URL. The CVCS uses 303 the API integrations from social media to detect the URL. The CVCS collects 304 the API data into one comma-separated values (.csv) file. The CVCS executes 305 the heuristically based coded algorithm on the collected data .csv file. The CVCS outputs 306 a structured data code map. The CVCS determines 307 whether the website has hypertext markup language (HTML) access. If the website does not have HTML access, the CVCS prints 308 the structured data code map. If the website has HTML access, the CVCS processes 309 the structured data code map and initiates development of an application. The CVCS guides 310 a user through a step by step process of applying the optimal schema codes to the website's pages using the structured data code map via a graphical user interface (GUI) of the application as disclosed in the detailed description of FIG. 1.

Figure 4:
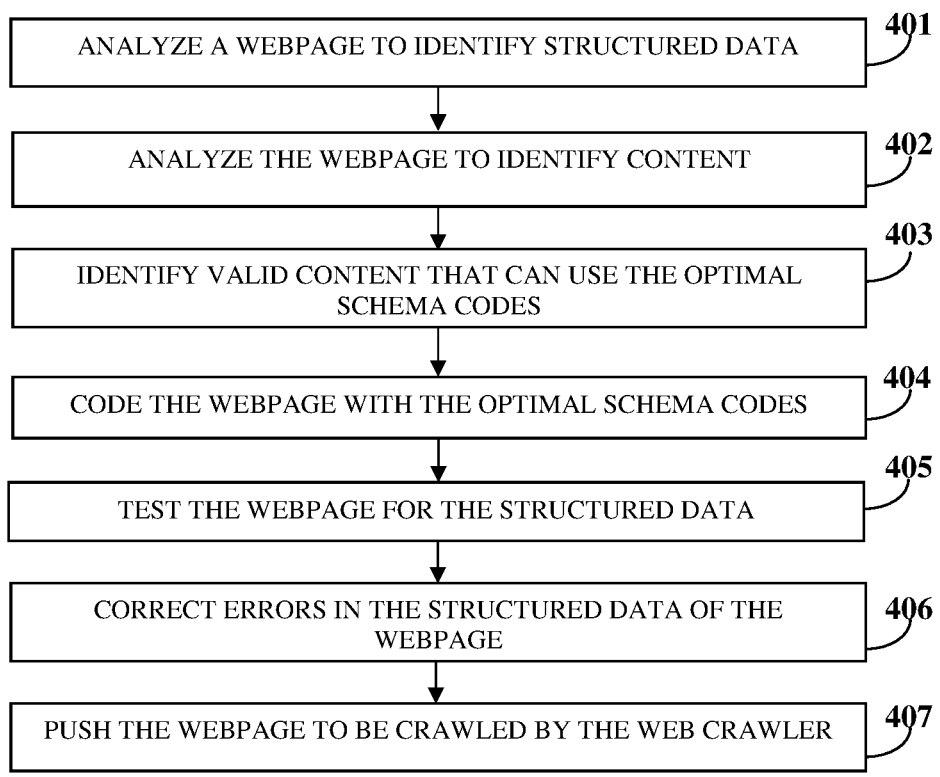
FIG. 4 exemplarily illustrates a flow diagram comprising the steps performed by the content validation and coding system for validating and coding content of an electronic document for search engine optimization.

FIG. 4 exemplarily illustrates a flow diagram comprising the steps performed by the content validation and coding system (CVCS) for validating and coding content of an electronic document, hereinafter referred to as a "website", for search engine optimization. The CVCS analyzes 401 a webpage of the website to identify structured data. The CVCS analyzes 402 the webpage of the website to identify content of the webpage. The CVCS identifies 403 valid content that can use the optimal schema codes. The CVCS determines relevant schema codes that can be applied to the identified content, for businesses in terms of optimization and indexing. The CVCS codes 404 the webpage with the optimal schema codes. The CVCS tests 405 the webpage for the structured data. The CVCS corrects 406 errors detected in the structured data of the webpage after testing the webpage. The CVCS pushes 407 the website to be crawled, for example, by the web crawler using the robot.txt file as disclosed in the detailed description of FIG. 1.

FIGS. 5A-5F exemplarily illustrate screenshots of a graphical user interface (GUI) 501 provided by the content validation and coding system (CVCS) for validating and coding content of a website for search engine optimization. Consider an example where a website identified by a uniform resource locator (URL), www.metasenseusa.com, is to be validated and coded by the CVCS. The CVCS renders a GUI 501 for entering the URL of the website as exemplarily illustrated in FIG. 5A. A user inputs the URL "www.metasenseusa.com" into an input field 502 on the GUI 501 as exemplarily illustrated in FIG. 5B, and clicks a "run test" button 503 provided on the GUI 501. The CVCS executes the web crawler to crawl the URL. The web crawler crawls, parses, and indexes content, for example, text on the website and content related to the website from one or more search engines and/or one or more media platforms via one or more application programming interfaces (APIs). The CVCS identifies the structured data and the content in the code present on the website by analyzing the crawled and indexed content. For example, the CVCS identifies offers and services as content relevant to the business.

Figure 5A:
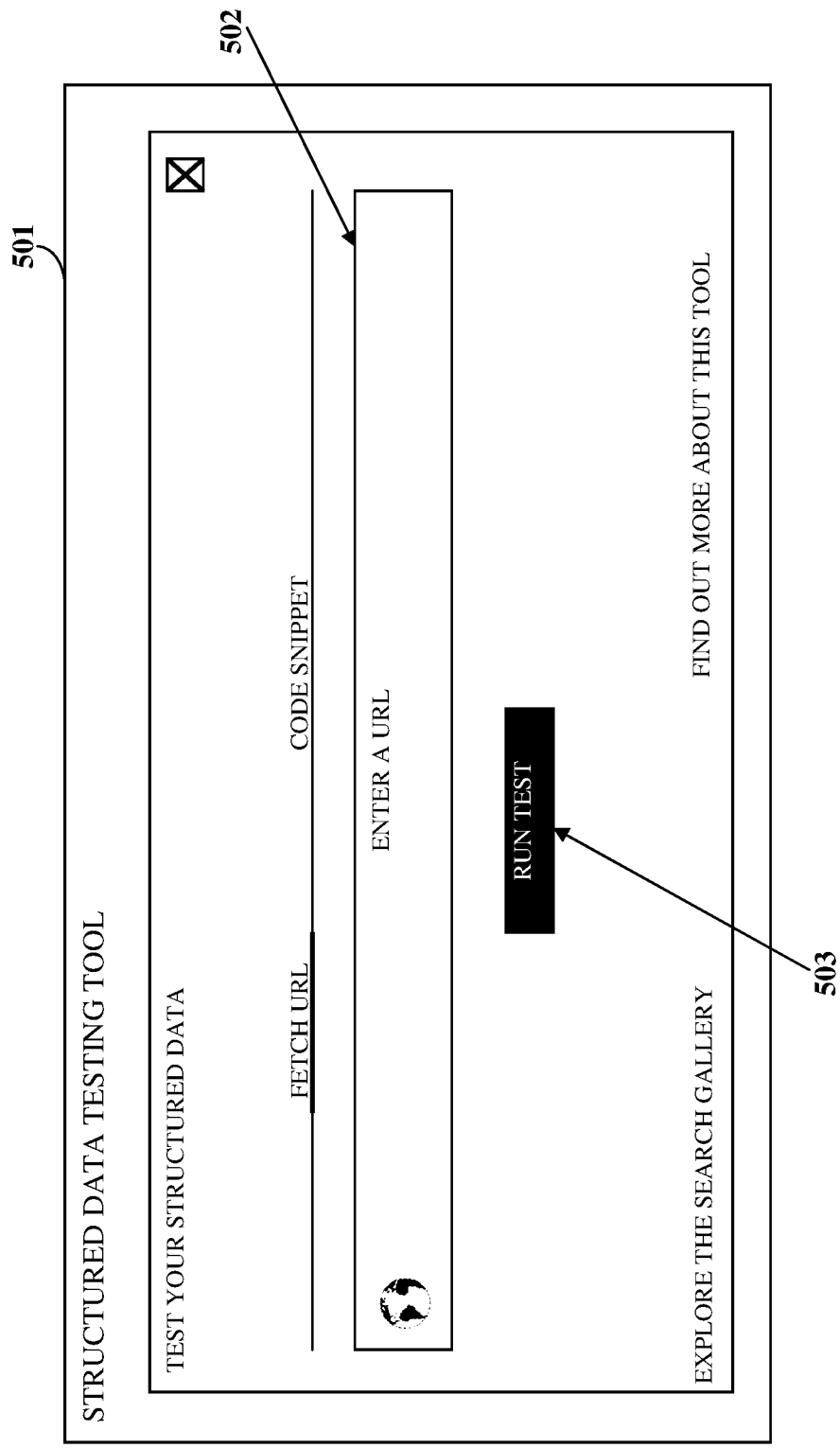
FIGS. 5A-5F exemplarily illustrate screenshots of a graphical user interface provided by the content validation and coding system for validating and coding content of a website for search engine optimization.
Figure 5B:
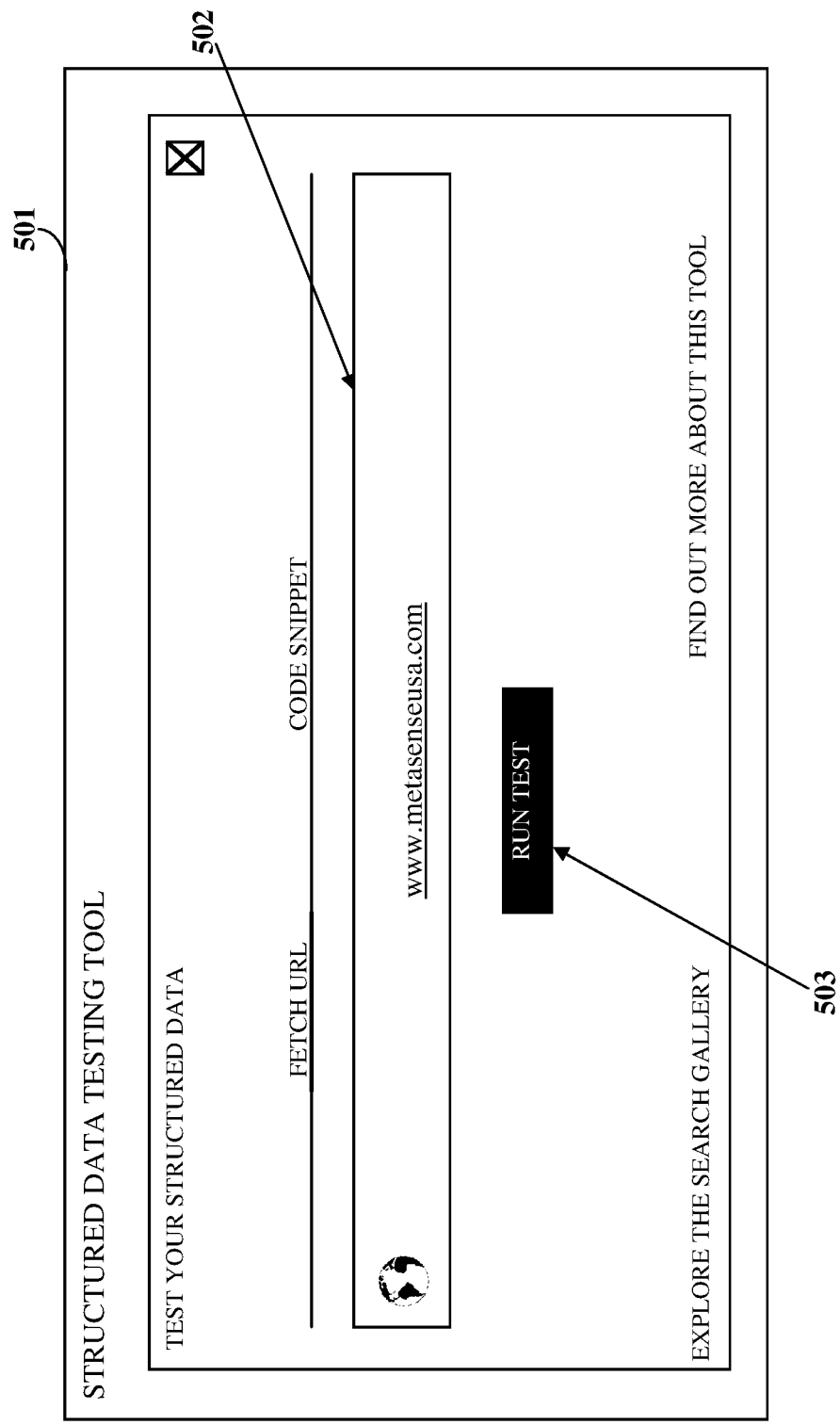
Figure 5C:
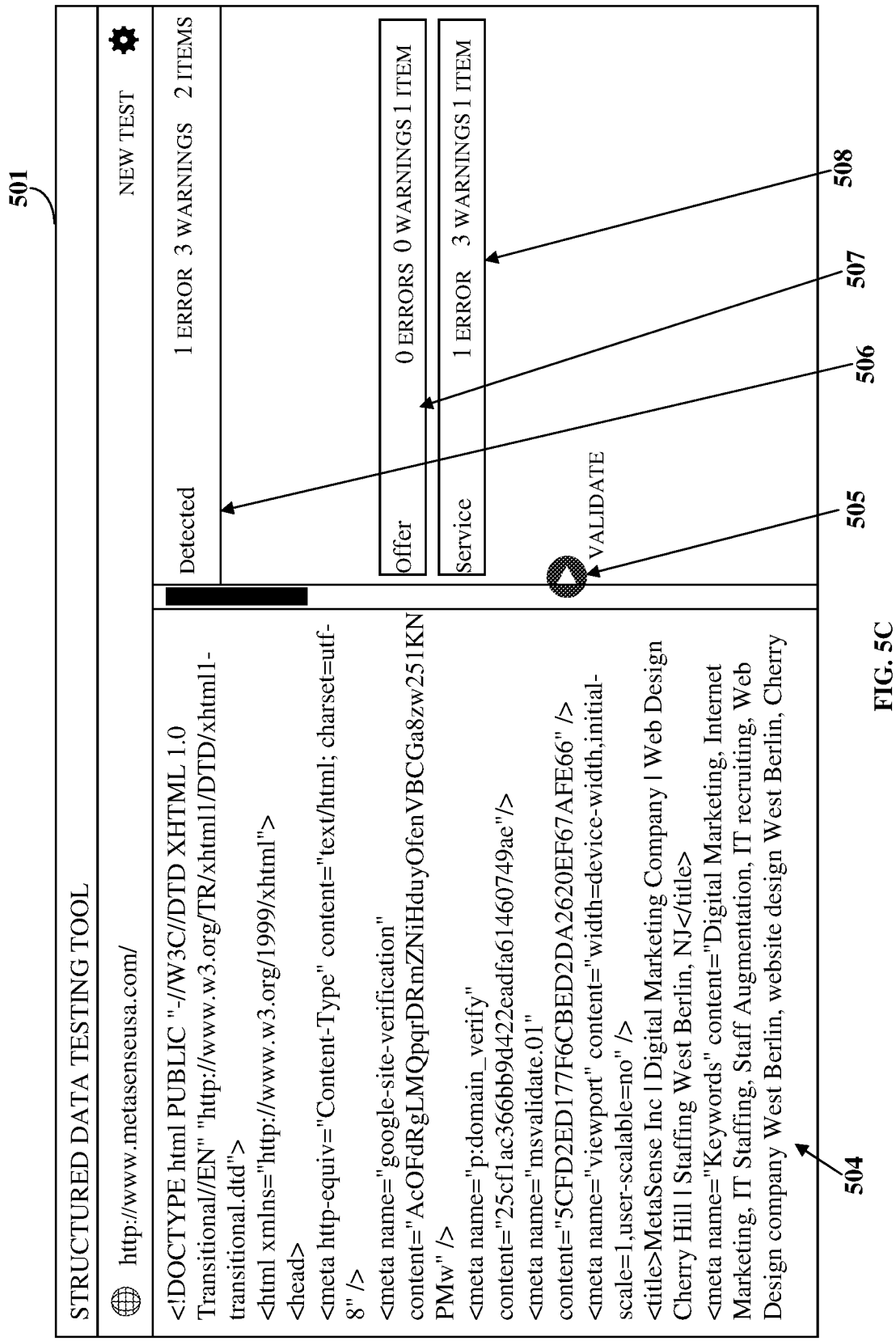
Figure 5D:
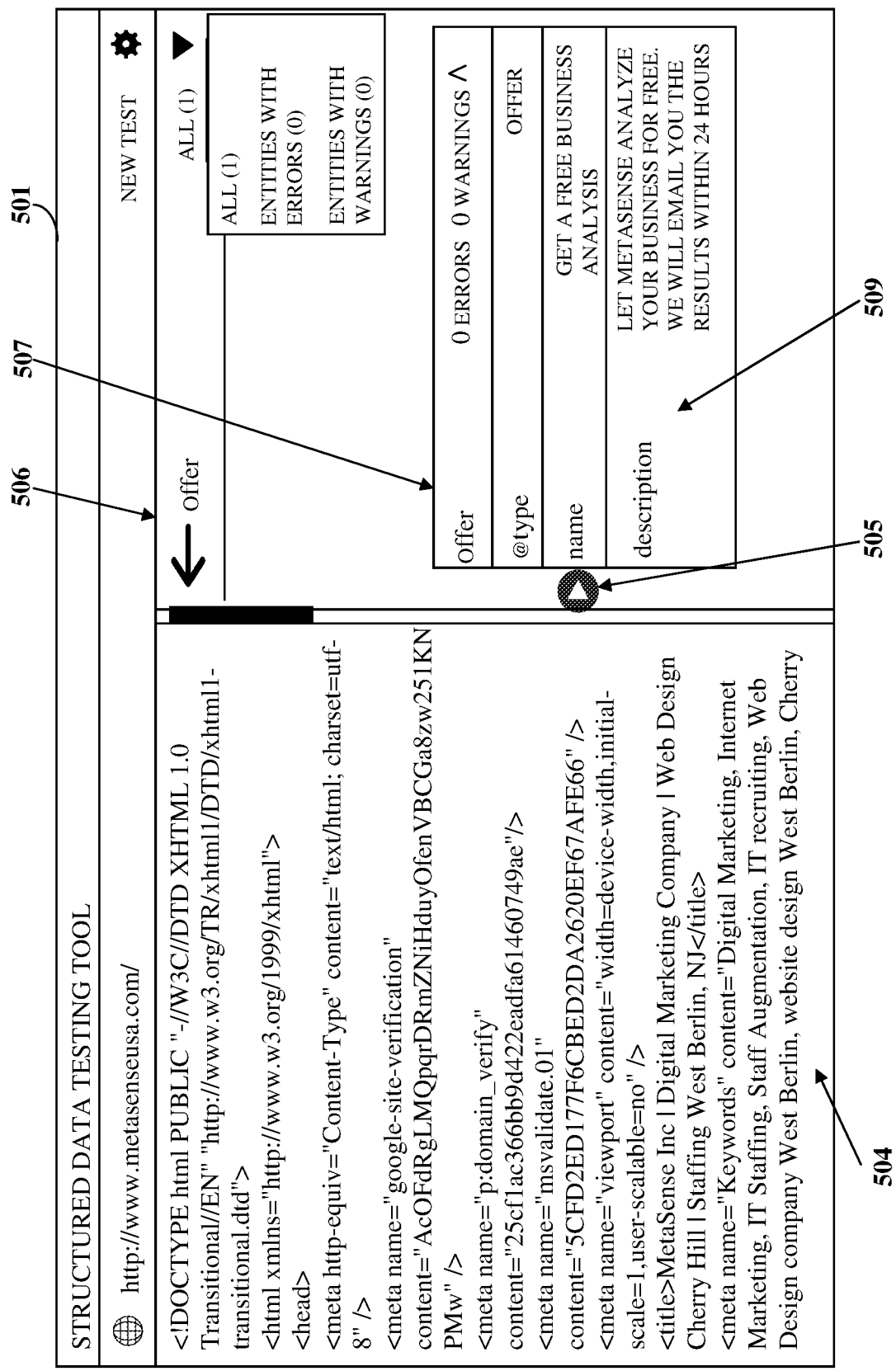
Figure 5E:
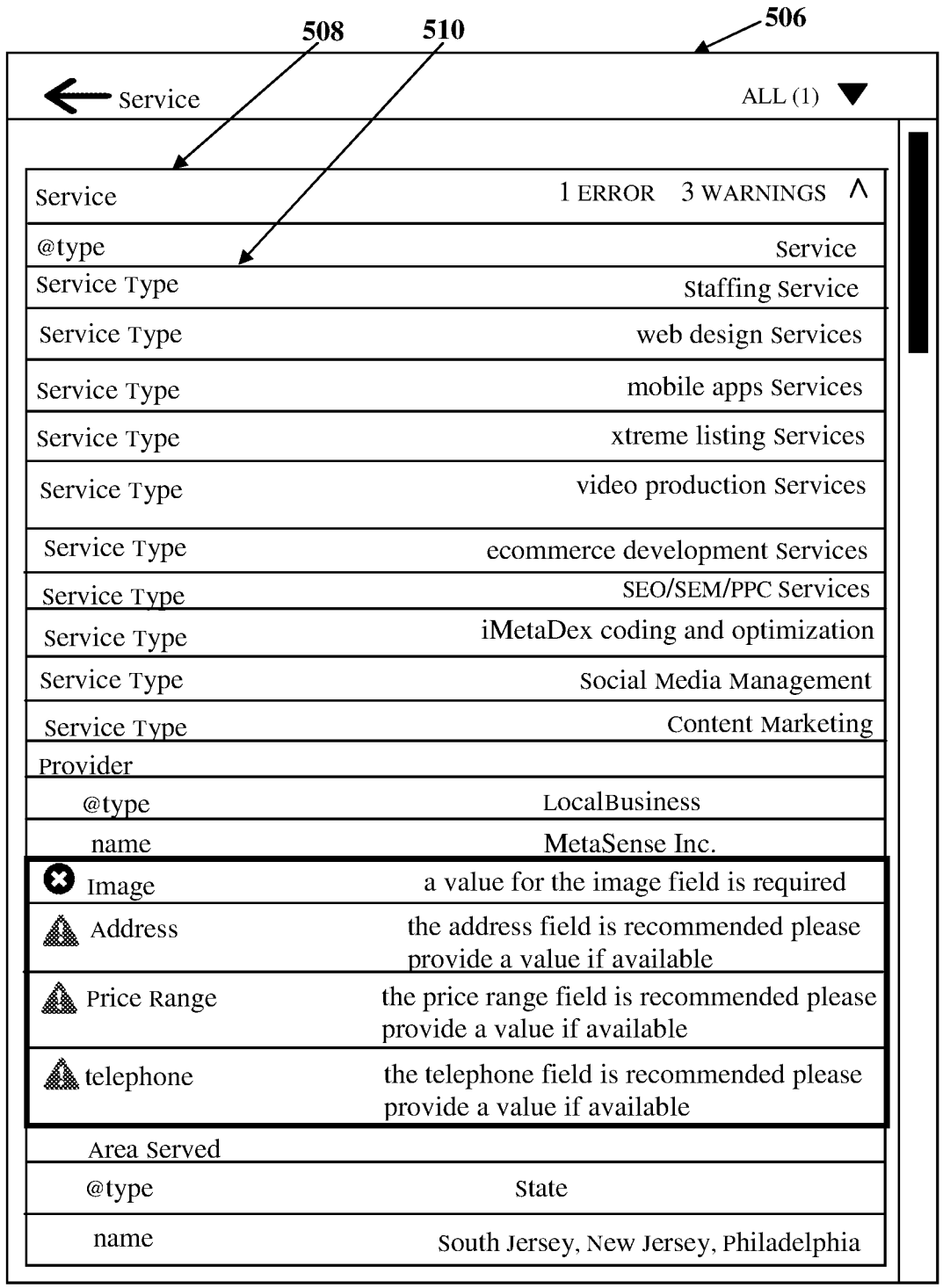
Figure 5F:
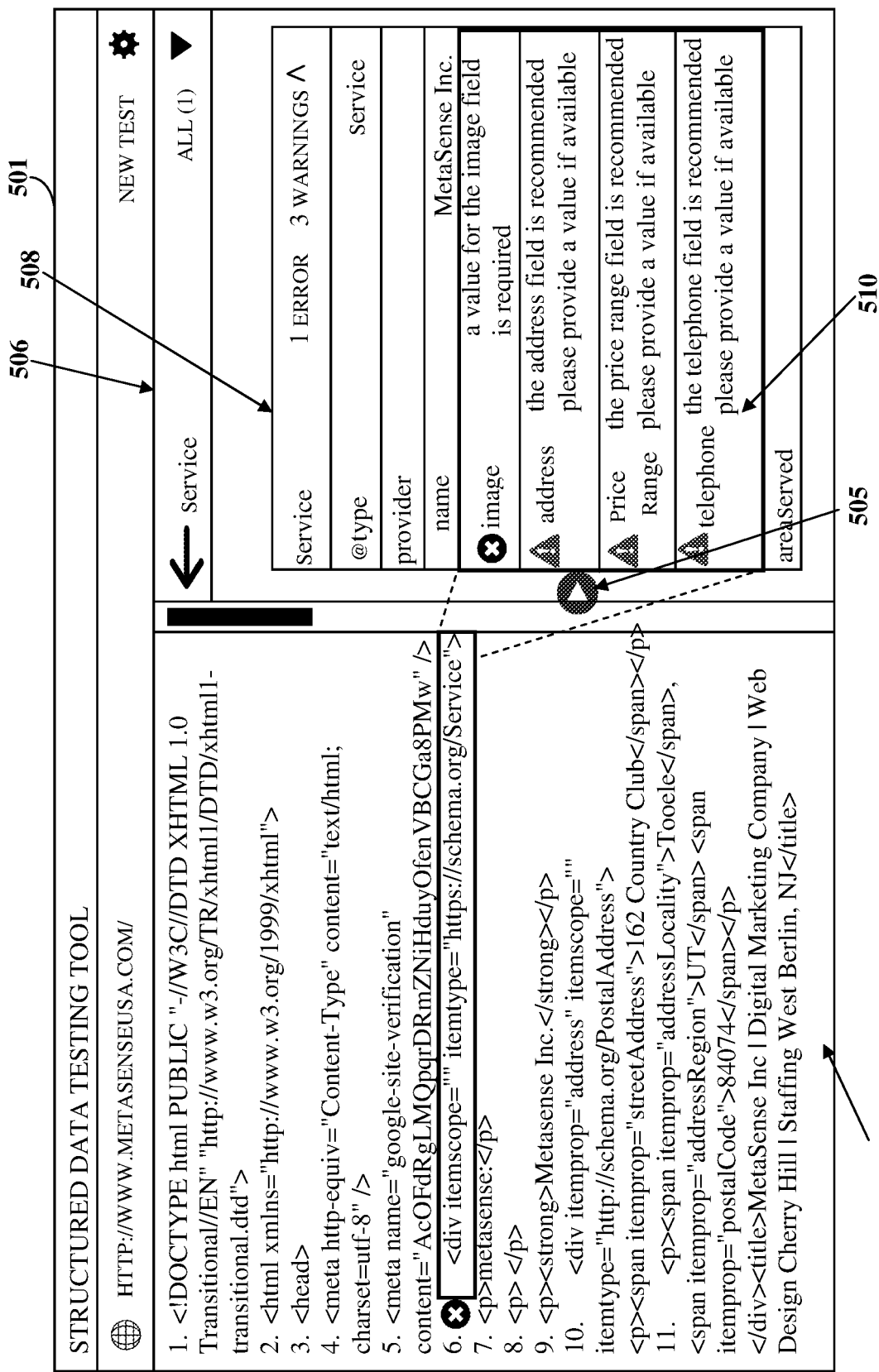

The content validation and coding system (CVCS) displays the identified structured data and content of the website in a code section 504 of the graphical user interface (GUI) 501 as exemplarily illustrated in FIG. 5C. When the user clicks a validate button 505 provided by the CVCS on the GUI 501, the CVCS validates the identified content and identifies errors in the structured data of the website. In this example, the CVCS identified no errors in the structured data related to offers of the website and at least one error in the structured data related to services of the website. The CVCS renders an offer panel 507 and a service panel 508 in a test result section 506 of the GUI 501 as exemplarily illustrated in FIG. 5C, for displaying the results of the validation performed by the CVCS. When the user clicks on the offer panel 507 in the test result section 506 of the GUI 501, the CVCS displays an offer schema code 509 comprising the structured data and content related to the offers of the website on the GUI 501 as exemplarily illustrated in FIG. 5D. When the user clicks on the service panel 508 in the test result section 506 of the GUI 501 exemplarily illustrated in FIG. 5C, the CVCS displays the errors identified in the structured data related to the services of the website on the GUI 501 as exemplarily illustrated in FIG. 5E. When the user clicks on the identified errors displayed on the service panel 508 in the test result section 506 of the GUI 501, the CVCS indicates the code associated with the identified errors in the code section 504 of the GUI 501 as exemplarily illustrated in FIG. 5F. The CVCS indicates the location of the identified errors that have to be corrected, in the code section 504. In an example, the CVCS identified that an image field in the structured data related to the services of the website requires a value. When the user clicks on the image item property displayed on the service panel 508 in the test result section 506 of the GUI 501, the CVCS indicates the code associated with the image field in the code section 504 of the GUI 501 as exemplarily illustrated in FIG. 5F. In an embodiment, the CVCS allows the user to enter a value for the image field directly into the code of the website.

The content validation and coding system (CVCS) executes the heuristically based coded algorithm on the content collected from the website, the search engines, and the media platforms, and searches for specific tags, referred as "optimal schema codes", from the categorized repository of schema codes and/or the dynamically generated supplementary schema codes, that the CVCS deems as needed for coding the offers and the services of the website. As the CVCS found a free analysis offer on the website, the CVCS determined an offer schema code 509 to be coded into the content of the website, within the identified structured data. Furthermore, as the CVCS found a description of services on the website, the CVCS determined a service schema code 510 to be coded into the content of the website, within the identified structured data. The CVCS generates a structured data code map of the offer schema code 509 and the service schema code 510 to be coded into the content of the website for defining an optimal placement of the offer schema code 509 and the service schema code 510 in the website. The CVCS then codes the validated content with the offer schema code 509 and the service schema code 510 within the identified structured data of the website using the generated structured data code map for search engine optimization. The CVCS then renders the offer schema code 509 and the service schema code 510 on the website and republishes the website with the active offer schema code 509 and the active service schema code 510 to improve indexing of the website, increase the ranking of the website, and increase visibility and awareness of the website in results provided by search engines, thereby driving traffic to the website.

FIG. 6A exemplarily illustrates a screenshot of a website 601 input into the content validation and coding system (CVCS) for validating and coding content of the website 601 for search engine optimization. Consider an example where a website 601 identified by a uniform resource locator (URL), www.myubb.com, is to be validated and coded by the CVCS. The domain authority and the page authority of the website 601 are 0 immediately after development of the website 601 and prior to validation and coding of the website 601 by the CVCS.

Figure 6B:
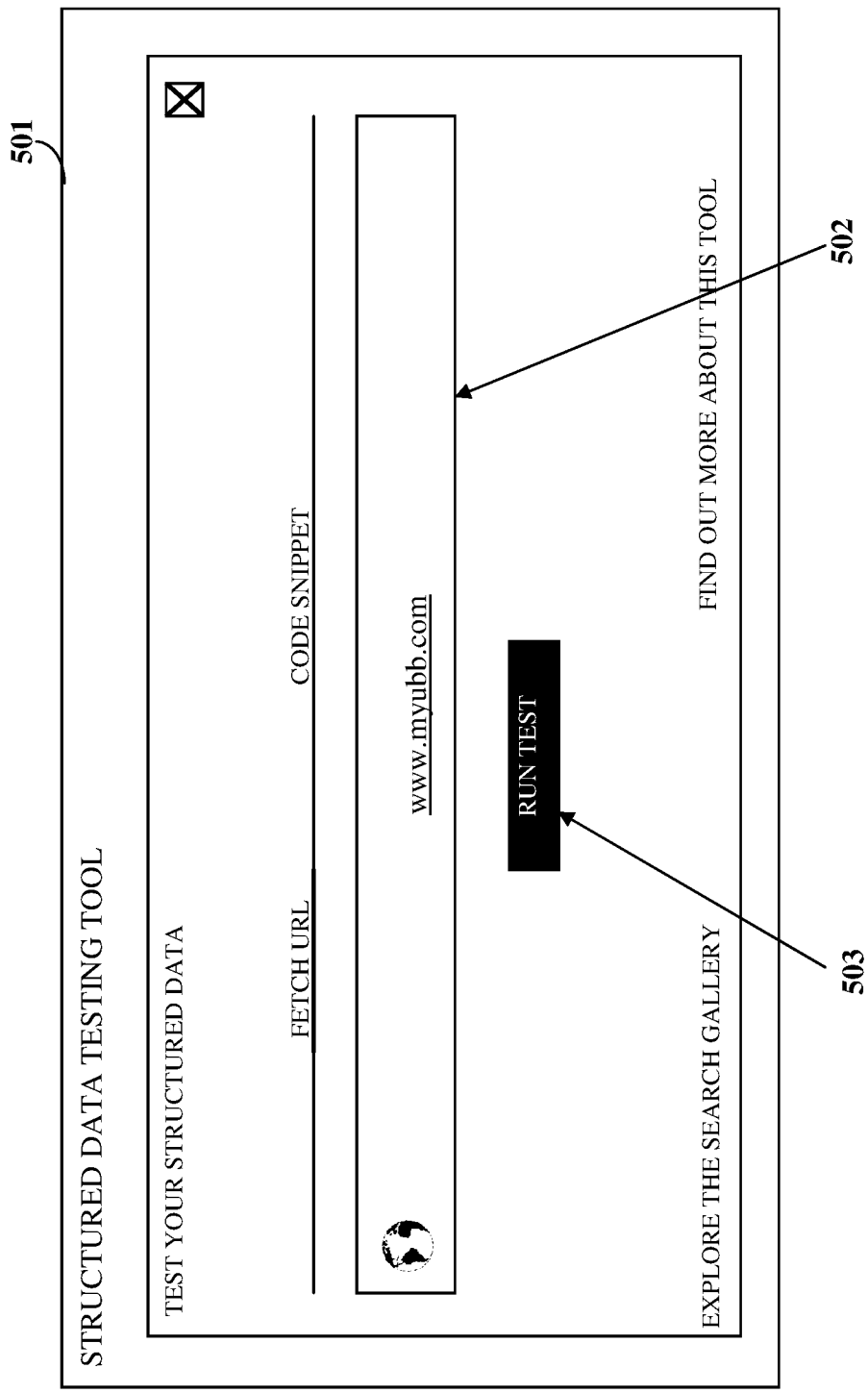
FIGS. 6B-6D exemplarily illustrate screenshots of a graphical user interface provided by the content validation and coding system for validating and coding content of the website shown in FIG. 6A, for search engine optimization.
Figure 6C:
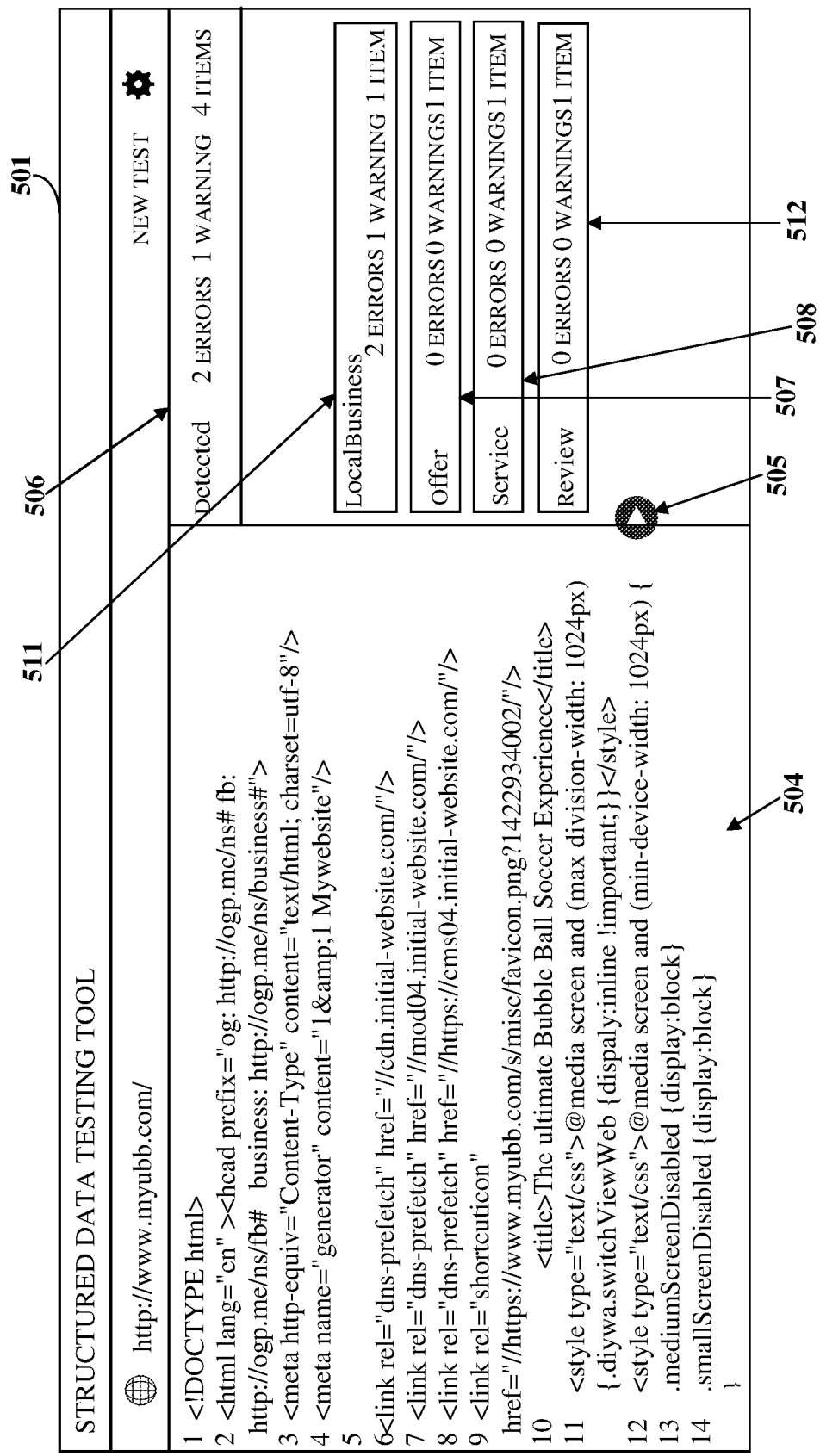
Figure 6D:
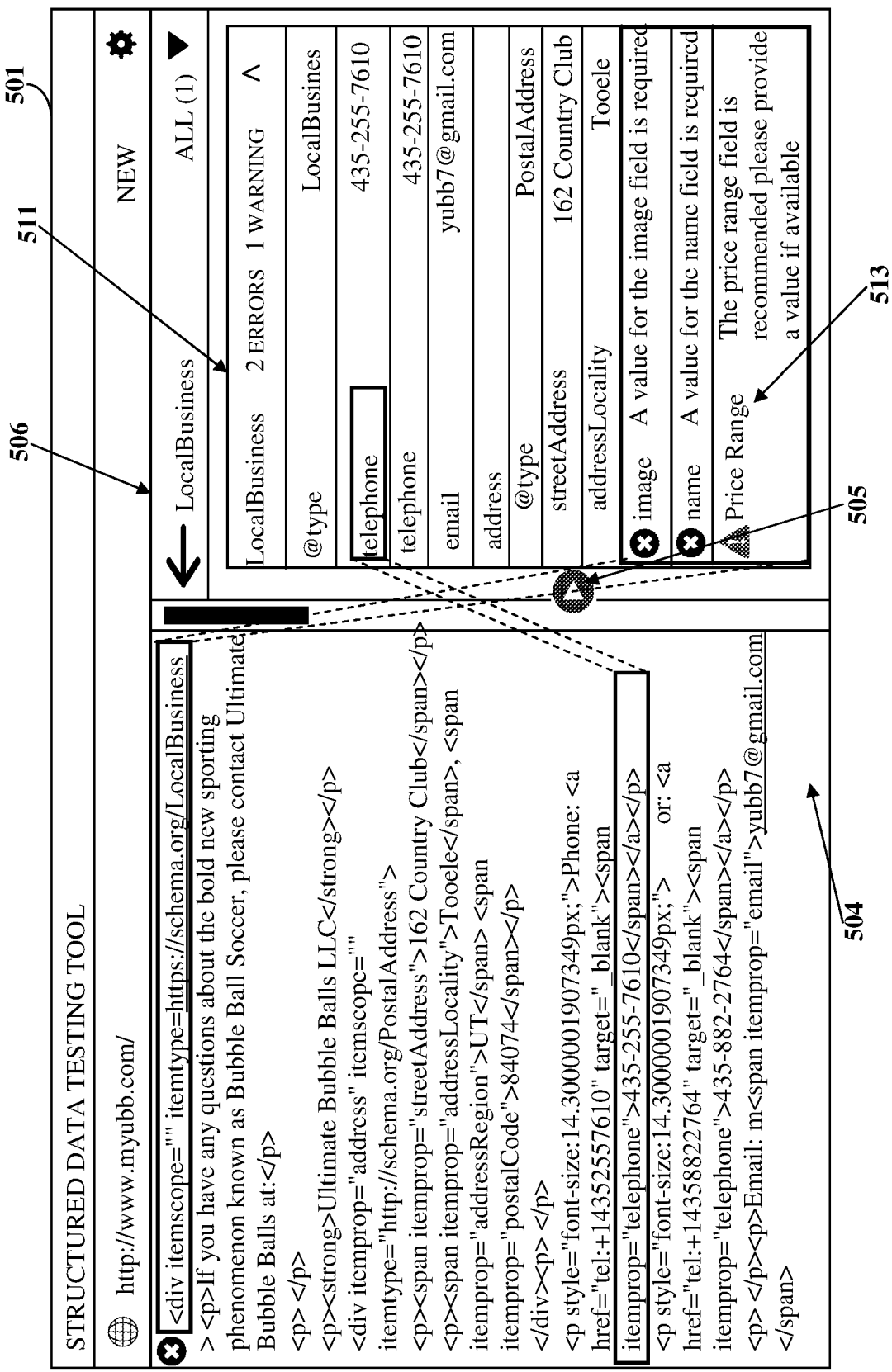

FIGS. 6B-6D exemplarily illustrate screenshots of a graphical user interface (GUI) 501 provided by the content validation and coding system (CVCS) for validating and coding content of the website 601 shown in FIG. 6A, for search engine optimization. A user inputs the URL "www.myubb.com" into an input field 502 on the GUI 501 as exemplarily illustrated in FIG. 6B, and clicks a "run test" button 503 provided on the GUI 501. The CVCS executes the web crawler to crawl the URL. The web crawler crawls, parses, and indexes content, for example, text on the website 601 and content related to the website 601 from one or more search engines and/or one or more media platforms via one or more application programming interfaces (APIs). The CVCS identifies the structured data and the content in the code present on the website 601 by analyzing the crawled and indexed content. For example, the CVCS identifies business type, offers, services, and reviews as content relevant to the business. The CVCS displays the identified structured data and content of the website 601 in the code section 504 of the GUI 501 as exemplarily illustrated in FIG. 6C. When the user clicks the validate button 505 provided by the CVCS on the GUI 501, the CVCS validates the identified content and identifies errors in the structured data of the website 601. In this example, the CVCS identified no errors in the structured data related to offers, services, and reviews of the website 601 and at least two errors in the structured data related to a local business of the website 601. The CVCS renders a local business panel 511, an offer panel 507, a service panel 508, and a review panel 512 in the test result section 506 of the GUI 501 as exemplarily illustrated in FIG. 6C, for displaying the results of the validation performed by the CVCS. In an embodiment, the CVCS allows the user to fix the errors in the structured data related to the local business of the website 601 directly into the code of the website 601.

When the user clicks on the local business panel 511 in the test result section 506 of the GUI 501, the content validation and coding system (CVCS) displays the item properties of a local business schema code 513 without errors and with errors identified in the structured data related to the local business of the website 601 on the GUI 501 as exemplarily illustrated in FIG. 6D. When the user clicks on an item property without errors displayed on the local business panel 511 in the test result section 506 of the GUI 501, the CVCS indicates the code associated with the clicked item property in the code section 504 of the GUI 501 as exemplarily illustrated in FIG. 6D. In this example, when the user clicks on the item property "telephone", the CVCS indicates the location of the clicked item property with a value "435-255-7610" in the code section 504 of the GUI 501 as exemplarily illustrated in FIG. 6D. When the user clicks on the identified errors displayed on the local business panel 511 in the test result section 506 of the GUI 501, the CVCS indicates the code associated with the identified errors in the code section 504 of the GUI 501 as exemplarily illustrated in FIG. 6D. The CVCS indicates the location of the errors that have to be corrected in the code section 504. In this example, the CVCS indicates that an image field, a name field, and a price range field in the structured data related to the local business require values. In an embodiment, the CVCS allows the user to enter values for the image field, the name field, and the price range field directly into the code of the website 601.

The content validation and coding system (CVCS) executes the heuristically based coded algorithm on the content collected from the website 601, the search engines, and the media platforms, and searches for specific tags, referred as "optimal schema codes", from the categorized repository of schema codes and/or the dynamically generated supplementary schema codes that the CVCS deems as needed for coding the local business, offers, services, and reviews of the website 601. The CVCS generates a structured data code map of the optimal schema codes to be coded into the content of the website 601 for defining an optimal placement of the optimal schema codes in the website 601. The CVCS then codes the validated content with the optimal schema codes within the identified structured data of the website 601 using the generated structured data code map for search engine optimization. The CVCS adds the optimal schema codes to business type, offers, services, and reviews of the website 601, by tagging business type, offers, services, and reviews of the website 601 using structured data tags. The CVCS then renders the optimal schema codes on the website 601 and republishes the website 601 with the active optimal schema codes to improve indexing of the website 601, increase the ranking of the website 601, and increase visibility and awareness of the website 601 in results provided by search engines, thereby driving traffic to the website 601.

Figure 7:
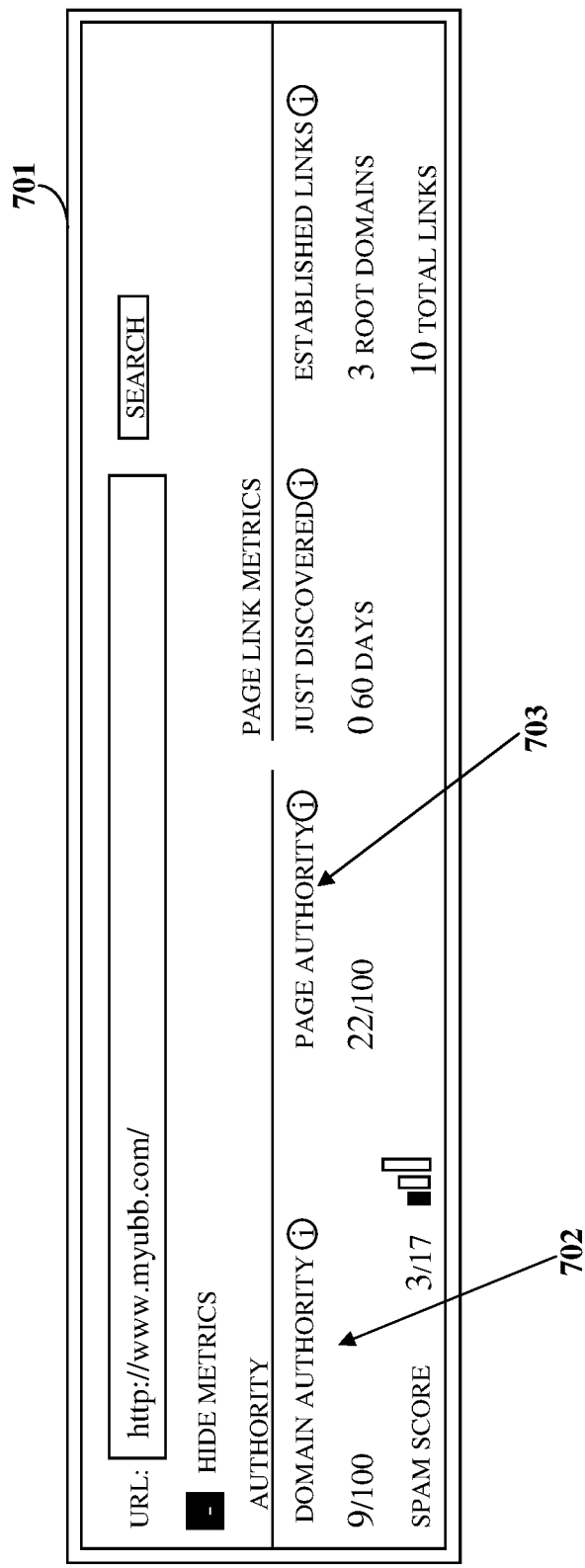
FIG. 7 exemplarily illustrates a screenshot of a graphical user interface, showing performance metrics of the website shown in FIG. 6A, that is validated and coded by the content validation and coding system.

FIG. 7 exemplarily illustrates a screenshot of a graphical user interface (GUI) 701, showing performance metrics of the website 601 shown in FIG. 6A, that is validated and coded by the content validation and coding system (CVCS). As exemplarily illustrated in FIG. 7, the performance metrics illustrate that the domain authority 702 has increased from 0 to 9 and the page authority 703 has increased from 0 to 22. The CVCS impacts user, usage, and traffic query data of the website 601.

Figure 8A:
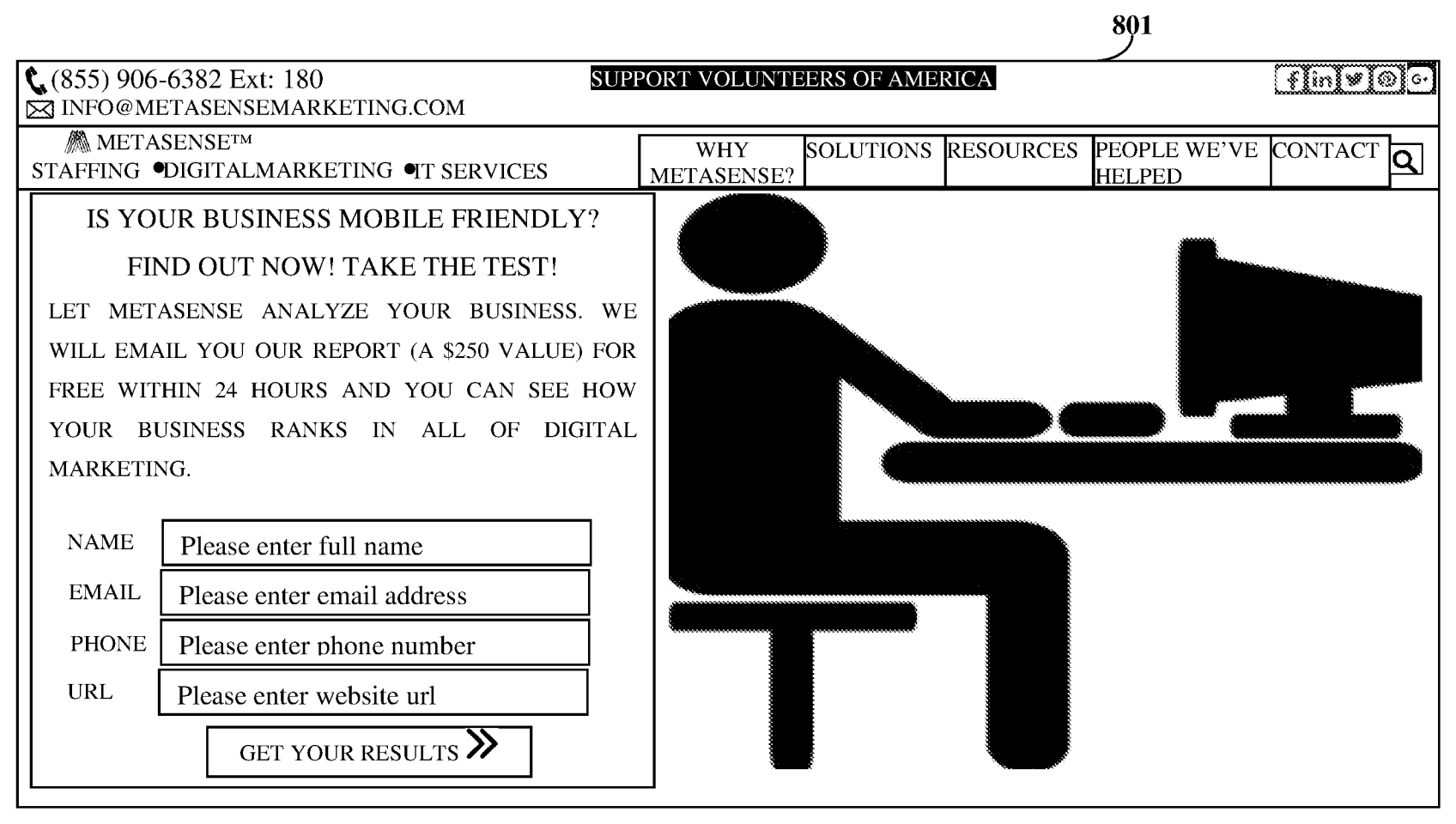
Figure 8B:
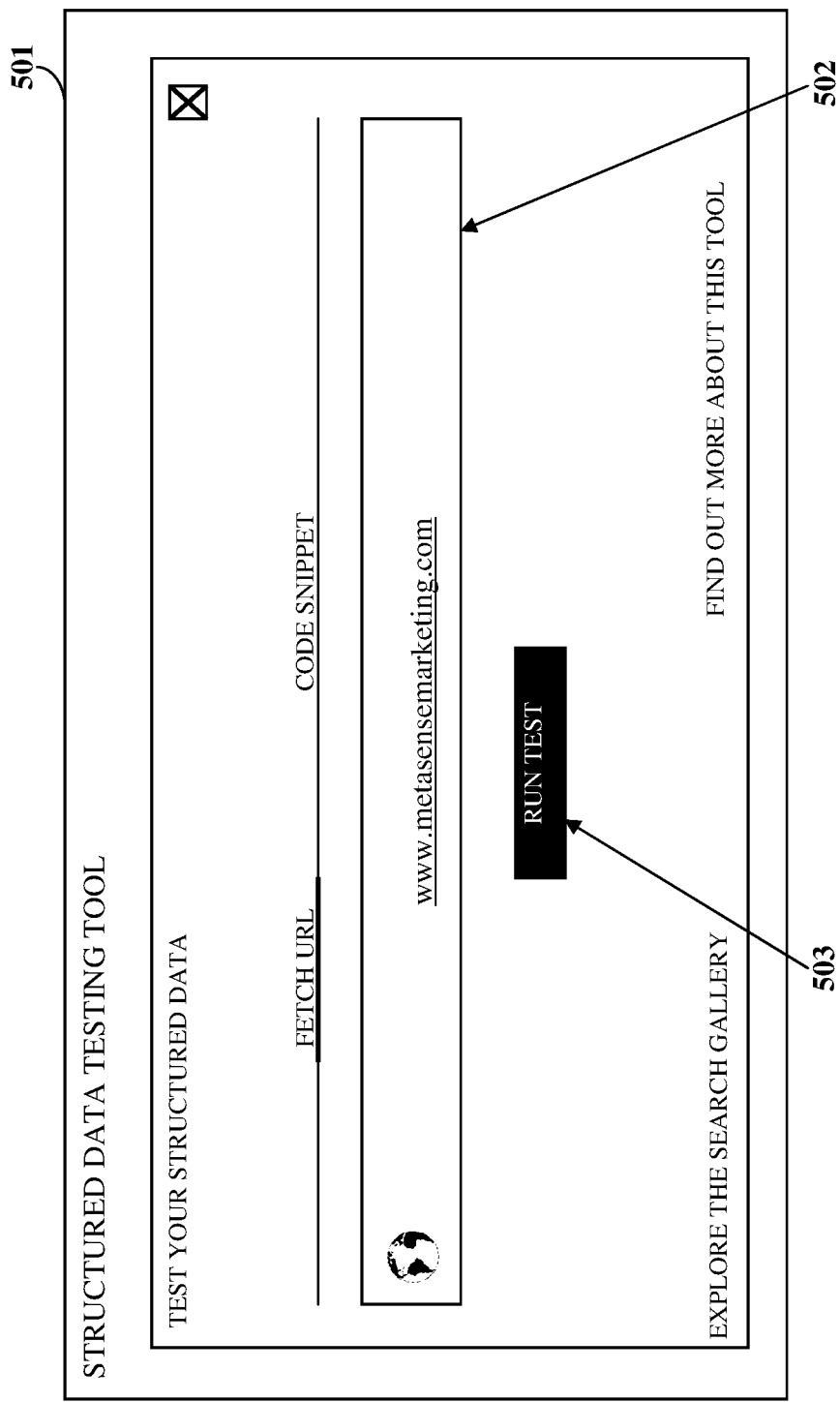

FIG. 8A exemplarily illustrates a screenshot of a website 801 validated and coded by the content validation and coding system (CVCS) for search engine optimization. Consider an example where a website 801 identified by a uniform resource locator (URL), www.metasensemarketing.com, is validated and coded by the CVCS. The domain authority and the page authority of the website 801 are 0 immediately after development of the website 801 and prior to validation and coding of the website 801 by the CVCS. The CVCS validates and codes the content of the website 801 using optimal schema codes determined as disclosed in the detailed description of FIG. 1. The CVCS tests the validated and coded website 801 via the graphical user interface 501 provided by the CVCS as exemplarily illustrated in FIG. 8B.

FIGS. 8B-8F exemplarily illustrate screenshots of the graphical user interface (GUI) 501 provided by the content validation and coding system (CVCS) for testing the validated and coded website 801 shown in FIG. 8A, for search engine optimization. A user inputs the URL "www.metasensemarketing.com" into an input field 502 on the GUI 501 as exemplarily illustrated in FIG. 8B, and clicks a "run test" button 503 provided on the GUI 501. The CVCS executes the web crawler to crawl the URL. The web crawler crawls, parses, and indexes content, for example, text on the validated and coded website 801 and content related to the validated and coded website 801 from one or more of the search engines and/or one or more of the media platforms via one or more application programming interfaces (APIs). The CVCS identifies the structured data and the content in the code present on the validated and coded website 801 by analyzing the crawled and indexed content. For example, the CVCS identifies an article on the validated and coded website 801.

Figure 8C:
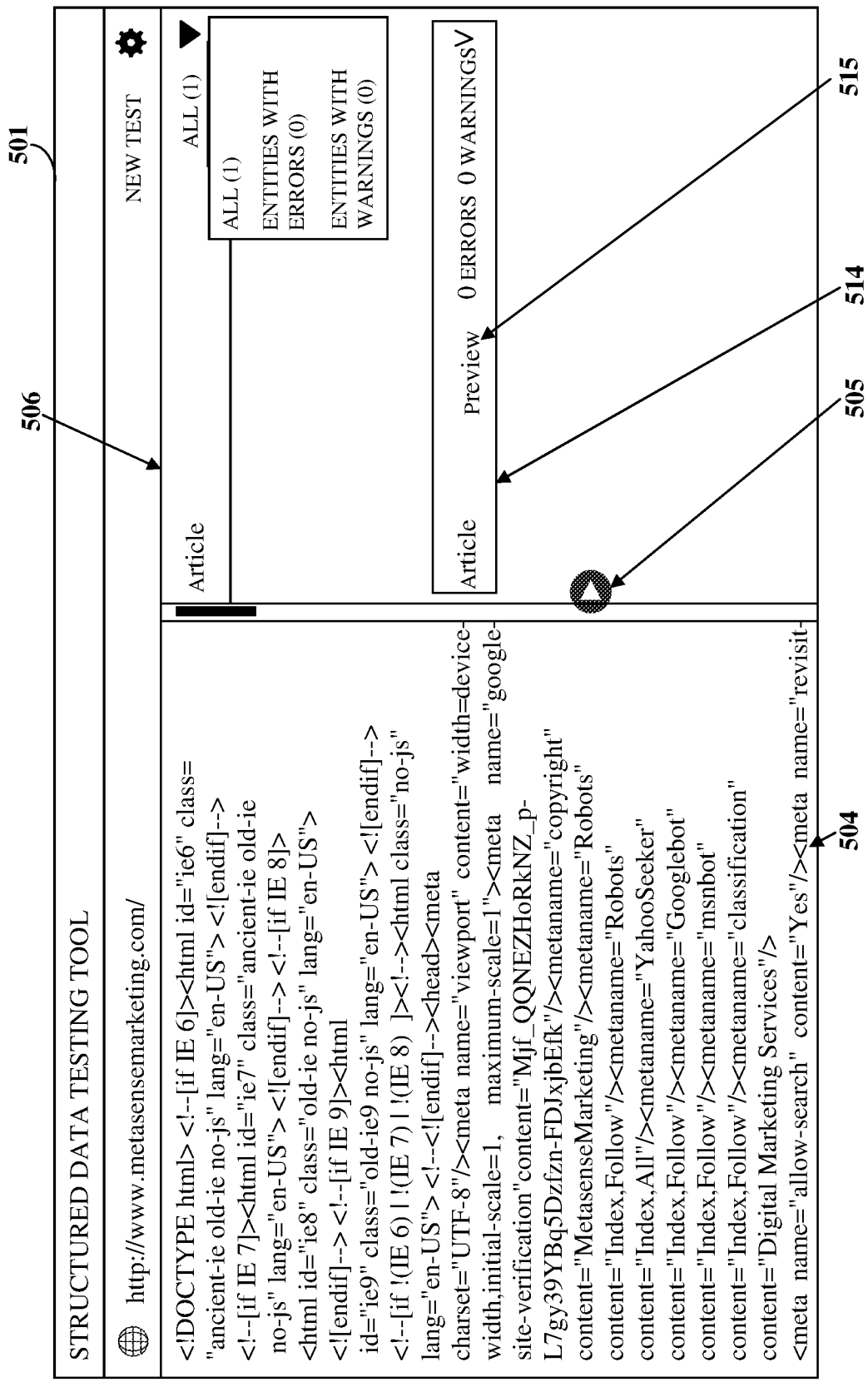

The content validation and coding system (CVCS) displays the identified structured data and content of the website 801 in the code section 504 of the graphical user interface (GUI) 501 as exemplarily illustrated in FIG. 8C. When the user clicks the validate button 505 provided by the CVCS on the GUI 501, the CVCS validates the identified content and identifies errors in the structured data of the validated and coded website 801. In this example, the CVCS identified no errors in the structured data related to the article of the validated and coded website 801. The CVCS renders an article panel 514 in the test result section 506 of the GUI 501 as exemplarily illustrated in FIG. 8D, for displaying the results of the validation performed by the CVCS. The optimal schema codes implemented on the website 801 are exemplarily illustrated in FIG. 8D. The CVCS backlinks the code to the search engine optimization service of the CVCS.

The content validation and coding system (CVCS) executes the heuristically based coded algorithm on the content collected from the website 801, the search engines, and the media platforms, and searches for specific tags, referred as "optimal schema codes", from the categorized repository of schema codes and/or the dynamically generated supplementary schema codes that the CVCS deems as needed for coding the article of the website 801. As the CVCS found required content for the article on the website 801, the CVCS determined an article schema code 516 to be coded into the content of the website 801, within the identified structured data. The CVCS generates a structured data code map of the article schema code 516 to be coded in the website 801 for defining an optimal placement of the article schema code 516 in the website 801. The CVCS then codes the validated content with the article schema code 516 within the identified structured data of the website 801 using the generated structured data code map for search engine optimization. The CVCS then renders the article schema code 516 on the website 801 and republishes the website 801 with the active article schema code 516. By validating and coding the content of the website 801 exemplarily illustrated in FIG. 8A, free of errors, the CVCS improves indexing of the website 801, increases the ranking of the website 801, and increases visibility and awareness of the website 801 in results provided by search engines, thereby driving traffic to the website 801.

Figure 8D:
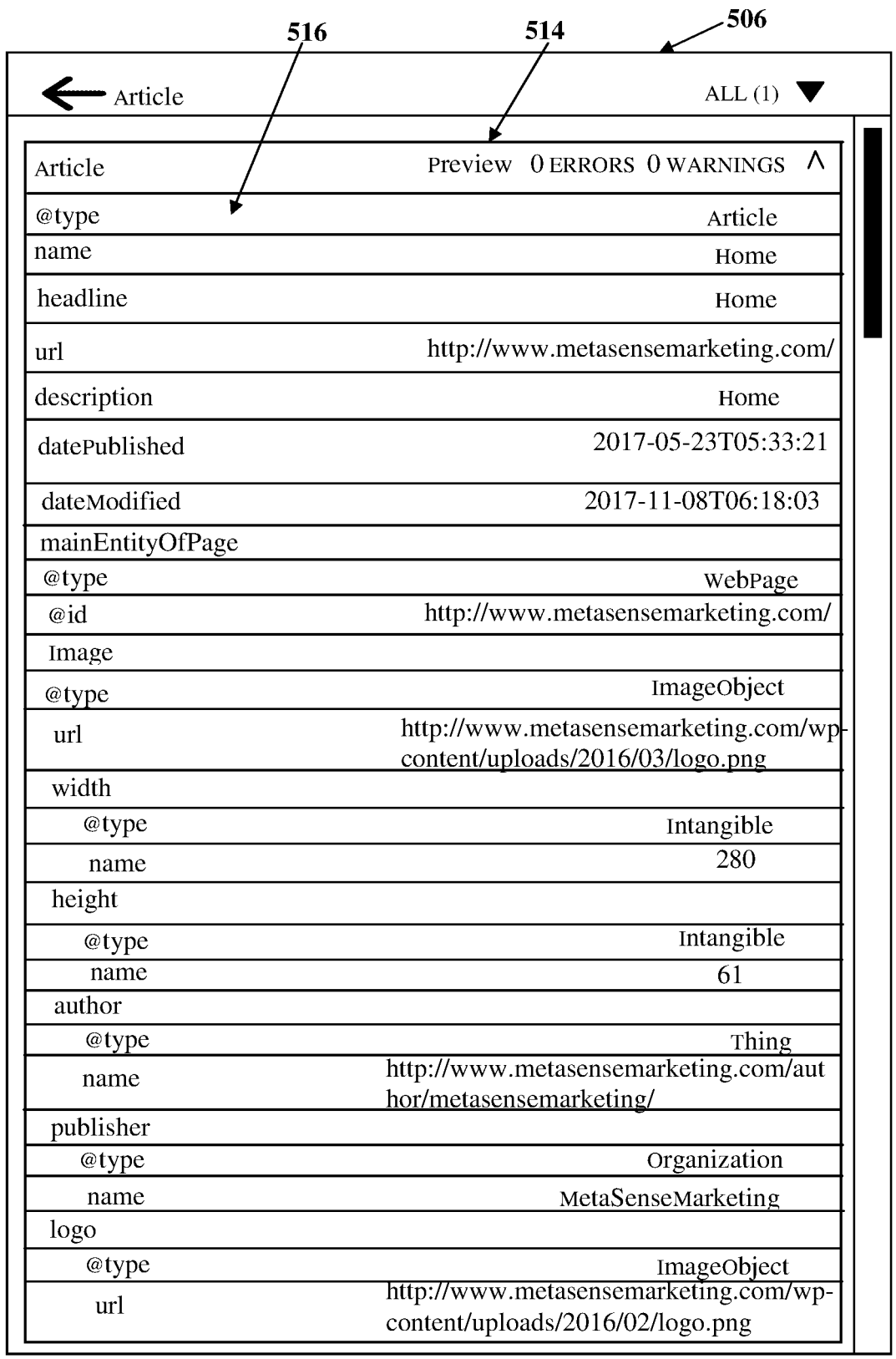
Figure 8E:
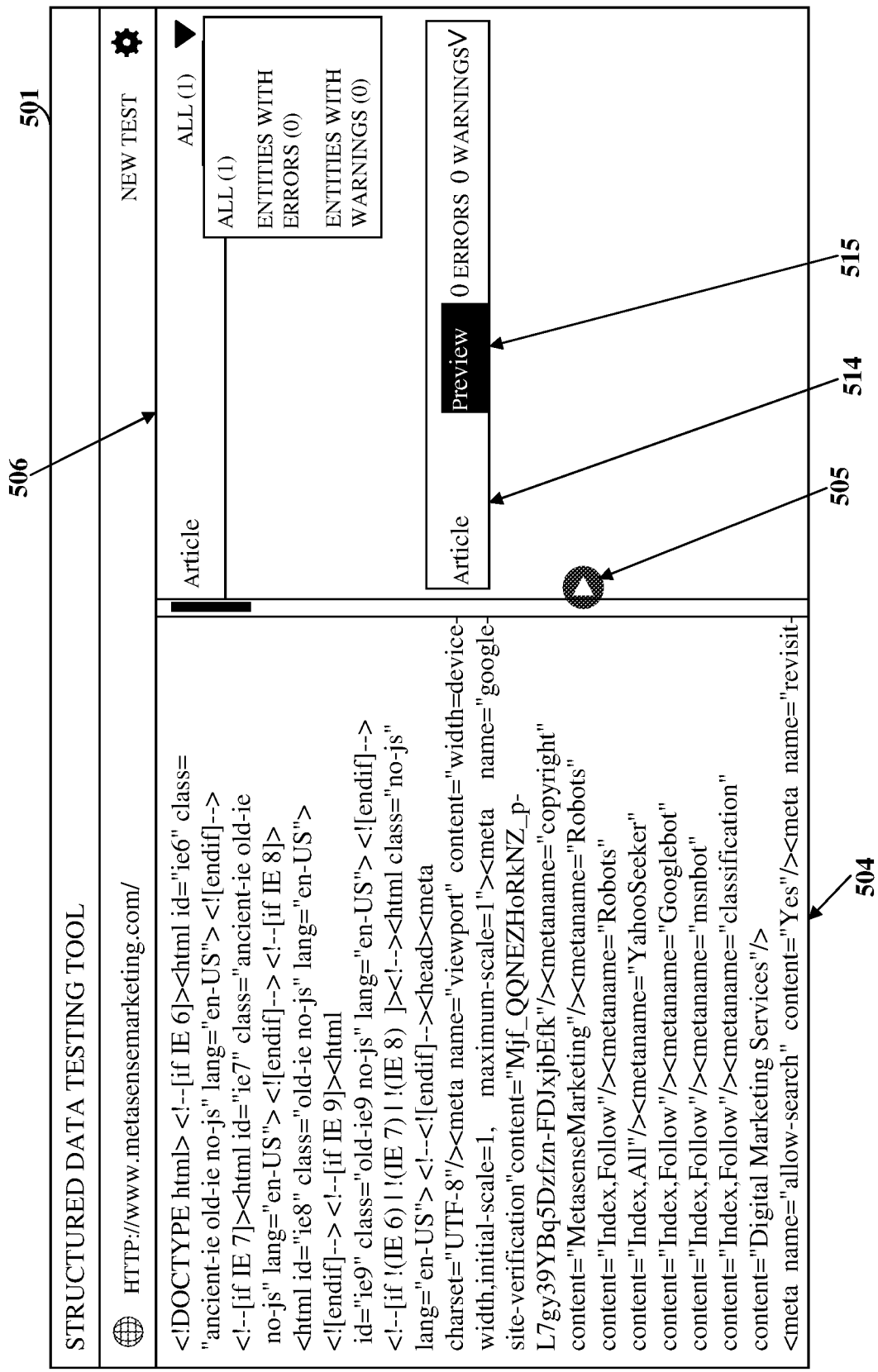
Figure 8F:
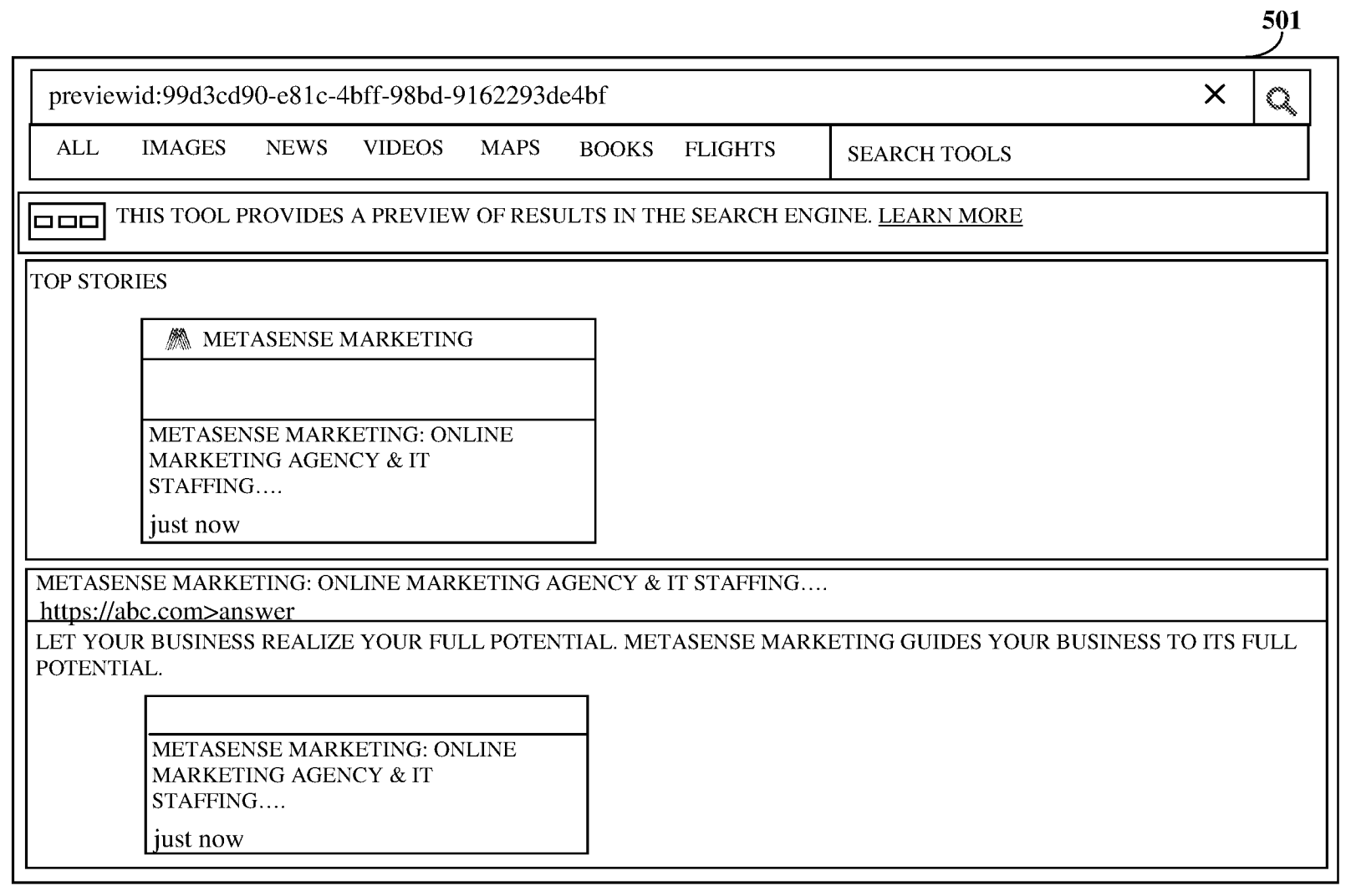

In an embodiment, the content validation and coding system (CVCS) provides a preview tab 515 in the test result section 506 of the graphical user interface (GUI) 501 as exemplarily illustrated in FIGS. 8C-8E. When the user clicks on the preview tab 515, the CVCS provides a preview of results provided by a web search engine, for example, the Google® search engine as exemplarily illustrated in FIG. 8F. This preview allows a user to preview the coded website 801 as the coded website 801 would appear in the search engine results page. The preview allows the user to ensure the coding of the website 801 with the optimal schema codes generates the expected display of the website 801 in the search engine results page.

FIGS. 9A-9E exemplarily illustrate screenshots of a graphical user interface (GUI) 501 provided by the content validation and coding system (CVCS) for testing a webpage of the validated and coded website 801 shown in FIG. 8A, for search engine optimization. Consider an example where a webpage identified by a uniform resource locator (URL), www.metasensemarketing.com/imetadex-landing-page.html, is to be tested by the CVCS. A user inputs the URL "www.metasensemarketing.com/imetadex-landing-page.html" into an input field 502 on the GUI 501 as exemplarily illustrated in FIG. 9A, and clicks a "run test" button 503 provided on the GUI 501. The CVCS executes the web crawler to crawl the URL. The web crawler crawls, parses, and indexes content, for example, text on the webpage and content related to the webpage from one or more search engines and/or one or more media platforms via one or more application programming interfaces (APIs). The CVCS identifies the structured data and the content in the code present on the webpage by analyzing the crawled and indexed content. For example, the CVCS identifies business type, offers, services, articles, and products as content relevant to the business.

Figure 9A:
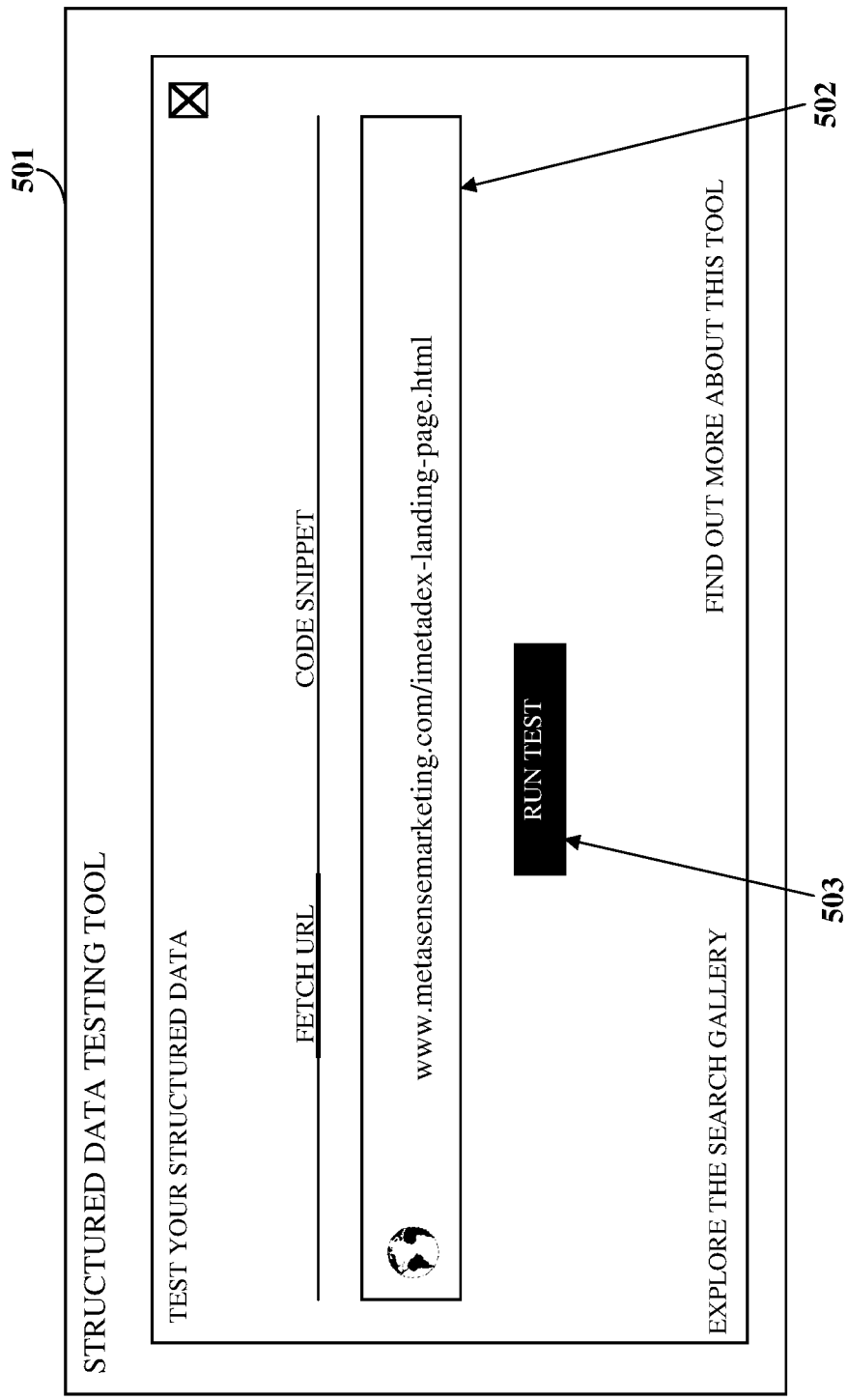
Figure 9B:
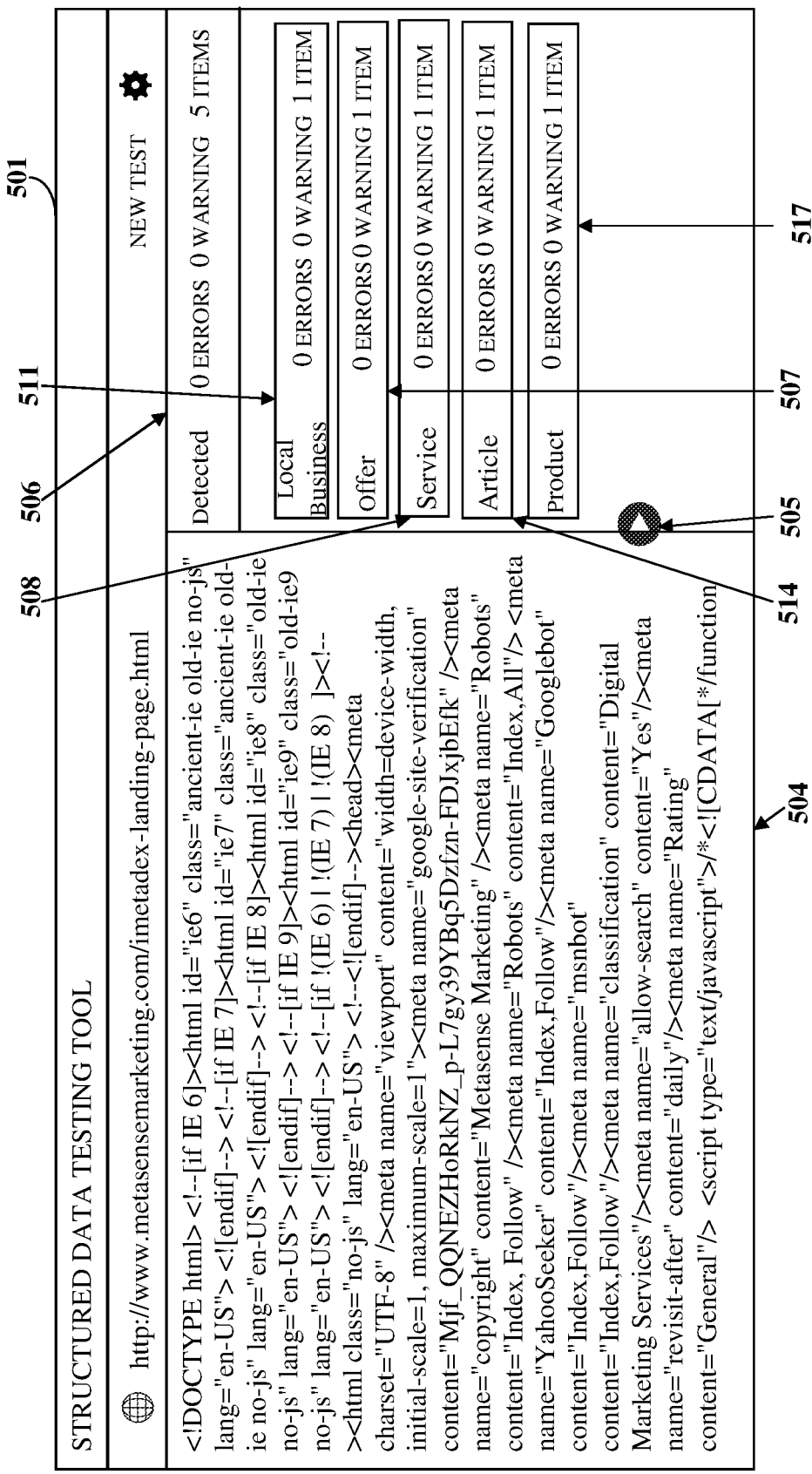
Figure 9C:
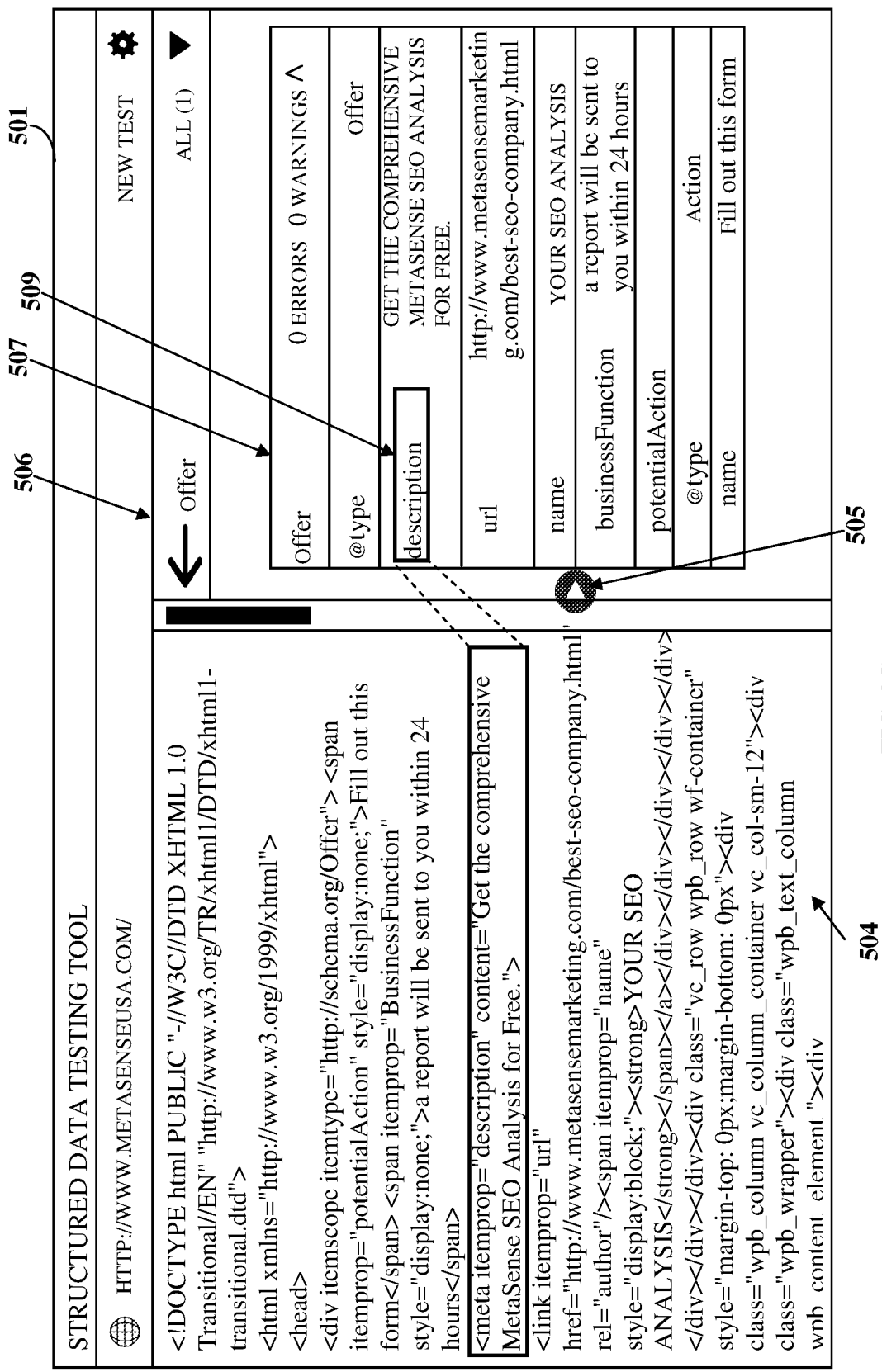
Figure 9E:
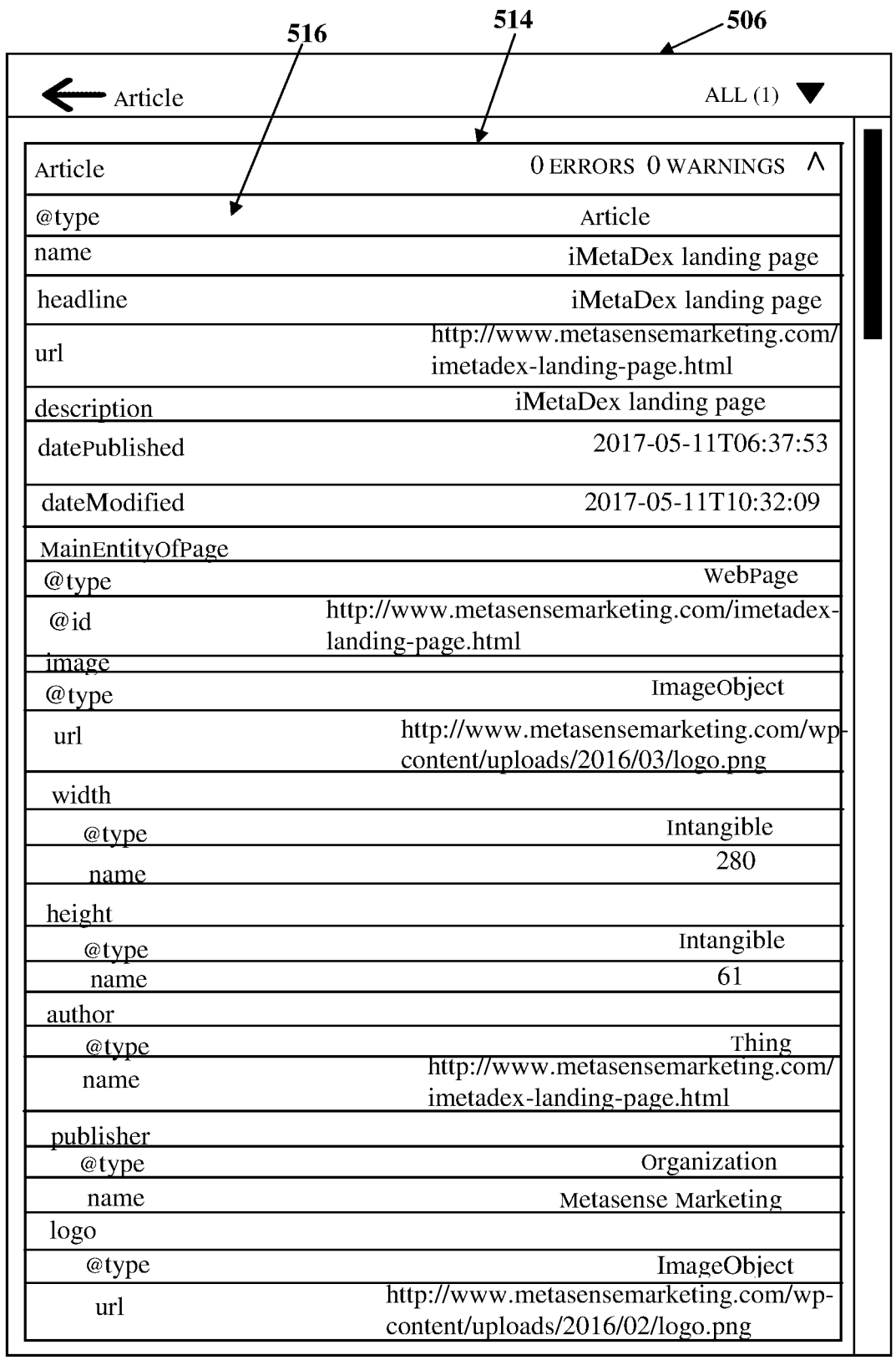

The content validation and coding system (CVCS) displays the identified structured data and content of the webpage in the code section 504 of the graphical user interface (GUI) 501 as exemplarily illustrated in FIG. 9B. When the user clicks the validate button 505 provided by the CVCS on the GUI 501, the CVCS validates the identified content and identifies errors in the structured data of the webpage. In this example, the CVCS identifies no errors in the structured data related to local business, offers, services, articles, and products on the webpage. The CVCS renders a local business panel 511, an offer panel 507, a service panel 508, an article panel 514, and a product panel 517 in the test result section 506 of the GUI 501 as exemplarily illustrated in FIG. 9B, for displaying the results of the validation performed by the CVCS. When the user clicks on the offer panel 507 in the test result section 506 of the GUI 501, the CVCS displays an offer schema code 509 comprising the structured data and content related to the offers on the webpage on the GUI 501 as exemplarily illustrated in FIG. 9C. When the user clicks on the offer schema code 509 in the offer panel 507, the CVCS indicates the code associated with the clicked offer schema code 509 in the code section 504 of the GUI 501 as exemplarily illustrated in FIG. 9C. The CVCS indicates the location of the optimal placement of the clicked offer schema code 509 in the code section 504. In this example, when the user clicks on a description item property in the offer schema code 509, the CVCS identifies and highlights the corresponding description code in the code section 504 of the GUI 501 as exemplarily illustrated in FIG. 9C, thereby allowing the user to edit the description if necessary. When the user clicks on the service panel 508 in the test result section 506 of the GUI 501 exemplarily illustrated in FIG. 9B, the CVCS displays the service schema code 510 comprising the structured data and content related to the services on the webpage on the GUI 501 as exemplarily illustrated in FIG. 9D. When the user clicks on the article panel 514 in the test result section 506 of the GUI 501 exemplarily illustrated in FIG. 9B, the CVCS displays the article schema code 516 comprising the structured data and content related to the articles on the webpage on the GUI 501 as exemplarily illustrated in FIG. 9E.

The content validation and coding system (CVCS) executes the heuristically based coded algorithm on the content collected from the webpage of the validated and coded website 801, the search engines, and the media platforms, and searches for specific tags, referred as "optimal schema codes", from the categorized repository of schema codes and/or the dynamically generated supplementary schema codes that the CVCS deems as needed for coding an article on the webpage. As the CVCS found required content for the article on the webpage, the CVCS determined an article schema code 516 to be coded into the content of the webpage, within the identified structured data. An example of the article schema code 516 created by the content validation and coding system (CVCS) is provided below:

```
<span itemscope itemtype="http://schema.org/Article" class="itempropwp-wrap"><meta
itemprop="name" content="iMetaDex landing page" /><meta itemprop="headline"
content="iMetaDex landing page" /><meta itemscope itemprop="mainEntityOfPage"
itemType="https://schema.org/WebPage"
itemid="http://www.metasensemarketing.com/imetadex-landing-page.html"/><meta
itemprop="url" content="http://www.metasensemarketing.com/imetadex-landing-
page.html" /><span itemprop="image" itemscope
itemtype="https://schema.org/ImageObject"><meta itemprop="url"
content="http://www.metasensemarketing.com/wp-content/uploads/2016/03/logo.png" />
<meta itemprop="width" content="280"/><meta itemprop="height"
content="61"/></span><meta itemprop="author"
content="http://www.metasensemarketing.com/author/metasensemarketing/" /><meta
itemprop="description" content="iMetaDex landing page" /><meta
itemprop="datePublished" content="2017-05-11 06:37:53" /><meta
itemprop="dateModified" content="2017-05-11 10:32:09" /><span itemprop="publisher"
itemscope itemtype="https://schema.org/Organization"><span itemprop="logo"
itemscope itemtype="https://schema.org/ImageObject"><meta itemprop="url"
content="http://www.metasensemarketing.com/wp-
content/uploads/2016/02/logo.png"></span><meta itemprop="name"
content="MetaSense Marketing"></span>
```

The content validation and coding system (CVCS) generates a structured data code map of the article schema code 516 to be coded into the webpage for defining an optimal placement of the article schema code 516 in the content of the webpage. Furthermore, as the CVCS found required content for a service on the webpage, the CVCS determines a service schema code 510 to be coded into the content of the webpage, within the identified structured data. The CVCS generates a structured data code map of the service schema code 510 to be coded into the webpage for defining an optimal placement of the service schema code 510 in the webpage. The CVCS then codes the validated content with the article schema code 516 and the service schema code 510 within the identified structured data of the webpage using the generated structured data code map for search engine optimization. The CVCS then renders the article schema code 516 and the service schema code 510 on the webpage of the validated and coded website 801 and republishes the validated and coded website 801 with the active article schema code 516 and the active service schema code 510. By validating and coding the content of the website 801 exemplarily illustrated in FIG. 8A, free of errors, the CVCS improves indexing of the website 801, increases the ranking of the website 801, and increases visibility and awareness of the website 801 in results provided by search engines, thereby driving traffic to the website 801.

Figure 9F:
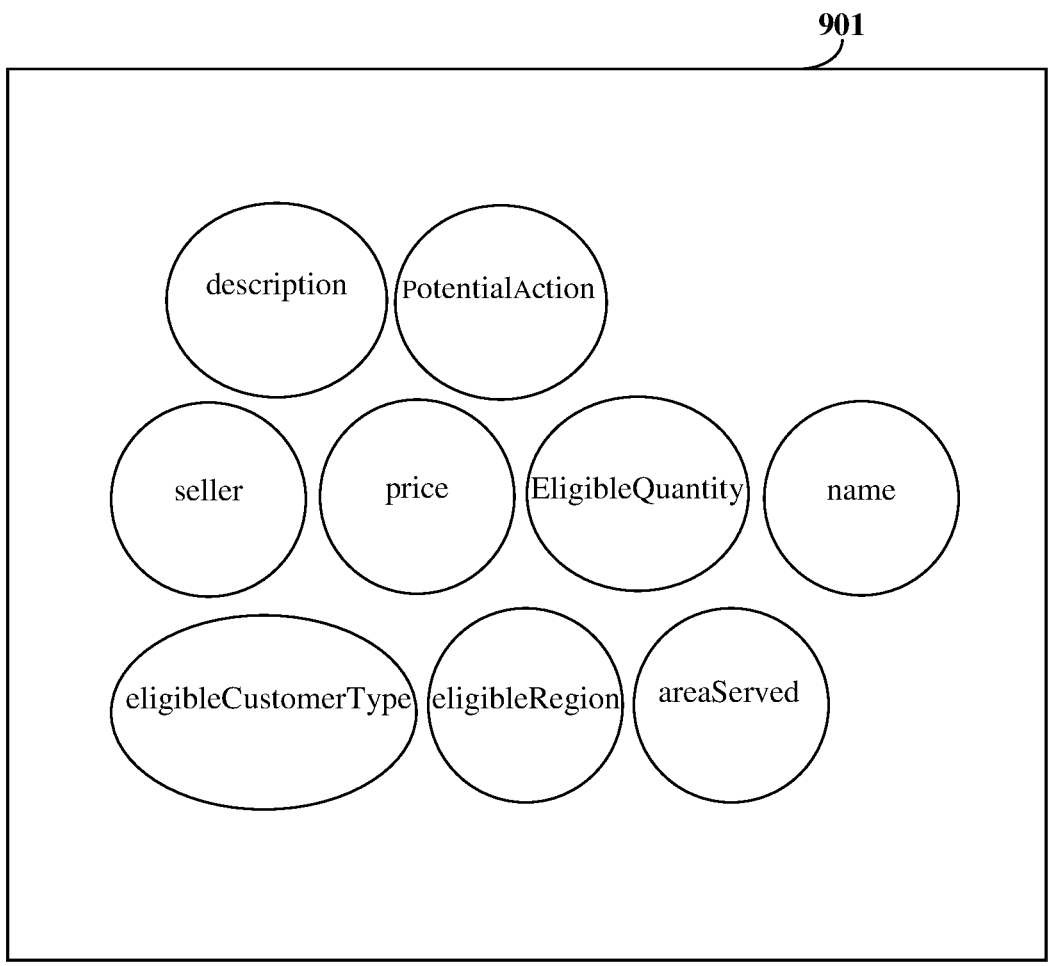
FIG. 9F exemplarily illustrates a structured data code map generated by the content validation and coding system for defining an optimal placement of an optimal schema code in the validated and coded website shown in FIG. 8A.

FIG. 9F exemplarily illustrates a structured data code map 901 generated by the content validation and coding system (CVCS) for defining an optimal placement of an optimal schema code, for example, an offer schema code in the validated and coded website 801 shown in FIG. 8A. In an embodiment, the CVCS generates the structured data code map 901 in the form of a tag cloud to visually represent structured data tags of the offer schema code to be coded into the content of the website 801. The CVCS renders the structured data code map 901 as a data visualization on the GUI 501 as exemplarily illustrated in FIG. 9F.

FIG. 10 exemplarily illustrates a screenshot of a graphical user interface (GUI) 1001 provided by the content validation and coding system (CVCS), displaying a search engine optimization (SEO) report generated by the CVCS for the validated and coded website 801 shown in FIG. 8A. In an embodiment, after testing the website 801, the CVCS generates and renders an SEO report of the validated and coded website 801 on the GUI 1001 as exemplarily illustrated in FIG. 10. As exemplarily illustrated in FIG. 10, the SEO report indicates that the website 801 has 100/100 SEO score, zero failed checks, and zero warnings. The SEO report also displays the article schema code that was optimally coded in the content of the website 801. By validating and coding the content of the website 801, the CVCS increases the SEO score of the website 801, thereby optimizing the website 801 and driving traffic to the website 801.

An example of the code of the website 801 at the uniform resource locator (URL), www.metasensemarketing.com, exemplarily illustrated in FIG. 8A, after content validation and coding by the content validation and coding system (CVCS) is provided below:

```
<!DOCTYPE html> <!--[if IE 6]><html id="ie6" class="ancient-ie old-ie no-js" lang="en-US"> <![endif]--> <!--[if IE 7]><html id="ie7" class="ancient-ie old-ie no-js" lang="en-US"> <![endif]--> <!--[if IE 8]><html id="ie8" class="old-ie no-js" lang="en-US"> <![endif]--> <!--[if IE 9]><html id="ie9" class="old-ie9 no-js" lang="en-US"> <![endif]--> <!--[if !(IE 6) | !(IE 7) | !(IE 8) ]><!--><html class="no-js" lang="en-US">
```

```
<!--<![endif]--><head><meta charset="UTF-8" /><meta name="viewport"
content="width=device-width, initial-scale=1, maximum-scale=1"><meta
name="google-site-verification" content="Mjf_QQNEZHoRkNZ_p-L7gy39YBq5Dzfzn-
FDJxjbEfk" /><meta name="copyright" content="Metasense Marketing" /><meta
name="Robots" content="Index, Follow" /><meta name="Robots"
content="Index,All"/><meta name="YahooSeeker" content="Index,Follow"/><meta
name="Googlebot" content="Index,Follow"/><meta name="msnbot"
content="Index,Follow"/><meta name="classification" content="Digital Marketing
Services"/><meta name="allow-search" content="Yes"/><meta name="revisit-after"
content="daily"/><meta name="Rating" content="General"/> <script
type="text/javascript">/*<![CDATA[*/function createCookie(a,d,b){if(b){var c=new
Date;c.setTime(c.getTime()+864E5*b);b="; expires="+c.toGMTString()}else
b="";document.cookie=a+"="+d+b+"; path=/"}function readCookie(a){a+="=";for(var
d=document.cookie.split(";"),b=0;b<d.length;b++){for(var c=d[b];" 
"==c.charAt(0);)c=c.substring(1,c.length);if(0==c.indexOf(a))return
c.substring(a.length,c.length)}return null}function eraseCookie(a){createCookie(a,"",-1)}
function areCookiesEnabled(){var
a=!1;createCookie("testing","Hello",1);null!=readCookie("testing")&&(a=!0,eraseCookie
("testing"));return a}(function(a){var d=readCookie("devicePixelRatio"),b=void
0===a.devicePixelRatio?1:a.devicePixelRatio;areCookiesEnabled()&&null==d&&(creat
eCookie("devicePixelRatio",b,7),1!=b&&a.location.reload(!0))})(window);/*]]>*/</scrip
t> <link rel="profile" href="http://gmpg.org/xfn/11" /><link rel="pingback"
href="http://www.metasensemarketing.com/xmlrpc.php" /><link rel="stylesheet"
href="http://www.metasensemarketing.com/wp-content/themes/dt-
the7/css/seo.css?x33364" type="text/css"/><!--[if IE]> <script
src="//html5shiv.googlecode.com/svn/trunk/html5.js"></script> <![endif]--
><title>MetaSense Marketing: Online Marketing Agency & IT Staffing Solutions
l</title><meta name="mobile-web-app-capable" content="yes"><script data-
ref="https://goo.gl/C1gw96" data-
abtf='[]'>/*<![CDATA[*/window.Abtf={};!function(e,d){function
k(b){if((b=b.getAttribute("data-abtf"))&&"string"==typeof
``` b)try{b=JSON.parse(b)}catch(p){ }if(!(b&&b instanceof Array))throw Error("invalid config");for(var a=b.length,c=0;c<a;c++)void 0===e.Abtf[c]&&(e.Abtf[c]=-1===b[c]?void 0:b[c]);d[0](n,!0)}function n(b,a){function c(){f[2]?a[17](f[3],"webfont"):void 0!==b.WebFont&&b.WebFont.load(b.WebFontConfig)}var d=b.requestAnimationFrame||b.webkitRequestAnimationFrame||b.mozRequestAnimationFrame||b.msRequestAnimationFrame||function(a){b.setTimeout(a,1E3/60)};a[15]=function(){d.apply(b,arguments)};var e=!!b.requestIdleCallback&&b.requestIdleCallback;if(a[16]=!!e&&function(){e.apply(b,arguments)},a[7])var f=a[7];a[10]=function(){if(a[6]&&a[27](a[6]),a[1]&&!a[1][1]&&a[18](a[1][0]),a[7]){if(void 0===b.WebFontConfig&&(b.WebFontConfig={}),f[0]){b.WebFontConfig.google||(b.WebFontConfig.google={});b.WebFontConfig.google.families||(b.WebFontConfig.google.families=[]);for(var e=f[0].length,d=0;d<e;d++)b.WebFontConfig.google.families.push(f[0][d])}f[1]||c()}a[12]&&!a[4]&&a[12]()};a[11]=function(){a[12]&&a[4]&&a[12]();a[1]&&a[1][1]&&a[18](a[1][0]);a[7]&&f[1]&&c()};a[14](a[11]);a[17]=function(a,b){var c=document.createElement("script");c.src=a;b&&(c.id=b);c.async=!0;var d=document.getElementsByTagName("script")[0];d?d.parentNode.insertBefore(c,d):(document.head||document.getElementsByTagName("head")[0]).appendChild(c);!0}d[14]=function(b,a,c){(a=document)[c="addEventListener"]?a[c]("DOMContentLoaded",b):e.attachEvent("onload",b)};var l,g=[];d[0]=function(b,a){if(l||a){if(b(e,e.Abtf,e.document,Object),!0===a){if(0<g.length)for(var c=g.shift();c;)d[0](c,1),c=g.shift();l=!0;m&&d[10]()}}else g.push(b)};if(document.currentScript&&document.currentScript.hasAttribute("data-abtf"))k(document.currentScript);else{var h=document.querySelector("script[data-abtf]");h?k(h):(e.console&&void 0!==console.error&&console.error("<script data-abtf> client missing"),d[14](function(){if(!(h=document.querySelector("script[data-abtf]")))throw Error("<script data-abtf> client missing");k(h)}))}var m;d[9]=function(){1?d[10]():m=!0}}(window,Abtf);Abtf[9]();/*]]>*/</script><style type="text/css" id="AbtfCSS" data-abtf>/*!

* Above The Fold Optimization 2.9.2 // EMPTY

*/</style> <script type="text/javascript">/*<![CDATA[*/window._wpemojiSettings={"baseUrl":"http:VVs.w.orgVimagesVcoreVemojiV72x72V","ext":".png","source":{"concatemoji":"http:VVwww.metasensemarketing.comVwp-includesVjsVwp-emoji-release.min.js"}};!function(a,b,c){function d(a){var c=b.createElement("canvas"),d=c.getContext&&c.getContext("2d");return d&&d.fillText?(d.textBaseline="top",d.font="600 32px Arial","flag"===a?(d.fillText(String.fromCharCode(55356,56812,55356,56807),0,0),c.toDataURL().length>3e3):(d.fillText(String.fromCharCode(55357,56835),0,0),0!==d.getImageData(16,16,1,1).data[0])):!1}function e(a){var c=b.createElement("script");c.src=a,c.type="text/javascript",b.getElementsByTagName("head")[0].appendChild(c)}var f,g;c.supports={simple:d("simple"),flag:d("flag")},c.DOMReady=!1,c.readyCallback=function(){c.DOMReady=!0},c.supports.simple&&c.supports.flag||(g=function(){c.readyCallback()},b.addEventListener?(b.addEventListener("DOMContentLoaded",g,!1),a.addEventListener("load",g,!1)):(a.attachEvent("onload",g),b.attachEvent("onreadystatechange",function(){"complete"===b.readyState&&c.readyCallback()})),f=c.source||{},f.concatemoji?e(f.concatemoji):f.wpemoji&&f.twemoji&&(e(f.twemoji),e(f.wpemoji)))}(window,document,window._wpemojiSettings);/*]]>*/</script> <style type="text/css">img.wp-smiley,img.emoji{display:inline !important;border:none !important;box-shadow:none !important;height:1em !important;width:1em !important;margin:0 .07em !important;vertical-align:-0.1em !important;background:none !important;padding:0 !important}</style><link rel='stylesheet' id='jquery-ui-css' href='http://www.metasensemarketing.com/wp-content/plugins/wp-leads-builder-any-crm-pro/assets/css/jquery-ui.css?x33364' type='text/css' media='all' /><link rel='stylesheet' id='front-end-styles-css' href='http://www.metasensemarketing.com/wp-content/plugins/wp-leads-builder-any-crm-pro/assets/css/frontendstyles.css?x33364' type='text/css' media='all' /><link rel='stylesheet' id='datepicker-css' href='http://www.metasensemarketing.com/wp-content/plugins/wp-leads-builder-any-crm-pro/assets/css/datepicker.css?x33364' type='text/css' media='all' /><link rel='stylesheet' id='itempropwp-css' href='http://www.metasensemarketing.com/wp-content/plugins/itempropwp/assets/css/itempropwp.css?x33364' type='text/css' media='all' /><link rel='stylesheet' id='layerslider-css' href='http://www.metasensemarketing.com/wp-content/plugins/LayerSlider/static/css/layerslider.css?x33364' type='text/css' media='all' /><link rel='stylesheet' id='ls-google-fonts-css' href='http://fonts.googleapis.com/css?family=Lato:100,300,regular,700,900%7COpen+Sans:300%7CIndie+Flower:regular%7COswald:300,regular,700&subset=latin%2Clatin-ext' type='text/css' media='all' /><link rel='stylesheet' id='contact-form-7-css' href='http://www.metasensemarketing.com/wp-content/plugins/contact-form-7/includes/css/styles.css?x33364' type='text/css' media='all' /><link rel='stylesheet' id='es-widget-css-css' href='http://www.metasensemarketing.com/wp-content/plugins/email-subscribers/widget/es-widget.css?x33364' type='text/css' media='all' /><link rel='stylesheet' id='go-pricing-styles-css' href='http://www.metasensemarketing.com/wp-content/plugins/go_pricing/assets/css/go_pricing_styles.css?x33364' type='text/css' media='all' /><link rel='stylesheet' id='rs-plugin-settings-css' href='http://www.metasensemarketing.com/wp-content/plugins/revslider/public/assets/css/settings.css?x33364' type='text/css' media='all' /><style id='rs-plugin-settings-inline-css' type='text/css'>.tp-caption a{color:#ff7302;text-shadow:none;-webkit-transition:all 0.2s ease-out;-moz-transition:all 0.2s ease-out;-o-transition:all 0.2s ease-out;-ms-transition:all 0.2s ease-out}.tp-caption a:hover{color:#ffa902}</style><link rel='stylesheet' id='ssbaFont-css' href='///fonts.googleapis.com/css?family=Indie+Flower' type='text/css' media='all' /><link rel='stylesheet' id='testimonial-rotator-style-css' href='http://www.metasensemarketing.com/wp-content/plugins/testimonial-rotator/testimonial-rotator-style.css?x33364' type='text/css' media='all' /><link rel='stylesheet' id='font-awesome-css' href='http://www.metasensemarketing.com/wp-content/plugins/js_composer/assets/lib/bower/font-awesome/css/font-awesome.min.css?x33364' type='text/css' media='screen' /><link rel='stylesheet' id='js_composer_front-css' href='http://www.metasensemarketing.com/wp-content/plugins/js_composer/assets/css/js_composer.min.css?x33364' type='text/css' media='all' /><link rel='stylesheet' id='dt-web-fonts-css' href='http://fonts.googleapis.com/css?family=Open+Sans%3A400%2C600' type='text/css' media='all' /><link rel='stylesheet' id='dt-main-css' href='http://www.metasensemarketing.com/wp-content/themes/dt-the7/css/main.min.css?x33364' type='text/css' media='all' /> <!--[if lt IE 9]><link rel='stylesheet' id='dt-old-ie-css' href='http://www.metasensemarketing.com/wp-content/themes/dt-the7/css/old-ie.min.css?x33364' type='text/css' media='all' /> <![endif]--><link rel='stylesheet' id='dt-awsome-fonts-css' href='http://www.metasensemarketing.com/wp-content/themes/dt-the7/css/font-awesome.min.css?x33364' type='text/css' media='all' /><link rel='stylesheet' id='dt-fontello-css' href='http://www.metasensemarketing.com/wp-content/themes/dt-the7/css/fontello/css/fontello.css?x33364' type='text/css' media='all' /> <!--[if lt IE 9]><link rel='stylesheet' id='dt-custom-old-ie.less-css' href='http://www.metasensemarketing.com/wp-content/uploads/wp-less/dt-the7/css/custom-old-ie-04229b1f34.css?x33364' type='text/css' media='all' /> <![endif]--><link rel='stylesheet' id='dt-main.less-css' href='http://www.metasensemarketing.com/wp-content/uploads/wp-less/dt-the7/css/main-7038786f00.css?x33364' type='text/css' media='all' /><link rel='stylesheet' id='dt-custom.less-css' href='http://www.metasensemarketing.com/wp-content/uploads/wp-less/dt-the7/css/custom-04229b1f34.css?x33364' type='text/css' media='all' /><link rel='stylesheet' id='dt-media.less-css' href='http://www.metasensemarketing.com/wp-content/uploads/wp-less/dt-the7/css/media-a4e604fc87.css?x33364' type='text/css' media='all' /><link rel='stylesheet' id='style-css' href='http://www.metasensemarketing.com/wp-content/themes/dt-the7/style.css?x33364' type='text/css' media='all' /><style id='style-inline-css' type='text/css'>.@import url(https://fonts.googleapis.com/css?family=Raleway);.conttxt{font-size:200px;color:#414141;font-family:Verdana,Geneva,sans-serif;margin:0px 0px 20px;padding:0px;font-weight:300;text-align:center}.txthover{text-decoration:none;font-size:20px !important}.txthover a{text-decoration:none;font-size:20px !important}.txthover a:hover{color:#666;text-decoration:underline !important;font-size:20px !important}.facfoot{font-size:2.5em;color:#000;text-align:center;line-height:40px;font-weight:bold;margin-top:20px}.pirdiv{float:left;width:19%;margin-right:1px;background-color:#e0e0e0}.pirdiv1{float:left;width:19%;margin-right:1px;background-color:#ebebeb}.div2{background-color:#ecf4f4;padding-top:20px;padding-bottom:20px;clear:both}.sthead{text-align:center;background-color:#00b5c9;font-size:1.8em;text-transform:uppercase;padding-top:20px;padding-bottom:20px;color:#FFF;clear:both;font-weight:bold}.sthead1{font-weight:bold;font-size:2em;text-align:center;color:#000}.sthead2{font-weight:bold;font-size:1em;text-align:center;color:#000;line-height:20px;margin-top:15px}.blog1{font-weight:bold !important;color:#000;border-bottom:1px solid #bcbcbc;padding-bottom:15px;text-align:center;padding-top:15px;font-size:1.2em}#faidbg{background-image:url(http://www.metasensemarketing.com/wp-content/uploads/2017/08/bg.jpg);background-position:bottom left;background-repeat:no-repeat;height:500px}@media(max-width:800px){.pirdiv{float:none;width:100%;margin-right:0px;background-color:#e0e0e0}.pirdiv1{float:none;width:100%;margin-right:0px;background-color:#ebebeb}.facfoot{font-size:1.6em;color:#000;text-align:center;line-height:30px;font-weight:bold;margin-top:20px}}</style><link rel='stylesheet' id='bsf-Defaults-css' href='http://www.metasensemarketing.com/wp-content/uploads/smile_fonts/Defaults/Defaults.css?x33364' type='text/css' media='all' /><link rel='stylesheet' id='ultimate-google-fonts-css' href='https://fonts.googleapis.com/css?family=Open+Sans%3Aregular%2C300%2C600&subset=latin%2Clatin-ext' type='text/css' media='all' /><link rel='stylesheet' id='ultimate-style-css' href='http://www.metasensemarketing.com/wp-content/plugins/Ultimate_VC_Addons/assets/min-css/style.min.css?x33364' type='text/css' media='all' /><link rel='stylesheet' id='ult-btn-css' href='http://www.metasensemarketing.com/wp-content/plugins/Ultimate_VC_Addons/modules/../assets/min-css/advanced-buttons.min.css?x33364' type='text/css' media='' /> <script type='text/javascript' src='https://www.google.com/recaptcha/api.js'></script> <script type='text/javascript' src='http://www.metasensemarketing.com/wp-includes/js/jquery/jquery.js?x33364'></script> <script type='text/javascript' src='http://www.metasensemarketing.com/wp-includes/js/jquery/jquery-migrate.min.js?x33364'></script> <script type='text/javascript' src='http://www.metasensemarketing.com/wp-content/plugins/revslider/public/assets/js/jquery.themepunch.tools.min.js?x33364'></script> <script type='text/javascript' src='http://www.metasensemarketing.com/wp-content/plugins/revslider/public/assets/js/jquery.themepunch.revolution.min.js?x33364'></script> <script id='st_insights_js' type='text/javascript' src='http://w.sharethis.com/button/st_insights.js?publisher=4d48b7c5-0ae3-43d4-bfbe-3ff8c17a8ae6&product=simpleshare'></script> <script type='text/javascript' src='http://www.metasensemarketing.com/wp-content/plugins/the-preloader/js/preloader-script.js?x33364'></script> <script type='text/javascript'>var my_ajax_object={"ajax_url":"http:VVwww.metasensemarketing.comVwp-adminVadmin-ajax.php"};</script> <script type='text/javascript' src='http://www.metasensemarketing.com/wp-content/themes/dt-the7/assets/js/my-ajax-script.js?x33364'></script> <script type='text/javascript' src='http://www.metasensemarketing.com/wp-content/plugins/duracelltomi-google-tag-manager/js/gtm4wp-outbound-click-tracker.js?x33364'></script> <script type='text/javascript' src='http://www.metasensemarketing.com/wp-content/plugins/duracelltomi-google-tag-manager/js/gtm4wp-download-tracker.js?x33364'></script> <script type='text/javascript' src='http://www.metasensemarketing.com/wp-content/plugins/duracelltomi-google-tag-manager/js/gtm4wp-email-link-tracker.js?x33364'></script> <script type='text/javascript' src='http://www.metasensemarketing.com/wp-content/plugins/duracelltomi-google-tag-manager/js/gtm4wp-contact-form-7-tracker.js?x33364'></script> <script type='text/javascript' src='http://www.metasensemarketing.com/wp-content/plugins/duracelltomi-google-tag-manager/js/gtm4wp-form-move-tracker.js?x33364'></script> <script type='text/javascript' src='http://www.metasensemarketing.com/wp-content/plugins/duracelltomi-google-tagmanager/js/gtm4wp-social-tracker.js?x33364'></script> <script type='text/javascript' src='http://www.metasensemarketing.com/wp-content/plugins/testimonial-rotator/js/jquery.cycletwo.js?x33364'></script> <script type='text/javascript' src='http://www.metasensemarketing.com/wp-content/plugins/testimonial-rotator/js/jquery.cycletwo.addons.js?x33364'></script> <script type='text/javascript'>var dtLocal={"passText":"To view this protected post, enter the password below:","moreButtonText":{"loading":"Loading..."},"postID":"40647","ajaxurl":"http:\/\/www.metasensemarketing.com\/wp-admin\/admin-ajax.php","contactNonce":"232dcbb461","ajaxNonce":"4a65f9f280","pageData":{"type":"page","template":"page","layout":null},"themeSettings":{"smoothScroll":"off","lazyLoading":false,"accentColor":{"mode":"solid","color":"#002855"},"mobileHeader":{"firstSwitchPoint":990},"content":{"responsivenessTreshold":970,"textColor":"#888888","headerColor":"#3a3a3a"},"stripes":{"stripe1":{"textColor":"#888888","headerColor":"#3a3a3a"},"stripe2":{"textColor":"#f7f7f7","headerColor":"#ffffff"},"stripe3":{"textColor":"#43494f","headerColor":"#2f363d"}}}};</script> <script type='text/javascript' src='http://www.metasensemarketing.com/wp-content/themes/dt-the7/js/above-the-fold.min.js?x33364'></script> <script type="text/javascript">var ajaxurl="http://www.metasensemarketing.com/wp-admin/admin-ajax.php"</script><style type="text/css" media="screen"></style><style type="text/css" media="screen">@media (max-width: 728px){}</style><style type="text/css" media="screen">@media (max-width: 320px){}</style><meta name='description' content='Let Your Business Realize Its Full Potential. Metasense Marketing Guide Your Business To Its Full Potential.' /> <script>/*<![CDATA[*/(function(d,s,id){var js,fjs=d.getElementsByTagName(s)[0];if(d.getElementById(id)){return;}js=d.createElement(s);js.id=id;js.src="//connect.facebook.net/en_US/sdk.js#xfbml=1&version=v2.6";fjs.parentNode.insertBefore(js,fjs);}(document,'script','facebook-jssdk'));/*]]>*/</script><style type="text/css">.ssba{}.ssba img{width:25px !important;padding:3px;border:0;box-shadow:none !important;display:inline !important;vertical-align:middle}.ssba, .ssba a{text-decoration:none;border:0;background:none;font-family:Indie Flower;font-size:20px;font-weight:bold}</style><style type="text/css">#wptime-pluginpreloader{position:fixed;top:0;left:0;right:0;bottom:0;background:url(http://www.metasensemarketing.com/wp-content/uploads/2016/03/loader.gif) no-repeat #002855 50%;-moz-background-size:64px 64px;-o-background-size:64px 64px;-webkit-background-size:64px 64px;background-size:64px 64px;z-index:99998;width:100%;height:100%}</style><noscript><style type="text/css">#wptime-plugin-preloader{display:none !important}</style></noscript> <script data-cfasync="false" type="text/javascript">var gtm4wp_datalayer_name="dataLayer";var dataLayer=dataLayer||[];jQuery(function(){gtm4wp_track_downloads("pdf,doc,docx,xls,xlsx,ppt,pptx,zip,rar,gz,tar");});dataLayer.push({"visitorLoginState":"logged-out","visitorType":"visitor-logged-out","pagePostType":"frontpage","pagePostType2":"single-page","pagePostAuthor":"metasensemarketing"});</script> <script data-cfasync="false">/*<![CDATA[*/(function(w,d,s,l,i){w[l]=w[l]||[];w[l].push({'gtm.start':new Date().getTime(),event:'gtm.js'});var f=d.getElementsByTagName(s)[0],j=d.createElement(s),dl=l!='dataLayer'?'&l='+l:'';j.async=true;j.src='//www.googletagmanager.com/gtm.'+'js?id='+i+dl;f.parentNode.insertBefore(j,f);})(window,document,'script','dataLayer','GTM-N73ZTD');/*]]>*/</script> <script type="text/javascript">dtGlobals.logoEnabled=1;dtGlobals.logoURL='http://www.metasensemarketing.com/wp-content/uploads/2017/03/monogram1.png 1x, http://www.metasensemarketing.com/wp-content/uploads/2017/03/monogram1.png 2x';dtGlobals.logoW='56';dtGlobals.logoH='50';smartMenu=1;</script> <style type="text/css">.recentcomments a{display:inline !important;padding:0 !important;margin:0 !important}</style><meta name="generator" content="Powered by Visual Composer - drag and drop page builder for WordPress."/> <!--[if lte IE 9]><link rel="stylesheet" type="text/css" href="http://www.metasensemarketing.com/wp-content/plugins/js_composer/assets/css/vc_lte_ie9.min.css?x33364" media="screen"><![endif]--><!--[if IE 8]><link rel="stylesheet" type="text/css" href="http://www.metasensemarketing.com/wp-content/plugins/js_composer/assets/css/vc-ie8.min.css?x33364" media="screen"><![endif]--><meta name="generator" content="Powered by Slider Revolution 5.1 - responsive, Mobile-Friendly Slider Plugin for WordPress with comfortable drag and drop interface." /><link rel="icon" href="http://www.metasensemarketing.com/wp-content/uploads/2017/03/monogram1.png?x33364" type="image/png" /><link rel="shortcut icon" href="http://www.metasensemarketing.com/wp-content/uploads/2017/03/monogram1.png?x33364" type="image/png" /> <script>(function(i,s,o,g,r,a,m){i['GoogleAnalyticsObject']=r;i[r]=i[r]||function(){(i[r].q=i[r].q||[]).push(arguments)},i[r].l=1*new Date();a=s.createElement(o),m=s.getElementsByTagName(o)[0];a.async=1;a.src=g;m.parentNode.insertBefore(a,m)})(window,document,'script','https://www.google-analytics.com/analytics.js','ga');ga('create','UA-71234103-1','auto');ga('send','pageview');</script> <style type="text/css" data-type="vc_shortcodes-custom-css">.vc_custom_1455610583932{padding-right:100px !important;padding-left:100px !important}.vc_custom_1455611604727{padding-right:80px !important}.vc_custom_1455611362259{padding-right:80px !important}.vc_custom_1455615976239{padding-left:250px !important}.vc_custom_1476167370365{margin-top:-20px !important;margin-left:55px !important;padding-bottom:15px !important}.vc_custom_1451560714480{margin-top:-10px !important;padding-top:-10px !important}</style><noscript><style type="text/css">.wpb_animate_when_almost_visible{opacity:1}</style></noscript> <script>!function(f,b,e,v,n,t,s){if(f.fbq)return;n=f.fbq=function(){n.callMethod?n.callMethod.apply(n,arguments):n.queue.push(arguments)};if(!f._fbq)f._fbq=n;n.push=n;n.loaded=!0;n.version='2.0';n.queue=[];t=b.createElement(e);t.async=!0;t.src=v;s=b.getElementsByTagName(e)[0];s.parentNode.insertBefore(t,s)}(window,document,'script','https://connect.facebook.net/en_US/fbevents.js');fbq('init','544415414763991');fbq('track',"PageView");</script> <noscript><img height="1" width="1" style="display:none" alt="facebook" src="https://www.facebook.com/tr?id=544415414763991&ev=PageView&noscript=1" /></noscript></head><body class="home page page-id-40647 page-template-default disabled-transparent-bg slideshow-on image-blur rollover-show-icon srcset-enabled btn-flat style-ios boxes-transparent-bg light-icons phantom-fade wpb-js-composer js-comp-ver-4.8.0.1 vc_responsive"><noscript><iframe src="//www.googletagmanager.com/ns.html?id=GTM-N73ZTD" height="0" width="0" style="display:none;visibility:hidden"></iframe></noscript><div id="wptime-plugin-preloader"></div><div id="page"> <header id="header" class="show-device-logo show-mobile-logo dt-parent-menu-clickable line-decoration logo-left" role="banner"><div id="top-bar" role="complementary" class="text-small full-width-line top-bar-hide"><div class="wf-wrap"><div class="wf-container-top"><div class="wf-table wf-mobile-collapsed"><div class=" wf-td"><span class="mini-contacts phone">(866) 875-6382</span><div class="text-area"><p><a href="http://www.metasensemarketing.com/work-with-us.html"><img style="margin-top:5px" src="http://www.metasensemarketing.com/wp-content/uploads/work-btn.png?x33364" alt="Work With Us" title="Work With Us"></a></p></div></div><div class="right-block wf-td"><div class="soc-ico custom-bg hover-accent-bg"><a title="CRM" href="http://www.metasensemarketing.com/crm/" target="_blank" class="website"><span class="assistive-text">CRM</span></a><a title="Pinterest" href="http://www.pinterest.com/metasenseinc/" target="_blank" class="pinterest"><span class="assistive-text">Pinterest</span></a><a title="Google+" href="https://plus.google.com/106307762692247450497/about?hl=en" target="_blank" class="google"><span class="assistive-text">Google+</span></a><a title="Linkedin" href="https://www.linkedin.com/company/metasense" target="_blank" class="linkedin"><span class="assistive-text">Linkedin</span></a><a title="Twitter" href="https://twitter.com/MetaSense" target="_blank" class="twitter"><span class="assistive-text">Twitter</span></a><a title="Facebook" href="https://www.facebook.com/MetaSenseMarketing/" target="_blank" class="facebook"><span class="assistive-text">Facebook</span></a></div></div></div></div></div><div class="wf-wrap "><div class="wf-table"><div id="branding" class="wf-td"><a href="http://www.metasensemarketing.com/"><img class=" preload-me" srcset="http://www.metasensemarketing.com/wp-content/uploads/2017/04/logo12.png 1x, http://www.metasensemarketing.com/wp-content/uploads/2017/04/logo12.png 2x" width="450" height="69"  alt="MetaSense Marketing" /><img class="mobile-logo preload-me" srcset="http://www.metasensemarketing.com/wp-content/uploads/2017/04/mobile-logo.png 1x, http://www.metasensemarketing.com/wp-content/uploads/2017/04/mobile-logo.png 2x" width="220" height="34" alt="MetaSense Marketing" /></a><div id="site-title" class="assistive-text">MetaSense Marketing</div><div id="site-description" class="assistive-text">STAFFING : WEB DESIGN : IT SERVICES</div></div> <nav id="navigation" class="wf-td"><ul id="main-nav" class="fancy-rollovers wf-mobile-hidden underline-hover"><li class=" menu-item menu-item-type-post_type menu-item-object-page menu-item-39810 first"><a href="http://www.metasensemarketing.com/why-metasense.html"><span>Why MetaSense?</span></a></li><li class=" menu-item menu-item-type-post_type menu-item-object-page menu-item-has-children menu-item-37889 has-children"><a href="http://www.metasensemarketing.com/solutions.html"><span>Solutions</span></a><div class="sub-nav"><ul><li class=" menu-item menu-item-type-post_type menu-item-object-page menu-item-40323 first level-arrows-on"><a href="http://www.metasensemarketing.com/seo-smm-sem-ppc-promotion.html"><span>Search Engine Optimization</span></a></li><li class=" menu-item menu-item-type-post_type menu-item-object-page menu-item-40821 level-arrows-on"><a href="http://www.metasensemarketing.com/social-media-marketing.html"><span>Social Media Marketing</span></a></li><li class=" menu-item menu-item-type-post_type menu-item-object-page menu-item-40917 level-arrows-on"><a href="http://www.metasensemarketing.com/facebook-advertising-2017.html"><span>Facebook Advertising</span></a></li><li class=" menu-item menu-item-type-post_type menu-item-object-page menu-item-40330 level-arrows-on"><a href="http://www.metasensemarketing.com/xtreme-listing.html"><span>Xtreme Listing</span></a></li><li class=" menu-item menu-item-type-post_type menu-item-object-page menu-item-38628 level-arrows-on"><a href="http://www.metasensemarketing.com/mobile-apps.html"><span>Mobile App Development</span></a></li><li class=" menu-item menu-item-type-post_type menu-item-object-page menu-item-40315 level-arrows-on"><a href="http://www.metasensemarketing.com/responsive-web-design.html"><span>Responsive Web Design</span></a></li><li class=" menu-item menu-item-type-post_type menu-item-object-page menu-item-38630 level-arrows-

```
on"><a href="http://www.metasensemarketing.com/creative-
design.html"><span>Creative Design</span></a></li><li class=" menu-item menu-item-
type-post_type menu-item-object-page menu-item-38631 level-arrows-on"><a
href="http://www.metasensemarketing.com/videos-production.html"><span>Video
Production</span></a></li><li class=" menu-item menu-item-type-post_type menu-
item-object-page menu-item-38632 level-arrows-on"><a
href="http://www.metasensemarketing.com/e-commerce-
development.html"><span>Ecommerce Solutions</span></a></li><li class=" menu-item
menu-item-type-post_type menu-item-object-page menu-item-38633 level-arrows-
on"><a href="http://www.metasensemarketing.com/care-plan.html"><span>CARE ™
Plan</span></a></li><li class=" menu-item menu-item-type-custom menu-item-object-
custom menu-item-38634 level-arrows-on"><a
href="http://www.metasenseinc.com/"><span>IT
Staffing</span></a></li></ul></div></li><li class=" menu-item menu-item-type-
post_type menu-item-object-page menu-item-37890"><a
href="http://www.metasensemarketing.com/resources.html"><span>Resources</span></
a></li><li class=" menu-item menu-item-type-post_type menu-item-object-page menu-
item-37604"><a href="http://www.metasensemarketing.com/people-
helped.html"><span>People We’ve Helped</span></a></li><li class=" menu-
item menu-item-type-post_type menu-item-object-page menu-item-40700"><a
href="http://www.metasensemarketing.com/contact.html"><span>Contact</span></a></
li></ul> <a href="#show-menu" rel="nofollow" id="mobile-menu" class="accent-bg">
<span class="menu-open">Menu</span> <span class="menu-back">back</span> <span
class="wf-phone-visible"> </span> </a> </nav></div></div></header><div
id="main-slideshow"><link
href="http://fonts.googleapis.com/css?family=Roboto:100,300,400,500,700,900"
rel="stylesheet" property="stylesheet" type="text/css" media="all" /><link
href="http://fonts.googleapis.com/css?family=Roboto+Condensed:700,400,300"
rel="stylesheet" property="stylesheet" type="text/css" media="all" /><link
href="http://fonts.googleapis.com/css?family=Raleway:400,500,600" rel="stylesheet"
property="stylesheet" type="text/css" media="all" /><link
``` href="http://fonts.googleapis.com/css?family=Open+Sans:300,400,600,700,800" rel="stylesheet" property="stylesheet" type="text/css" media="all" /><div id="rev_slider_17_1_wrapper" class="rev_slider_wrapper fullwidthbanner-container" style="margin:0px auto;background-color:#0052a4;padding:0px;margin-top:0px;margin-bottom:0px;"><div id="rev_slider_17_1" class="rev_slider fullwidthabanner" style="display:none;" data-version="5.1"><ul><li data-index="rs-84" data-transition="fade" data-slotamount="default" data-easein="default" data-easeout="default" data-masterspeed="300" data-thumb="http://www.metasensemarketing.com/wp-content/uploads/2017/05/01-100x50.jpg" data-rotate="0" data-saveperformance="off" data-title="Slide" data-description=""> <img src="http://www.metasensemarketing.com/wp-content/plugins/revslider/admin/assets/images/dummy.png?x33364" alt="" data-lazyload="http://www.metasensemarketing.com/wp-content/uploads/2017/05/01.jpg" data-bgposition="center center" data-bgfit="cover" data-bgrepeat="no-repeat" class="rev-slidebg" data-no-retina> <a class="tp-caption   tp-resizeme" href="http://www.metasensemarketing.com/get-your-results.html" target="_self" id="slide-84-layer-1" data-x="" data-y="bottom" data-voffset="-10" data-width="['none','none','none','none']" data-height="['none','none','none','none']" data-transform_idle="o:1;" data-transform_in="opacity:0;s:300;e:Power2.easeInOut;" data-transform_out="opacity:0;s:300;s:300;" data-start="500" data-actions=" data-responsive_offset="on" style="z-index: 5;"><img src="http://www.metasensemarketing.com/wp-content/plugins/revslider/admin/assets/images/dummy.png?x33364" alt="Get Your Results" width="387" height="78" data-ww="387px" data-hh="78px" data-lazyload="http://www.metasensemarketing.com/wp-content/uploads/2017/05/results-btn.png" data-no-retina> </a></li><li data-index="rs-88" data-transition="fade" data-slotamount="default" data-easein="default" data-easeout="default" data-masterspeed="300" data-thumb="http://www.metasensemarketing.com/wp-content/uploads/2017/05/022-100x50.jpg" data-rotate="0" data-saveperformance="off" data-title="Slide" data-description=""> <img src="http://www.metasensemarketing.com/wp-content/plugins/revslider/admin/assets/images/dummy.png?x33364" alt="MetaSense Marketing Google Friendly image" width="1280" height="400" data-lazyload="http://www.metasensemarketing.com/wp-content/uploads/2017/05/022.jpg" data-bgposition="center center" data-bgfit="cover" data-bgrepeat="no-repeat" class="rev-slidebg" data-no-retina> <a class="tp-caption  tp-resizeme" href="http://www.metasensemarketing.com/get-your-results.html" target="_self" id="slide-88-layer-1" data-x="" data-y="bottom" data-voffset="-10" data-width="['none','none','none','none']" data-height="['none','none','none','none']" data-transform_idle="o:1;" data-transform_in="opacity:0;s:300;e:Power2.easeInOut;" data-transform_out="opacity:0;s:300;s:300;" data-start="500" data-actions=" data-responsive_offset="on" style="z-index: 5;"><img src="http://www.metasensemarketing.com/wp-content/plugins/revslider/admin/assets/images/dummy.png?x33364" alt="Get Your Results" width="387" height="78" data-ww="387px" data-hh="78px" data-lazyload="http://www.metasensemarketing.com/wp-content/uploads/2017/05/results-btn.png" data-no-retina> </a></li><li data-index="rs-85" data-transition="fade" data-slotamount="default"  data-easein="default" data-easeout="default" data-masterspeed="300"  data-thumb="http://www.metasensemarketing.com/wp-content/uploads/2017/05/03-100x50.jpg"  data-rotate="0"  data-saveperformance="off"  data-title="Slide" data-description=""> <img src="http://www.metasensemarketing.com/wp-content/plugins/revslider/admin/assets/images/dummy.png?x33364" alt=""  data-lazyload="http://www.metasensemarketing.com/wp-content/uploads/2017/05/03.jpg" data-bgposition="center center" data-bgfit="cover" data-bgrepeat="no-repeat" class="rev-slidebg" data-no-retina> <a class="tp-caption  tp-resizeme" href="http://www.metasensemarketing.com/get-your-results.html" target="_self" id="slide-85-layer-1" data-x="" data-y="bottom" data-voffset="-10" data-width="['none','none','none','none']" data-height="['none','none','none','none']" data-transform_idle="o:1;" data-transform_in="opacity:0;s:300;e:Power2.easeInOut;" data-transform_out="opacity:0;s:300;s:300;" data-start="500" data-actions=" data-responsive_offset="on" style="z-index: 5;"><img src="http://www.metasensemarketing.com/wp-content/plugins/revslider/admin/assets/images/dummy.png?x33364" alt="Get Your Results" width="387" height="78" data-ww="387px" data-hh="78px" data-lazyload="http://www.metasensemarketing.com/wp-content/uploads/2017/05/results-btn.png" data-no-retina> </a></li><li data-index="rs-86" data-transition="fade" data-slotamount="default" data-easein="default" data-easeout="default" data-masterspeed="300" data-thumb="http://www.metasensemarketing.com/wp-content/uploads/2017/05/04-100x50.jpg" data-rotate="0" data-saveperformance="off" data-title="Slide" data-description=""> <img src="http://www.metasensemarketing.com/wp-content/plugins/revslider/admin/assets/images/dummy.png?x33364" alt="" data-lazyload="http://www.metasensemarketing.com/wp-content/uploads/2017/05/04.jpg" data-bgposition="center center" data-bgfit="cover" data-bgrepeat="no-repeat" class="rev-slidebg" data-no-retina> <a class="tp-caption tp-resizeme" href="http://www.metasensemarketing.com/get-your-results.html" target="_self" id="slide-86-layer-1" data-x="" data-y="bottom" data-voffset="-10" data-width="['none','none','none','none']" data-height="['none','none','none','none']" data-transform_idle="o:1;" data-transform_in="opacity:0;s:300;e:Power2.easeInOut;" data-transform_out="opacity:0;s:300;s:300;" data-start="500" data-actions=" data-responsive_offset="on" style="z-index: 5;"><img src="http://www.metasensemarketing.com/wp-content/plugins/revslider/admin/assets/images/dummy.png?x33364" alt="Get Your Results" width="387" height="78" data-ww="387px" data-hh="78px" data-lazyload="http://www.metasensemarketing.com/wp-content/uploads/2017/05/results-btn.png" data-no-retina> </a></li><li data-index="rs-87" data-transition="fade" data-slotamount="default" data-easein="default" data-easeout="default" data-masterspeed="300" data-thumb="http://www.metasensemarketing.com/wp-content/uploads/2017/05/05-100x50.jpg" data-rotate="0" data-saveperformance="off" data-title="Slide" data-description=""> <img src="http://www.metasensemarketing.com/wp-content/plugins/revslider/admin/assets/images/dummy.png?x33364" alt="" data-lazyload="http://www.metasensemarketing.com/wp-content/uploads/2017/05/05.jpg" data-bgposition="center center" data-bgfit="cover" data-bgrepeat="no-repeat" class="rev-slidebg" data-no-retina> <a class="tp-caption   tp-resizeme" href="http://www.metasensemarketing.com/get-your-results.html" target="_self" id="slide-87-layer-1" data-x="" data-y="bottom" data-voffset="-10" data-width="['none','none','none','none']" data-height="['none','none','none','none']" data-transform_idle="o:1;" data-transform_in="opacity:0;s:300;e:Power2.easeInOut;" data-transform_out="opacity:0;s:300;s:300;" data-start="500" data-actions="" data-responsive_offset="on" style="z-index: 5;"><img src="http://www.metasensemarketing.com/wp-content/plugins/revslider/admin/assets/images/dummy.png?x33364" alt="Get Your Results" width="387" height="78" data-ww="387px" data-hh="78px" data-lazyload="http://www.metasensemarketing.com/wp-content/uploads/2017/05/results-btn.png" data-no-retina> </a></li></ul><div class="tp-static-layers"></div><div class="tp-bannertimer tp-bottom" style="visibility: hidden !important;"></div></div> <script>/*<![CDATA[*/var htmlDiv=document.getElementById("rs-plugin-settings-inline-css");var htmlDivCss="";if(htmlDiv){htmlDiv.innerHTML=htmlDiv.innerHTML+htmlDivCss;} else{var htmlDiv=document.createElement("div");htmlDiv.innerHTML="<style>"+htmlDivCss+ "</style>";document.getElementsByTagName("head")[0].appendChild(htmlDiv.childNodes[0]);}/*]]>*/</script> <script type="text/javascript">/*<![CDATA[*/var setREVStartSize=function(){try{var e=new Object,i=jQuery(window).width(),t=9999,r=0,n=0,l=0,f=0,s=0,h=0;e.c=jQuery('#rev_slider_17_1');e.gridwidth=[1280];e.gridheight=[400];e.sliderLayout="auto";if(e.responsiveLevels&&(jQuery.each(e.responsiveLevels,function(e,f){f>i&&(t=r=f,l=e),i>f&&f>r&&(r=f,n=e)}),t>r&&(l=n)),f=e.gridheight[l]||e.gridheight[0]||e.gridheight,s=e.gridwidth[l]||e.gridwidth[0]||e.gridwidth,h=i/s,h=h>1?1:h,f=Math.round(h*f),"fullscreen"==e.sliderLayout){var u=(e.c.width(),jQuery(window).height());if(void 0!=e.fullScreenOffsetContainer){var c=e.fullScreenOffsetContainer.split(",");if(c)jQuery.each(c,function(e,i){u=jQuery(i).len gth>0?u-jQuery(i).outerHeight(!0):u}),e.fullScreenOffset.split("%").length>1&&void 0!=e.fullScreenOffset&&e.fullScreenOffset.length>0?u-=jQuery(window).height()*parseInt(e.fullScreenOffset,0)/100:void 0!=e.fullScreenOffset&&e.fullScreenOffset.length>0&&(u-=parseInt(e.fullScreenOffset,0))}f=u}else void 0!=e.minHeight&&f<e.minHeight&&(f=e.minHeight);e.c.closest(".rev_slider_wrapper").css({height:f})}catch(d){console.log("Failure at Presize of Slider:"+d)}};setREVStartSize();function revslider_showDoubleJqueryError(sliderID){var errorMessage="Revolution Slider Error: You have some jquery.js library include that comes after the revolution files js include.";errorMessage+="<br> This includes make eliminates the revolution slider libraries, and make it not work.";errorMessage+="<br><br> To fix it you can:<br>    1. In the Slider Settings -> Troubleshooting set option: <strong><b>Put JS Includes To Body</b></strong> option to true.";errorMessage+="<br>    2. Find the double jquery.js include and remove it.";errorMessage="<span style='font-size:16px;color:#BC0C06;'>"+errorMessage+"</span>";jQuery(sliderID).show().html(errorMessage);}
var tpj=jQuery;var revapi17;tpj(document).ready(function(){if(tpj("#rev_slider_17_1").revolution==undefined){revslider_showDoubleJqueryError("#rev_slider_17_1");}else{revapi17=tpj("#rev_slider_17_1").show().revolution({sliderType:"standard",jsFileLocation:"//www.metasensemarketing.com/wp-content/plugins/revslider/public/assets/js/",sliderLayout:"auto",dottedOverlay:"none",delay:8000,navigation:{keyboardNavigation:"on",keyboard_direction:"horizontal",mouseScrollNavigation:"off",onHoverStop:"off",touch:{touchenabled:"on",swipe_threshold:75,swipe_min_touches:50,swipe_direction:"horizontal",drag_block_vertical:false},arrows:{style:"custom",enable:true,hide_onmobile:true,hide_under:600,hide_onleave:true,hide_delay:200,hide_delay_mobile:1200,tmp:"",left:{h_align:"left",v_align:"center",h_offset:30,v_offset:0},right:{h_align:"right",v_align:"center",h_offset:30,v_offset:0}}},visibilityLevels:[1240,1024,778,480],gridwidth:1280,gridheight:400,lazyType:"smart",shadow:0,spinne r:"off",stopLoop:"off",stopAfterLoops:-1,stopAtSlide:-1,shuffle:"off",autoHeight:"on",disableProgressBar:"on",hideThumbsOnMobile:"off",hideSliderAtLimit:0,hideCaptionAtLimit:0,hideAllCaptionAtLilmit:0,debugMode:false,fallbacks:{simplifyAll:"off",nextSlideOnWindowFocus:"off",disableFocusListener:false,panZoomDisableOnMobile:"on",}});}});/*]]>*/</script> <script>/*<![CDATA[*/var htmlDivCss=unescape(".custom.tparrows%20%7B%0A%09cursor%3Apointer%3B%0A%09background%3A%23000%3B%0A%09background%3Argba%280%2C0%2C0%2C0.5%29%3B%0A%09width%3A40px%3B%0A%09height%3A40px%3B%0A%09position%3Aabsolute%3B%0A%09display%3Ablock%3B%0A%09z-index%3A100%3B%0A%7D%0A.custom.tparrows%3Ahover%20%7B%0A%09background%3A%23000%3B%0A%7D%0A.custom.tparrows%3Abefore%20%7B%0A%09font-family%3A%20%22revicons%22%3B%0A%09font-size%3A15px%3B%0A%09color%3A%23fff%3B%0A%09display%3Ablock%3B%0A%09line-height%3A%2040px%3B%0A%09text-align%3A%20center%3B%0A%7D%0A.custom.tparrows.tp-leftarrow%3Abefore%20%7B%0A%09content%3A%20%22%5Ce824%22%3B%0A%7D%0A.custom.tparrows.tp-rightarrow%3Abefore%20%7B%0A%09content%3A%20%22%5Ce825%22%3B%0A%7D%0A%0A%0A");var htmlDiv=document.getElementById('rs-plugin-settings-inline-css');if(htmlDiv){htmlDiv.innerHTML=htmlDiv.innerHTML+htmlDivCss;} else{var htmlDiv=document.createElement('div');htmlDiv.innerHTML='<style>'+htmlDivCss+'</style>';document.getElementsByTagName('head')[0].appendChild(htmlDiv.childNodes[0]);}/*]]>*/</script> </div></div><div id="main" class="sidebar-none"><div class="main-gradient"></div><div class="wf-wrap"><div class="wf-container-main"><div id="content" class="content" role="main"><div class="vc_row wpb_row wf-container" style="margin-top: 5px;margin-bottom: 20px"><div class="wpb_column vc_column_container vc_col-sm-12"><div class="wpb_wrapper"><div class="vc_empty_space" style="height: 25px" ><span class="vc_empty_space_inner"></span></div><div class="wpb_text_column wpb_content_element "><div class="wpb_wrapper"><h2 style="text-align: center; font-size: 37px;">You Receive the <strong>COMPLETE</strong> Solution</h2><h2 style="text-align: center; font-size: 30px;">Using these services your business can optimize its online presence.</h2></div></div></div></div></div><div class="upb_color" data-bg-override="ex-full" data-bg-color="#ffffff" data-fadeout="" data-fadeout-percentage="30" data-parallax-content="" data-parallax-content-sense="30" data-row-effect-mobile-disable="true" data-img-parallax-mobile-disable="true" data-rtl="false" data-custom-vc-row="" data-vc="4.8.0.1" data-theme-support="" data-overlay="false" data-overlay-color="" data-overlay-pattern="" data-overlay-pattern-opacity="" data-overlay-pattern-size=""  ></div><div class="vc_row wpb_row wf-container" style="margin-top: 0px;margin-bottom: 0px"><div class="wpb_column vc_column_container vc_col-sm-12 vc_custom_1455610583932"><div class="wpb_wrapper"><div class="vc_empty_space" style="height: 45px" ><span class="vc_empty_space_inner"></span></div> <section id="benefits-grid-1" class="benefits-grid wf-container custom-bg custom-hover-bg custom-icon-color custom-icon-hover-color" data-width="160px" data-columns="3"><style type="text/css">#benefits-grid-1 .benefits-grid-ico>.fa{font-size:0px;line-height:0px}#benefits-grid-1.custom-icon-color .benefits-grid-ico > .fa, #benefits-grid-1.custom-icon-color .benefits-grid-ico>.fa:before{color:#0052a4}#benefits-grid-1.custom-icon-hover-color a.benefits-grid-ico:hover > .fa, #benefits-grid-1.custom-icon-hover-color a.benefits-grid-ico:hover>.fa:before{color:#fff;-webkit-text-fill-color:#fff}</style><div class="wf-cell"><div><div class="text-small"><div class="line-decoration"><h5 class="benefit-title"><a href="http://www.metasensemarketing.com/seo-smm-sem-ppc-promotion.html">SEO AND SEM SERVICES</a></h5></div><p><a title="SEO AND SEM SERVICES" href="http://www.metasensemarketing.com/seo-smm-sem-ppc-promotion.html"><img class="lazy lazy-hidden" src="data:image/gif;base64,R0lGODlhAQABAIAAAAAAAP///yH5BAEAAAAALAAAAAABAAEAAAIBRAA7" data-lazy-type="image" data-lazy-src="http://www.metasensemarketing.com/wp-content/uploads/2016/01/search-engine-optimization-.png?x33364" alt="SEO AND SEM SERVICES" title="SEO AND SEM SERVICES" border="0" /><noscript><img src="http://www.metasensemarketing.com/wp-content/uploads/2016/01/search-engine-optimization-.png?x33364" alt="SEO AND SEM SERVICES" title="SEO AND SEM SERVICES" border="0" /></noscript></a></p></div></div></div><div class="wf-cell"><div><div class="text-small"><div class="line-decoration"><h5 class="benefit-title"><a href="http://www.metasensemarketing.com/e-commerce-development.html">E-COMMERCE INTEGRATION</a></h5></div><p><a title="E-COMMERCE INTEGRATION" href="http://www.metasensemarketing.com/e-commerce-development.html"><img class="lazy lazy-hidden" src="data:image/gif;base64,R0lGODlhAQABAIAAAAAAAP///yH5BAEAAAAALAAAAAABAAEAAAIBRAA7" data-lazy-type="image" data-lazy-src="http://www.metasensemarketing.com/wp-content/uploads/2016/01/ecommerce-icon.png?x33364" alt="E-COMMERCE INTEGRATION" title="E-COMMERCE INTEGRATION" border="0" /><noscript><img src="http://www.metasensemarketing.com/wp-content/uploads/2016/01/ecommerce-icon.png?x33364" alt="E-COMMERCE INTEGRATION" title="E-COMMERCE INTEGRATION" border="0" /></noscript></a></p></div></div></div><div class="wf-cell"><div><div class="text-small"><div class="line-decoration"><h5 class="benefit-title"><a href="http://www.metasensemarketing.com/care-plan.html">CARE ™ PLAN INTEGRATION</a></h5></div><p><a title="CARE ™ PLAN INTEGRATION" href="http://www.metasensemarketing.com/care-plan.html"><img class="lazy lazy-hidden" src="data:image/gif;base64,R0lGODlhAQABAIAAAAAAAP///yH5BAEAAAAALAAAAAABAAEAAAIBRAA7" data-lazy-type="image" data-lazy-src="http://www.metasensemarketing.com/wp-content/uploads/2016/01/care-icon.png?x33364" alt="CARE ™ PLAN INTEGRATION" title="CARE ™ PLAN INTEGRATION" border="0" /><noscript><img src="http://www.metasensemarketing.com/wp-content/uploads/2016/01/care-icon.png?x33364" alt="CARE ™ PLAN INTEGRATION" title="CARE ™ PLAN INTEGRATION" border="0" /></noscript></a></p></div></div></div><div class="wf-cell"><div><div class="text-small"><div class="line-decoration"><h5 class="benefit-title"><a href="http://www.metasensemarketing.com/xtreme-listing.html">XTREME LISTING SERVICE</a></h5></div><p><a title="XTREME LISTING SERVICE" href="http://www.metasensemarketing.com/xtreme-listing.html"><img class="lazy lazy-hidden" src="data:image/gif;base64,R0lGODlhAQABAIAAAAAAAP///yH5BAEAAAAALAA AAAABAAEAAAIBRAA7" data-lazy-type="image" data-lazy-src="http://www.metasensemarketing.com/wp-content/uploads/2016/01/xtreme-listing-icon.png?x33364" alt="XTREME LISTING SERVICE" title="XTREME LISTING SERVICE" border="0" /><noscript><img src="http://www.metasensemarketing.com/wp-content/uploads/2016/01/xtreme-listing-icon.png?x33364" alt="XTREME LISTING SERVICE" title="XTREME LISTING SERVICE" border="0" /></noscript></a></p></div></div></div><div class="wf-cell"><div><div class="text-small"><div class="line-decoration"><h5 class="benefit-title"><a href="http://www.metasensemarketing.com/responsive-web-design.html">RESPONSIVE WEB DESIGN</a></h5></div><p><a title="RESPONSIVE WEB DESIGN" href="http://www.metasensemarketing.com/responsive-web-design.html"><img class="lazy lazy-hidden" src="data:image/gif;base64,R0lGODlhAQABAIAAAAAAAP///yH5BAEAAAAALAA AAAABAAEAAAIBRAA7" data-lazy-type="image" data-lazy-src="http://www.metasensemarketing.com/wp-content/uploads/2016/01/web-design-icon.png?x33364" alt="RESPONSIVE WEB DESIGN" title="RESPONSIVE WEB DESIGN" border="0" /><noscript><img src="http://www.metasensemarketing.com/wp-content/uploads/2016/01/web-design-icon.png?x33364" alt="RESPONSIVE WEB DESIGN" title="RESPONSIVE WEB DESIGN" border="0" /></noscript></a></p></div></div></div><div class="wf-cell"><div><div class="text-small"><div class="line-decoration"><h5 class="benefit-title"><a href="http://www.metasensemarketing.com/mobile-apps.html">MOBILE APP DEVELOPMENT</a></h5></div><p><a title="MOBILE APP DEVELOPMENT" href="http://www.metasensemarketing.com/mobile-apps.html"><img class="lazy lazy-hidden" src="data:image/gif;base64,R0lGODlhAQABAIAAAAAAAP///yH5BAEAAAAALAA AAAABAAEAAAIBRAA7" data-lazy-type="image" data-lazy-src="http://www.metasensemarketing.com/wp-content/uploads/2016/01/mobile-apps-icon.png?x33364" alt="MOBILE APP DEVELOPMENT" title="MOBILE APP DEVELOPMENT" border="0" /><noscript><img src="http://www.metasensemarketing.com/wp-content/uploads/2016/01/mobile-apps-icon.png?x33364" alt="MOBILE APP DEVELOPMENT" title="MOBILE APP DEVELOPMENT" border="0" /></noscript></a></p></div></div></div><div class="wf-cell"><div><div class="text-small"><div class="line-decoration"><h5 class="benefit-title"><a href="http://www.metasensemarketing.com/videos-production.html">VIDEO PRODUCTION</a></h5></div><p><a title="VIDEO PRODUCTION" href="http://www.metasensemarketing.com/videos-production.html"><img class="lazy lazy-hidden" src="data:image/gif;base64,R0lGODlhAQABAIAAAAAAAP///yH5BAEAAAAALAAAAAABAAEAAAIBRAA7" data-lazy-type="image" data-lazy-src="http://www.metasensemarketing.com/wp-content/uploads/2016/01/video-icon.png?x33364" alt="VIDEO PRODUCTION" title="VIDEO PRODUCTION" border="0" /><noscript><img src="http://www.metasensemarketing.com/wp-content/uploads/2016/01/video-icon.png?x33364" alt="VIDEO PRODUCTION" title="VIDEO PRODUCTION" border="0" /></noscript></a></p></div></div></div><div class="wf-cell"><div><div class="text-small"><div class="line-decoration"><h5 class="benefit-title"><a href="http://www.metasensemarketing.com/creative-design.html">CREATIVE GRAPHIC DESIGN</a></h5></div><p><a title="CREATIVE GRAPHIC DESIGN" href="http://www.metasensemarketing.com/creative-design.html"><img class="lazy lazy-hidden" src="data:image/gif;base64,R0lGODlhAQABAIAAAAAAAP///yH5BAEAAAAALAAAAAABAAEAAAIBRAA7" data-lazy-type="image" data-lazy-src="http://www.metasensemarketing.com/wp-content/uploads/2016/01/creative-icon.png?x33364" alt="CREATIVE GRAPHIC DESIGN" title="CREATIVE GRAPHIC DESIGN" border="0" /><noscript><img src="http://www.metasensemarketing.com/wp-content/uploads/2016/01/creative-icon.png?x33364" alt="CREATIVE GRAPHIC DESIGN" title="CREATIVE GRAPHIC DESIGN" border="0" /></noscript></a></p></div></div></div><div class="wf-cell"><div><div class="text-small"><div class="line-decoration"><h5 class="benefit-title"><a href="http://www.metasenseinc.com/">IT STAFFING SOLUTIONS</a></h5></div><p><a title="IT STAFFING SOLUTIONS" href="http://www.metasenseinc.com/"><img class="lazy lazy-hidden" src="data:image/gif;base64,R0lGODlhAQABAIAAAAAAAP///yH5BAEAAAAALAAAAAABAAEAAAIBRAA7" data-lazy-type="image" data-lazy-src="http://www.metasensemarketing.com/wp-content/uploads/2016/01/staffing-icon.png?x33364" alt="IT STAFFING SOLUTIONS" title="IT STAFFING SOLUTIONS" border="0" /><noscript><img src="http://www.metasensemarketing.com/wp-content/uploads/2016/01/staffing-icon.png?x33364" alt="IT STAFFING SOLUTIONS" title="IT STAFFING SOLUTIONS" border="0" /></noscript></a></p></div></div></div></section><div class="vc_empty_space" style="height: 40px" ><span class="vc_empty_space_inner"></span></div></div></div><div class="vc_row wpb_row wf-container" style="margin-top: 0px;margin-bottom: 0px"><div class="wpb_column vc_column_container vc_col-sm-12"><div class="wpb_wrapper"><div class="vc_empty_space" style="height: 20px" ><span class="vc_empty_space_inner"></span></div><div class="wpb_text_column wpb_content_element "><div class="wpb_wrapper"><div style="clear: both;"><h1 style="text-align: left; font-size: 40px; font-weight: bold;"><span style="color: #fff;">LET YOUR BUSINESS REALIZE ITS FULL POTENTIAL</span></h1></div><div style="clear: both;"><h3 style="text-align: left;"><span style="color: #fff; font-size: 22px; line-height: 30px; font-weight: bold;">Lost in an overwhelming sea of digital marketing options and don't know how to start? Let MetaSense Marketing guide your business to its full potential.</span></h3></div></div></div><div class="vc_empty_space" style="height: 20px" ><span class="vc_empty_space_inner"></span></div><div class="wpb_text_column wpb_content_element "><div class="wpb_wrapper"><div style="color: #fff; margin-left: 20px; font-size: 18px; font-weight: bold; line-height:

30px;"><ul><li>MetaSense Marketing gives you a focused marketing plan designed to meet your goals.</li><li>We see your future and will chart your marketing path.</li><li>We organize all of your channels, integrate your tools and get your brand consistent with your message.</li></ul></div></div></div><div class="vc_empty_space" style="height: 20px" ><span class="vc_empty_space_inner"></span></div><div class="vc_row wpb_row vc_inner wf-container"><div class="wpb_column vc_column_container vc_col-sm-3"><div class="wpb_wrapper"><a class="ubtn-link ubtn-left ubtn-custom " href = "http://www.metasensemarketing.com/solutions.html" target=" ><button type="button" class="ubtn ubtn-custom ubtn-no-hover-bg none ubtn-left tooltip-5a25678dd491a" data-hover="#ffffff" data-border-color="#002855" data-bg="#ffffff" data-hover-bg="#17a3c2" data-border-hover="#002855" data-shadow-hover="" data-shadow-click="none" data-shadow="" data-shd-shadow="" style="font-family:'Open Sans';font-weight:300;font-size:30px;width:300px;min-height:53px;padding:px px;border-radius:0px;border-width:0px;border-color:#002855;border-style:solid;background: #ffffff;color: #000000;"><span class="ubtn-hover" style="background-color:#17a3c2"></span><span class="ubtn-data ubtn-text">LEARN MORE</span></button></a></div></div><div class="wpb_column vc_column_container vc_col-sm-3"><div class="wpb_wrapper"><a class="ubtn-link ubtn-left ubtn-custom " href = "http://www.metasensemarketing.com/contact.html" target=" ><button type="button" class="ubtn ubtn-custom ubtn-no-hover-bg none ubtn-left tooltip-5a25678dd4d4e" data-hover="#ffffff" data-border-color="#002855" data-bg="#ffffff" data-hover-bg="#17a3c2" data-border-hover="#002855" data-shadow-hover="" data-shadow-click="none" data-shadow="" data-shd-shadow="" style="font-family:'Open Sans';font-weight:300;font-size:30px;width:300px;min-height:53px;padding:px px;border-radius:0px;border-width:0px;border-color:#002855;border-style:solid;background: #ffffff;color: #000000;"><span class="ubtn-hover" style="background-color:#17a3c2"></span><span class="ubtn-data ubtn-text">GET STARTED</span></button></a></div></div><div class="wpb_column vc_column_container vc_col-sm-3"><div class="wpb_wrapper"></div></div><div class="wpb_column vc_column_container vc_col-sm-3"><div class="wpb_wrapper"></div></div></div><div class="vc_empty_space" style="height: 50px" ><span class="vc_empty_space_inner"></span></div></div></div></div><div class="upb_color" data-bg-override="ex-full" data-bg-color="#002855" data-fadeout="" data-fadeout-percentage="30" data-parallax-content="" data-parallax-content-sense="30" data-row-effect-mobile-disable="true" data-img-parallax-mobile-disable="true" data-rtl="false" data-custom-vc-row="" data-vc="4.8.0.1" data-theme-support="" data-overlay="false" data-overlay-color="" data-overlay-pattern="" data-overlay-pattern-opacity="" data-overlay-pattern-size="" ></div><div class="vc_row wpb_row wf-container" style="margin-top: 0px;margin-bottom: 0px"><div class="wpb_column vc_column_container vc_col-sm-12"><div class="wpb_wrapper"><div class="vc_empty_space" style="height: 20px" ><span class="vc_empty_space_inner"></span></div><div class="wpb_text_column wpb_content_element "><div class="wpb_wrapper"><h2 style="text-align: center;"><strong>Marketing Resources Made for You</strong></h2></div></div><div class="vc_empty_space" style="height: 20px" ><span class="vc_empty_space_inner"></span></div></div></div></div><div class="vc_row wpb_row wf-container" style="margin-top: 0px;margin-bottom: 0px"><div class="wpb_column vc_column_container vc_col-sm-6 vc_custom_14556l1604727"><div class="wpb_wrapper"><div class="wpb_text_column wpb_content_element "><div class="wpb_wrapper"><div style="font-weight: bold; color: #000; margin-bottom: 5px; font-size: 18px; clear: both;">JUMPSTART YOUR DIGITAL MARKETING FOR FREE</div><div style="font-weight: normal; color: #000; clear: both; font-style: italic;">Join our monthly newsletter and get free digital marketing strategies, infographics and research sent directly to you each month</div></div></div><div class="vc_empty_space" style="height: 10px" ><span class="vc_empty_space_inner"></span></div><div class="wpb_text_column wpb_content_element "><div class="wpb_wrapper"><style>input[type="text"]::-webkit-input-placeholder{color:#ccc;font-size:15px;font-weight:bold}input[type="email"]::-webkit-input-placeholder{color:#ccc;font-size:15px;font-weight:bold}input[type="tel"]::-webkit-input-placeholder{color:#ccc;font-size:15px;font-weight:bold}input[type="url"]::- webkit-input-placeholder{color:#ccc;font-size:15px;font-weight:bold}input[type="text"]:-moz-placeholder{color:#ccc;font-size:15px;font-weight:bold}input[type="email"]:-moz-placeholder{color:#ccc;font-size:15px;font-weight:bold}input[type="tel"]:-moz-placeholder{color:#ccc;font-size:15px;font-weight:bold}input[type="url"]:-moz-placeholder{color:#ccc;font-size:15px;font-weight:bold}input[type="text"]:-moz-placeholder{color:#ccc;font-size:15px;font-weight:bold}input[type="email"]:-moz-placeholder{color:#ccc;font-size:15px;font-weight:bold}input[type="tel"]:-moz-placeholder{color:#ccc;font-size:15px;font-weight:bold}input[type="url"]:-moz-placeholder{color:#ccc;font-size:15px;font-weight:bold}input[type="text"]:-ms-input-placeholder{color:#ccc;font-size:15px;font-weight:bold}input[type="email"]:-ms-input-placeholder{color:#ccc;font-size:15px;font-weight:bold}input[type="tel"]:-ms-input-placeholder{color:#ccc;font-size:15px;font-weight:bold}input[type="url"]:-ms-input-placeholder{color:#ccc;font-size:15px;font-weight:bold}input[type=text],input[type=password],input[type=email],textarea,select{width:100%;padding:7px 15px;background-color:#fbfcfc;border:1px solid #e0e1e1;border-radius:2px;color:#333;height:50px}input[type=submit]{width:120px;height:45px;font-size:20px}.textbox_margin{margin-bottom:5px;clear:both}p{margin-top:0px;margin-bottom:7px}</style><div id="lblMsg" style="color:#F00; text-align:center; margin-top:10px; margin-bottom:10px;font-size:12px"></div> <a name="jumpanchor" id="jumpanchor"></a><form method="post" name="jumpform" id="jumpform" action="http://www.metasensemarketing.com/jump-start-submit.html" onSubmit="return validation()" > <input type="text" name="fullname" value="" size="40" class="wpcf7-form-control wpcf7-text" aria-required="true" aria-invalid="false" placeholder="NAME"><input type="text" name="company" value="" size="40" class="wpcf7-form-control wpcf7-text" aria-required="true" aria-invalid="false" placeholder="COMPANY"><input type="email" name="primemail" value="" size="40" class="wpcf7-form-control wpcf7-text wpcf7-email" aria-required="true" aria-invalid="false" placeholder="EMAIL"><div style="clear:both"></div><div style="float:left;"><input type="text" name="user_code" id="user_code" class="wpcf7-form-control wpcf7-text" maxlength="10" placeholder="ENTER CODE"/></div><div style="float:left; margin-left:20px;"><img class="img-responsive captcha-img"

src="http://www.metasensemarketing.com/wp-content/securimage/securimage_show1.php?sid=167aa912cbe2b6f7dd794d68827494f9" alt="CAPTCHA Image" align="left" name="siimage" id="siimage" style="border:1px solid #E7E7E7;"/> <img src="http://www.metasensemarketing.com/wp-content/icon_refresh.jpg?x33364" class="img-responsive" style="cursor: pointer;padding:15px 0px 30px 10px;" onClick="document.getElementById('siimage').src = 'http://www.metasensemarketing.com/wp-content/securimage/securimage_show1.php?sid=' + Math.random(); this.blur(); return false" id="change-image"/></div><div style="clear:both"></div> <input type="submit" name="jumpsubmit" id="jumpsubmit" value="Submit" class="wpcf7-form-control wpcf7-submit"></form> <script language="javascript">function validation(){t=jumpform.fullname.value.trim();if(t==""){document.getElementById('lbl Msg').innerHTML='Please Enter Name.';jumpform.fullname.focus();return(false);} t=jumpform.company.value.trim();if(t==""){document.getElementById('lblMsg').innerH TML='Please Enter Company.';jumpform.company.focus();return(false);} t=jumpform.primemail.value.trim();if(t==""){document.getElementById('lblMsg').inner HTML='Please Enter Email.';jumpform.primemail.focus();return(false);} t=jumpform.primemail.value.trim();emailformat=/^\w+([\.-]?\w+)*@\w+([\.-]?\w+)*(\.\w{2,3})+$/;if(!t.match(emailformat)) {document.getElementById('lblMsg').innerHTML='Please Enter a valid Email.';jumpform.primemail.focus();return(false);} t=jumpform.user_code.value.trim();if(t==""){document.getElementById('lblMsg').inner HTML='Please Enter Code.';jumpform.user_code.focus();return(false);} return true;}</script> </div></div><div class="vc_empty_space" style="height: 40px" ><span class="vc_empty_space_inner"></span></div></div></div><div class="wpb_column vc_column_container vc_col-sm-6 vc_custom_1455611362259"><div class="wpb_wrapper"><div class="wpb_text_column wpb_content_element "><div class="wpb_wrapper"><h4><div class="shortcode-single-image-wrap alignleft" style="margin-top:5px; margin-bottom:20px; margin-left:0px; margin-right:30px; width:180px;"><div class="shortcode-

```
single-image"><div class="fancy-media-wrap"><img
src="http://www.metasensemarketing.com/wp-
content/uploads/2015/12/whitepaper.jpg?x33364" alt="Download Whitepaper"
/></div></div></div></h4><div style="line-height: 40px; font-size: 30px; color:
#000;">Read our Latest Whitepaper and Your Business has access to top
research.</div><div style="clear: both;"></div></div></div> <a class="ubtn-link ubtn-
left ubtn-custom " href = "http://www.metasensemarketing.com/white-paper.html"
target=" ><button type="button" class="ubtn ubtn-custom ubtn-no-hover-bg  none  ubtn-
left   tooltip-5a25678dd8374" data-hover="#ffffff" data-border-color="#000000" data-
bg="#ffffff" data-hover-bg="#002855" data-border-hover="" data-shadow-hover=""
data-shadow-click="none" data-shadow="" data-shd-shadow="" style="font-
family:'Open Sans';font-weight:600;font-size:20px;width:280px;min-
height:53px;padding:px px;border-radius:1px;border-width:1px;border-
color:#000000;border-style:solid;background: #ffffff;color: #000000;"><span
class="ubtn-hover" style="background-color:#002855"></span><span class="ubtn-data
ubtn-text">DOWNLOAD WHITEPAPER</span></button></a><div
class="vc_empty_space" style="height: 40px" ><span
class="vc_empty_space_inner"></span></div></div></div></div><div class="vc_row
wpb_row wf-container" style="margin-top: 0px;margin-bottom: 0px"><div
class="wpb_column vc_column_container vc_col-sm-4"><div class="wpb_wrapper"><a
class="ubtn-link ubtn-left ubtn-custom " href =
"http://www.metasensemarketing.com/resources.html" target=" ><button type="button"
class="ubtn ubtn-custom ubtn-no-hover-bg  none  ubtn-left   tooltip-5a25678dd909b"
data-hover="#ffffff" data-border-color="#ffffff" data-bg="#002855" data-hover-
bg="#17a3c2" data-border-hover="#ffffff" data-shadow-hover="" data-shadow-
click="none" data-shadow="" data-shd-shadow="" style="font-family:'Open Sans';font-
weight:600;font-size:30px;width:331px;min-height:65px;padding:px px;border-
radius:0px;border-width:0px;border-color:#ffffff;border-style:solid;background:
#002855;color: #ffffff;"><span class="ubtn-hover" style="background-
color:#17a3c2"></span><span class="ubtn-data ubtn-
text">BLOGS</span></button></a></div></div><div class="wpb_column
``` vc_column_container vc_col-sm-4"><div class="wpb_wrapper"><a class="ubtn-link ubtn-left ubtn-custom " href = "http://www.metasensemarketing.com/press-release.html" target=" ><button type="button" class="ubtn ubtn-custom ubtn-no-hover-bg none ubtn-left  tooltip-5a25678dd980a" data-hover="#ffffff" data-border-color="#ffffff" data-bg="#002855" data-hover-bg="#17a3c2" data-border-hover="#ffffff" data-shadow-hover="" data-shadow-click="none" data-shadow="" data-shd-shadow="" style="font-family:'Open Sans';font-weight:600;font-size:30px;width:331px;min-height:65px;padding:px px;border-radius:0px;border-width:0px;border-color:#ffffff;border-style:solid;background: #002855;color: #ffffff;"><span class="ubtn-hover" style="background-color:#17a3c2"></span><span class="ubtn-data ubtn-text">PRESS RELEASES</span></button></a></div></div><div class="wpb_column vc_column_container vc_col-sm-4"><div class="wpb_wrapper"><a class="ubtn-link ubtn-left ubtn-custom " href = "http://www.metasensemarketing.com/podcast-landing-page.html" target=" ><button type="button" class="ubtn ubtn-custom ubtn-no-hover-bg none ubtn-left  tooltip-5a25678dd9cbe" data-hover="#ffffff" data-border-color="#ffffff" data-bg="#002855" data-hover-bg="#17a3c2" data-border-hover="#ffffff" data-shadow-hover="" data-shadow-click="none" data-shadow="" data-shd-shadow="" style="font-family:'Open Sans';font-weight:600;font-size:30px;width:331px;min-height:65px;padding:px px;border-radius:0px;border-width:0px;border-color:#ffffff;border-style:solid;background: #002855;color: #ffffff;"><span class="ubtn-hover" style="background-color:#17a3c2"></span><span class="ubtn-data ubtn-text">PODCASTS</span></button></a><div class="vc_empty_space" style="height: 32px" ><span class="vc_empty_space_inner"></span></div></div></div><div class="vc_row wpb_row wf-container" style="margin-top: 0px;margin-bottom: 0px"><div class="wpb_column vc_column_container vc_col-sm-12"><div class="wpb_wrapper"><div class="vc_empty_space" style="height: 30px" ><span class="vc_empty_space_inner"></span></div><div class="wpb_single_image wpb_content_element vc_align_center"> <figure class="wpb_wrapper vc_figure"><div class="vc_single_image-wrapper  vc_box_border_grey"><img width="1091" height="400" src="http://www.metasensemarketing.com/wp-content/uploads/2016/09/011.png?x33364" class="vc_single_image-img attachment-full" alt="INTRODUCING iMETADEX CODING" /></div> </figure></div><div class="ubtn-ctn-center"><a class="ubtn-link ubtn-center ubtn-custom " href = "http://www.metasensemarketing.com/imetadex-landing-page.html" target=" ><button type="button" class="ubtn ubtn-custom ubtn-no-hover-bg none ubtn-center tooltip-5a25678ddc4b6" data-hover="#ffffff" data-border-color="#002855" data-bg="#ffffff" data-hover-bg="#002855" data-border-hover="#002855" data-shadow-hover="" data-shadow-click="none" data-shadow="" data-shd-shadow="" style="font-family:'Open Sans';font-weight:600;font-size:33px;width:300px;min-height:53px;padding:0px 0px;border-radius:0px;border-width:0px;border-color:#002855;border-style:solid;background: #ffffff;color: #000000;"><span class="ubtn-hover" style="background-color:#002855"></span><span class="ubtn-data ubtn-text">LEARN MORE</span></button></a></div><div class="vc_empty_space" style="height: 10px" ><span class="vc_empty_space_inner"></span></div></div></div></div><div class="upb_bg_img" data-ultimate-bg="url(http://www.metasensemarketing.com/wp-content/uploads/2016/09/banner1.jpg)" data-image-id="40583|http://www.metasensemarketing.com/wp-content/uploads/2016/09/banner1.jpg" data-ultimate-bg-style="vcpb-default" data-bg-img-repeat="no-repeat" data-bg-img-size="cover" data-bg-img-position="" data-parallx_sense="30" data-bg-override="ex-full" data-bg_img_attach="scroll" data-upb-overlay-color="" data-upb-bg-animation="" data-fadeout="" data-bg-animation="left-animation" data-bg-animation-type="h" data-animation-repeat="repeat" data-fadeout-percentage="30" data-parallax-content="" data-parallax-content-sense="30" data-row-effect-mobile-disable="true" data-img-parallax-mobile-disable="true" data-rtl="false" data-custom-vc-row="" data-vc="4.8.0.1" data-theme-support="" data-overlay="false" data-overlay-color="" data-overlay-pattern="" data-overlay-pattern-opacity="" data-overlay-pattern-size="" ></div><div class="vc_row wpb_row wf-container" style="margin-top: 0px;margin-bottom: 0px"><div class="wpb_column vc_column_container vc_col-sm-12 vc_custom_1455615976239"><div class="wpb_wrapper"><div class="vc_empty_space" style="height: 65px" ><span class="vc_empty_space_inner"></span></div><div class="wpb_text_column wpb_content_element vc_custom_1476167370365"><div class="wpb_wrapper"><div id="footcusleft" style="font-size: 20px;"><h1 style="font-size: 34px; color: #fff;"><strong>Let's Discuss YOUR PROJECT Today</strong></h1> <a href="tel:8668756382">(866) 875-6382</a><br /> <a href="http://www.metasensemarketing.com/contact.html">Contact Us</a></div></div></div><div class="vc_empty_space" style="height: 40px" ><span class="vc_empty_space_inner"></span></div></div></div></div><div class="upb_color" data-bg-override="ex-full" data-bg-color="#002855" data-fadeout="" data-fadeout-percentage="30" data-parallax-content="" data-parallax-content-sense="30" data-row-effect-mobile-disable="true" data-img-parallax-mobile-disable="true" data-rtl="false" data-custom-vc-row="" data-vc="4.8.0.1" data-theme-support="" data-overlay="false" data-overlay-color="" data-overlay-pattern="" data-overlay-pattern-opacity="" data-overlay-pattern-size=""  data-hide-row=" uvc_hidden-xs uvc_hidden-xsl " ></div><div class="vc_row wpb_row wf-container" style="margin-top: 0px;margin-bottom: 0px"><div class="wpb_column vc_column_container vc_col-sm-12"><div class="wpb_wrapper"><div class="vc_empty_space" style="height: 65px" ><span class="vc_empty_space_inner"></span></div><div class="wpb_text_column wpb_content_element "><div class="wpb_wrapper"><div id="footcusleft" style="font-size: 20px;"><h1 style="font-size: 34px; color: #fff;"><strong>Let's Discuss YOUR PROJECT Today</strong></h1> <a href="tel:8668756382">(866) 875-6382</a><br /> <a href="http://www.metasensemarketing.com/contact.html">Contact Us</a></div></div></div><div class="vc_empty_space" style="height: 40px" ><span class="vc_empty_space_inner"></span></div></div></div></div><div class="upb_color" data-bg-override="ex-full" data-bg-color="#002855" data-fadeout="" data-fadeout-percentage="30" data-parallax-content="" data-parallax-content-sense="30" data-row-effect-mobile-disable="true" data-img-parallax-mobile-disable="true" data-rtl="false" data-custom-vc-row="" data-vc="4.8.0.1" data-theme-support="" data-overlay="false" data-overlay-color="" data-overlay-pattern="" data-overlay-pattern-opacity="" data-overlay-pattern-size=""  data-hide-row=" uvc_hidden-lg uvc_hidden-ml uvc_hidden-md uvc_hidden-sm " ></div><div class="vc_row wpb_row wf-container" style="margin-top: 0px;margin-bottom: 0px"><div class="wpb_column vc_column_container vc_col-sm-12"><div class="wpb_wrapper"><div class="vc_empty_space" style="height: 30px" ><span class="vc_empty_space_inner"></span></div><div class="wpb_text_column wpb_content_element "><div class="wpb_wrapper"><h3 style="text-align: center; font-size: 30px;">Your solution is built using some of the best tools in the industry</h3></div></div><div class="vc_empty_space" style="height: 20px" ><span class="vc_empty_space_inner"></span></div><div class="wpb_single_image wpb_content_element vc_align_center  vc_custom_1451560714480"> <figure class="wpb_wrapper vc_figure"><div class="vc_single_image-wrapper   vc_box_border_grey"><img width="1020" height="58" src="http://www.metasensemarketing.com/wp-content/uploads/2015/12/work-logo1.jpg?x33364" class="vc_single_image-img attachment-full" alt="Best tools in the industry" /></div> </figure></div><div class="vc_empty_space" style="height: 20px" ><span class="vc_empty_space_inner"></span></div><div class="vc_row wpb_row vc_inner wf-container"><div class="wpb_column vc_column_container vc_col-sm-6"><div class="wpb_wrapper"><div class="wpb_text_column wpb_content_element "><div class="wpb_wrapper"><div style="clear:both; text-align:center;"><a href="http://www.bbb.org/new-jersey/business-reviews/information-technology-services/metasense-marketing-in-west-berlin-nj-90181139/#sealclick" target="_blank" rel="nofollow"><img src="http://seal-newjersey.bbb.org/seals/blue-seal-280-80-bbb-90181139.png" style="border: 1px solid #eeeeee !important;" alt="MetaSense Marketing BBB Business Review" /></a></div></div></div></div><div class="wpb_column vc_column_container vc_col-sm-6"><div class="wpb_wrapper"><div class="wpb_raw_code wpb_content_element wpb_raw_html"><div class="wpb_wrapper"><form accept-charset="UTF-8" action="https://yn367.infusionsoft.com/app/form/process/a6839b8d383637c00fd40e4198602a73" class="infusion-form" id="inf_form_a6839b8d383637c00fd40e4198602a73" method="POST" name="gain Facebook ad clients" onSubmit="var form = document.forms[0]; var resolution = document.createElement('input'); resolution.setAttribute('id', 'screenResolution'); resolution.setAttribute('type', 'hidden'); resolution.setAttribute('name', 'screenResolution'); var resolutionString = screen.width +

'x' + screen.height; resolution.setAttribute('value', resolutionString); form.appendChild(resolution); var pluginString = ''; if (window.ActiveXObject) { var activeXNames = {'AcroPDF.PDF':'Adobe Reader', 'ShockwaveFlash.ShockwaveFlash':'Flash', 'QuickTime.QuickTime':'Quick Time', 'SWCtl':'Shockwave', 'WMPLayer.OCX':'Windows Media Player', 'AgControl.AgControl':'Silverlight'}; var plugin = null; for (var activeKey in activeXNames) { try { plugin = null; plugin = new ActiveXObject(activeKey); } catch (e) { // do nothing, the plugin is not installed } pluginString += activeXNames[activeKey] + ','; } var realPlayerNames = ['rmockx.RealPlayer G2 Control', 'rmocx.RealPlayer G2 Control.1', 'RealPlayer.RealPlayer(tm) ActiveX Control (32-bit)', 'RealVideo.RealVideo(tm) ActiveX Control (32-bit)', 'RealPlayer']; for (var index = 0; index < realPlayerNames.length; index++) { try { plugin = new ActiveXObject(realPlayerNames[index]); } catch (e) { continue; } if (plugin) { break; } } if (plugin) { pluginString += 'RealPlayer,'; } } else { for (var i = 0; i < navigator.plugins.length; i++) { pluginString += navigator.plugins[i].name + ','; } } pluginString = pluginString.substring(0, pluginString.lastIndexOf(',')); var plugins = document.createElement('input'); plugins.setAttribute('id', 'pluginList'); plugins.setAttribute('type', 'hidden'); plugins.setAttribute('name', 'pluginList'); plugins.setAttribute('value', pluginString); form.appendChild(plugins); var java = navigator.javaEnabled(); var javaEnabled = document.createElement('input'); javaEnabled.setAttribute('id', 'javaEnabled'); javaEnabled.setAttribute('type', 'hidden'); javaEnabled.setAttribute('name', 'javaEnabled'); javaEnabled.setAttribute('value', java); form.appendChild(javaEnabled);"> <input name="inf_form_xid" type="hidden" value="a6839b8d383637c00fd40e4198602a73" /><input name="inf_form_name" type="hidden" value="gain Facebook ad clients" /><input name="infusionsoft_version" type="hidden" value="1.67.0.60" /><div style="margin-top:15px; float:left; margin-right:10px;"> <input type="text" id="inf_field_Email" name="inf_field_Email" value="" size="40" class="infusion-field-input-container wpcf7-form-control wpcf7-text wpcf7-email" aria-required="true" style="width:100%; font-weight:bold !important; font-size:15px !important;" aria-invalid="false" placeholder="EMAIL"></div><div style="margin-top:17px; float:left;"> <button style="" type="submit" value="Submit"

```
class="wpcf7-form-control wpcf7-submit">Subscribe</button></div></form></div></div></div></div></div><div class="vc_empty_space" style="height: 32px" ><span class="vc_empty_space_inner"></span></div></div></div></div> <span itemscope itemtype="http://schema.org/Article" class="itempropwp-wrap"><meta itemprop="name" content="Home" /><meta itemprop="headline" content="Home" /><meta itemscope itemprop="mainEntityOfPage" itemType="https://schema.org/WebPage" itemid="http://www.metasensemarketing.com/"/><meta itemprop="url" content="http://www.metasensemarketing.com/" /><span itemprop="image" itemscope itemtype="https://schema.org/ImageObject"><meta itemprop="url" content="http://www.metasensemarketing.com/wp-content/uploads/2016/03/logo.png" /><meta itemprop="width" content="280"/><meta itemprop="height" content="61"/></span><meta itemprop="author" content="http://www.metasensemarketing.com/author/metasensemarketing/" /><meta itemprop="description" content="Home" /><meta itemprop="datePublished" content="2017-05-23 05:33:21" /><meta itemprop="dateModified" content="2017-11-08 06:18:03" /><span itemprop="publisher" itemscope itemtype="https://schema.org/Organization"><span itemprop="logo" itemscope itemtype="https://schema.org/ImageObject"><meta itemprop="url" content="http://www.metasensemarketing.com/wp-content/uploads/2016/02/logo.png"></span><meta itemprop="name" content="MetaSense Marketing"></span></span></div></div></div></div> <footer id="footer" class="footer transparent-bg"><div id="bottom-bar" class="full-width-line" role="contentinfo"><div class="wf-wrap"><div class="wf-container-bottom"><div class="wf-table wf-mobile-collapsed"><div id="branding-bottom" class="wf-td"><a href="http://www.metasensemarketing.com/"><img class=" preload-me" srcset="http://www.metasensemarketing.com/wp-content/uploads/2017/03/monogram1.png 1x, http://www.metasensemarketing.com/wp-content/uploads/2017/03/monogram1.png 2x" width="56" height="50" alt="MetaSense Marketing" /></a></div><div class="wf-td"><div class="wf-float-
``` left"> Copyright @ MetaSense Marketing Management Inc. 1999-2017. <a href="http://www.metasensemarketing.com/terms-conditions.html">Terms of Use</a> | <a href="http://www.metasensemarketing.com/privacy-policy.html">Privacy Policy</a> | <a href="http://www.metasensemarketing.com/press-release.html">Press Release</a> | <a href="http://www.metasensemarketing.com/partner-affiliates.html">Partner and Affiliates</a></div><div style="float:right; padding-right:20px; font-size:16px;"><a href="http://www.metasenseusa.com/marketing/" target="_blank"><strong>MARKETING LOGIN</strong></a></div></div><div class="wf-td"></div></div></div></div> </footer><a href="#" class="scroll-top"></a></div><link rel='stylesheet' id='background-style-css' href='http://www.metasensemarketing.com/wp-content/plugins/Ultimate_VC_Addons/modules/../assets/min-css/background-style.min.css?x33364' type='text/css' media='all' /> <script type='text/javascript' src='http://www.metasensemarketing.com/wp-includes/js/jquery/ui/core.min.js?x33364'></script> <script type='text/javascript' src='http://www.metasensemarketing.com/wp-includes/js/jquery/ui/datepicker.min.js?x33364'></script> <script type='text/javascript' src='http://www.metasensemarketing.com/wp-content/plugins/contact-form-7/includes/js/jquery.form.min.js?x33364'></script> <script type='text/javascript'>var _wpcf7={"loaderUrl":"http:\/\/www.metasensemarketing.com\/wp-content\/plugins\/contact-form-7\/images\/ajax-loader.gif","recaptchaEmpty":"Please verify that you are not a robot.","sending":"Sending ...","cached":"1"};</script> <script type='text/javascript' src='http://www.metasensemarketing.com/wp-content/plugins/contact-form-7/includes/js/scripts.js?x33364'></script> <script type='text/javascript'>var es_widget_notices={"es_email_notice":"Please enter email address","es_incorrect_email":"Please provide a valid email address","es_load_more":"loading...","es_ajax_error":"Cannot create XMLHTTP instance","es_success_message":"Successfully Subscribed.","es_success_notice":"Your subscription was successful! Within a few minutes, kindly check the mail in your mailbox and confirm your subscription. If you can't see the mail in your mailbox, please check your spam folder.","es_email_exists":"Email Address already exists!","es_error":"Oops.. Unexpected error occurred.","es_invalid_email":"Invalid email address","es_try_later":"Please try after some time","es_problem_request":"There was a problem with the request"};</script> <script type='text/javascript' src='http://www.metasensemarketing.com/wp-content/plugins/email-subscribers/widget/es-widget.js?x33364'></script> <script type='text/javascript'>var es_widget_page_notices={"es_email_notice":"Please enter email address","es_incorrect_email":"Please provide a valid email address","es_load_more":"loading...","es_ajax_error":"Cannot create XMLHTTP instance","es_success_message":"Successfully Subscribed.","es_success_notice":"Your subscription was successful! Within a few minutes, kindly check the mail in your mailbox and confirm your subscription. If you can't see the mail in your mailbox, please check your spam folder.","es_email_exists":"Email Address already exists!","es_error":"Oops.. Unexpected error occurred.","es_invalid_email":"Invalid email address","es_try_later":"Please try after some time","es_problem_request":"There was a problem with the request"};</script> <script type='text/javascript' src='http://www.metasensemarketing.com/wp-content/plugins/email-subscribers/widget/es-widget-page.js?x33364'></script> <script type='text/javascript' src='http://www.metasensemarketing.com/wp-content/plugins/simple-share-buttons-adder/js/ssba.min.js?x33364'></script> <script type='text/javascript' src='http://www.metasensemarketing.com/wp-content/plugins/speedupwp/js/speedupwp-frontend-custom.js?x33364'></script> <script type='text/javascript' src='http://www.metasensemarketing.com/wp-content/plugins/bj-lazy-load/js/bj-lazy-load.min.js?x33364'></script> <script type='text/javascript' src='http://www.metasensemarketing.com/wp-content/themes/dt-the7/js/main.min.js?x33364'></script> <script type='text/javascript' src='http://www.metasensemarketing.com/wp-content/plugins/easy-testimonials/include/assets/js/jquery.cycle2.min.js?x33364'></script> <script type='text/javascript' src='http://www.metasensemarketing.com/wp-content/plugins/js_composer/assets/js/js_composer_front.js?x33364'></script> <script type='text/javascript' src='http://www.metasensemarketing.com/wp-content/plugins/Ultimate_VC_Addons/assets/min-js/jquery-appear.min.js?x33364'></script> <script type='text/javascript' src='http://www.metasensemarketing.com/wp-content/plugins/Ultimate_VC_Addons/modules/../assets/min-js/ultimate_bg.min.js?x33364'></script> <script type='text/javascript' src='http://www.metasensemarketing.com/wp-content/plugins/Ultimate_VC_Addons/assets/min-js/custom.min.js?x33364'></script> <script type="text/javascript" src="https://s3.amazonaws.com/phonescript/phonedivwrapper_v1_3.js"></script> <script type="text/javascript">addPhoneNumber("866","875","6382");replaceText("","");</script> <script type="text/javascript" src="https://s3.amazonaws.com/phonescript/148945.js"></script> <noscript><img src="http://www.glb12pkgr.com/68524.png" alt="none" style="display:none;" /></noscript></body></html>

Figure 11:
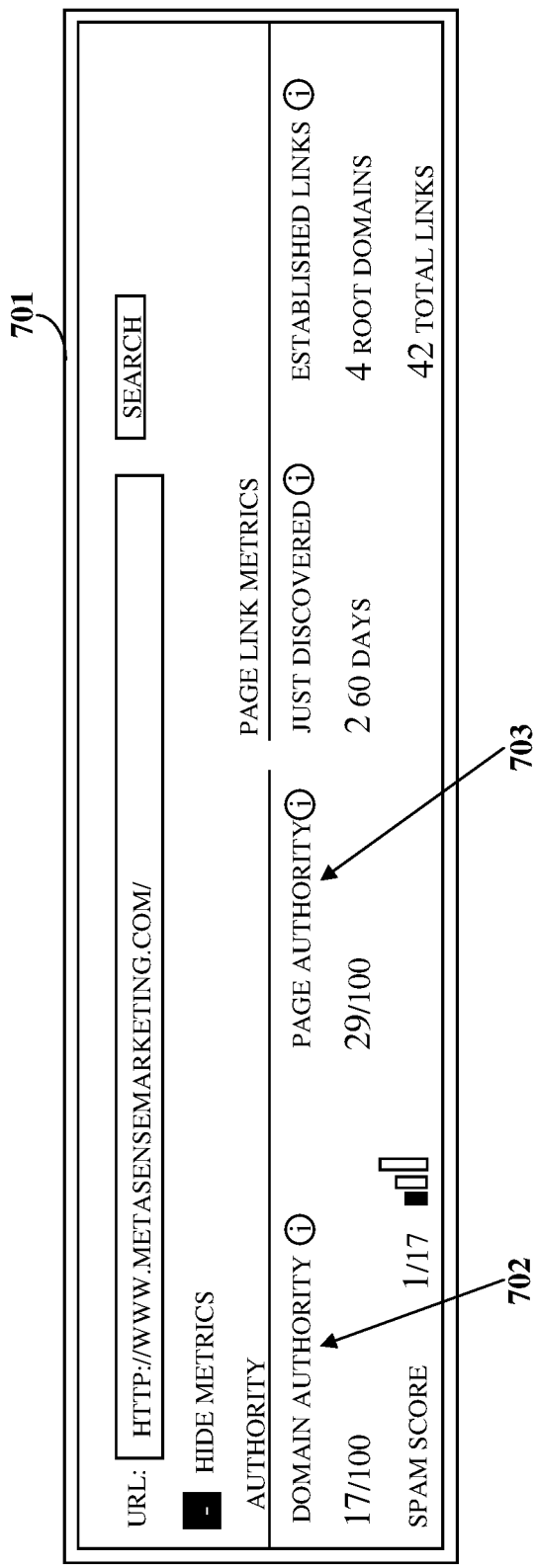
FIG. 11 exemplarily illustrates a screenshot of a graphical user interface showing performance metrics of the website shown in FIG. 8A, that is validated and coded by the content validation and coding system.

FIG. 11 exemplarily illustrates a screenshot of a graphical user interface (GUI) 701 showing performance metrics of the website 801 shown in FIG. 8A, that is validated and coded by the content validation and coding system (CVCS). As exemplarily illustrated in FIG. 11, the performance metrics indicate that the domain authority 702 has increased from 0 to 17 and the page authority 703 has increased from 0 to 29, which indicates that the traffic of the website 801 increased by 30% in a short span.

Figure 12:
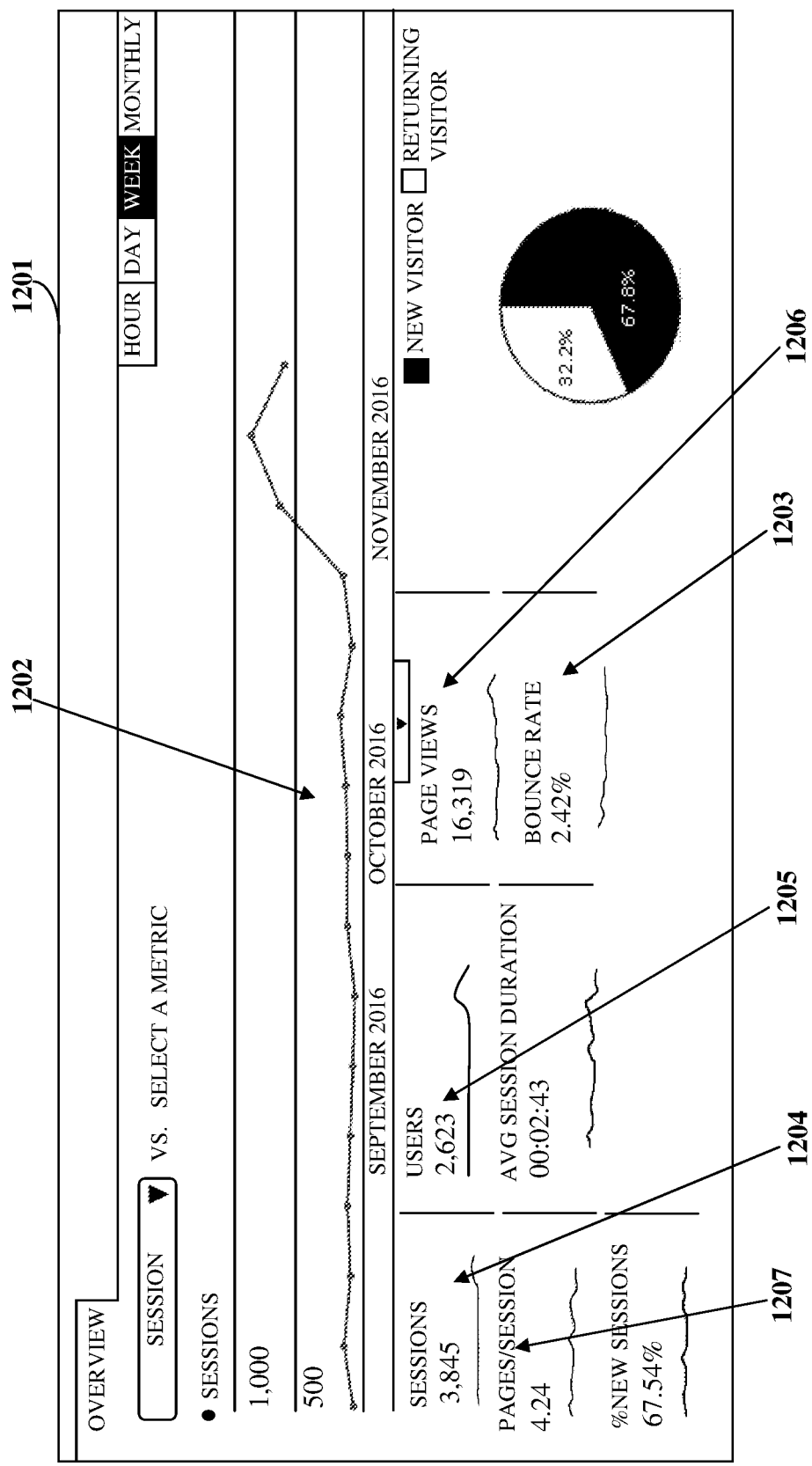
FIG. 12 exemplarily illustrates a screenshot of a graphical user interface showing an increase in traffic to the website shown in FIG. 8A, that is validated and coded by the content validation and coding system.

FIG. 12 exemplarily illustrates a screenshot of a graphical user interface (GUI) 1201 showing an increase in traffic to the website 801 shown in FIG. 8A, that is validated and coded by the content validation and coding system (CVCS). The screenshot shown in FIG. 12, illustrates a sessions versus week metrics graph 1202 for the website 801. The screenshot shows that bounce rate 1203 reduced from 60% to 2.42%. Bounce rate 1203 refers to a percentage of visitors to a website, who navigate away from the website after viewing only one webpage of the website. As exemplarily illustrated in FIG. 12, a sessions metric 1204, a users metric 1205, a page views metric 1206, and a pages per session metric 1207 increased for the website 801. The increase in the sessions metric 1204, the users metric 1205, the page views metric 1206, and the pages per session metric 1207 is due to the addition of the optimal schema codes with content driven marketing and backlinks in the content of the website 801 by the CVCS, without paid advertising.

Figure 13:
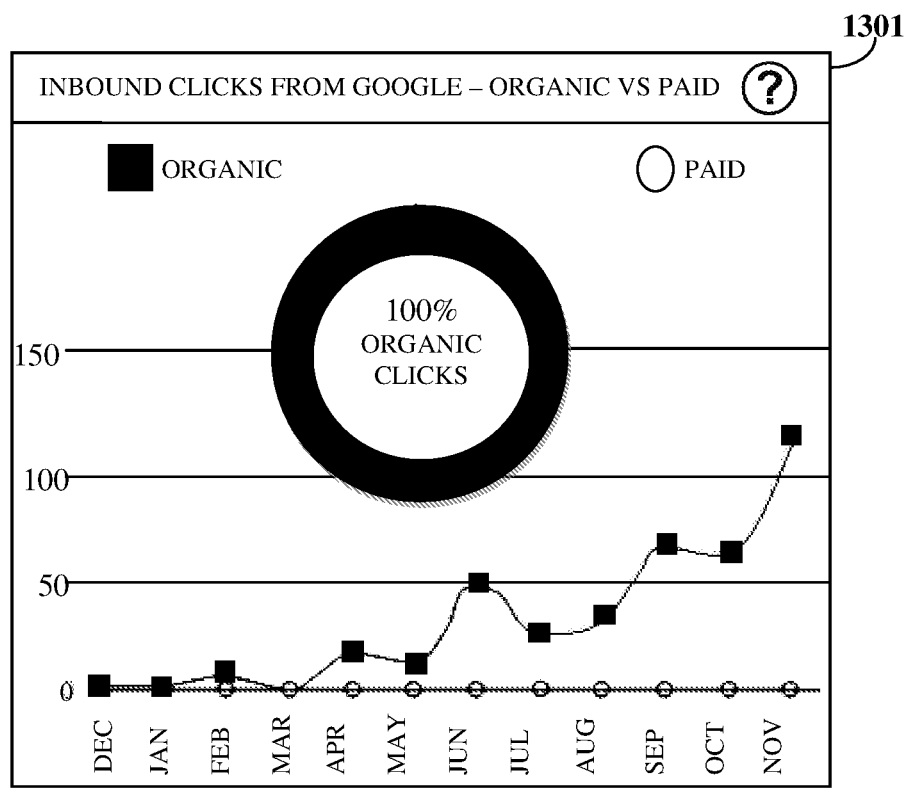
FIG. 13 exemplarily illustrates a screenshot of a graphical user interface showing analytics data of a website from a search engine after validation and coding of the website by the content validation and coding system.

FIG. 13 exemplarily illustrates a screenshot of a graphical user interface (GUI) 1301 showing analytics data of a website from a search engine after validation and coding of the website by the content validation and coding system (CVCS). FIG. 13 exemplarily illustrates a graph of inbound clicks from Google Inc., comprising organic clicks versus paid clicks obtained, for example, using the SpyFu search analytics tool of SpyFu Properties, LLC. An organic click is a click to the website through snippet links found in organic search results. Organic search results are results chosen by search engines based on a match of the content of the website to a user's query. Paid clicks refer to clicks on search engine displayed results that are paid to appear in search results of the search engines. The SpyFu search analytics tool displays keywords that websites buy, for example, on the Adwords® advertising tool of Google Inc., and the keywords for which the websites are displayed, within the search results. The CVCS search engine optimization service and the organic clicks improve the optimization of websites.

Figure 14:
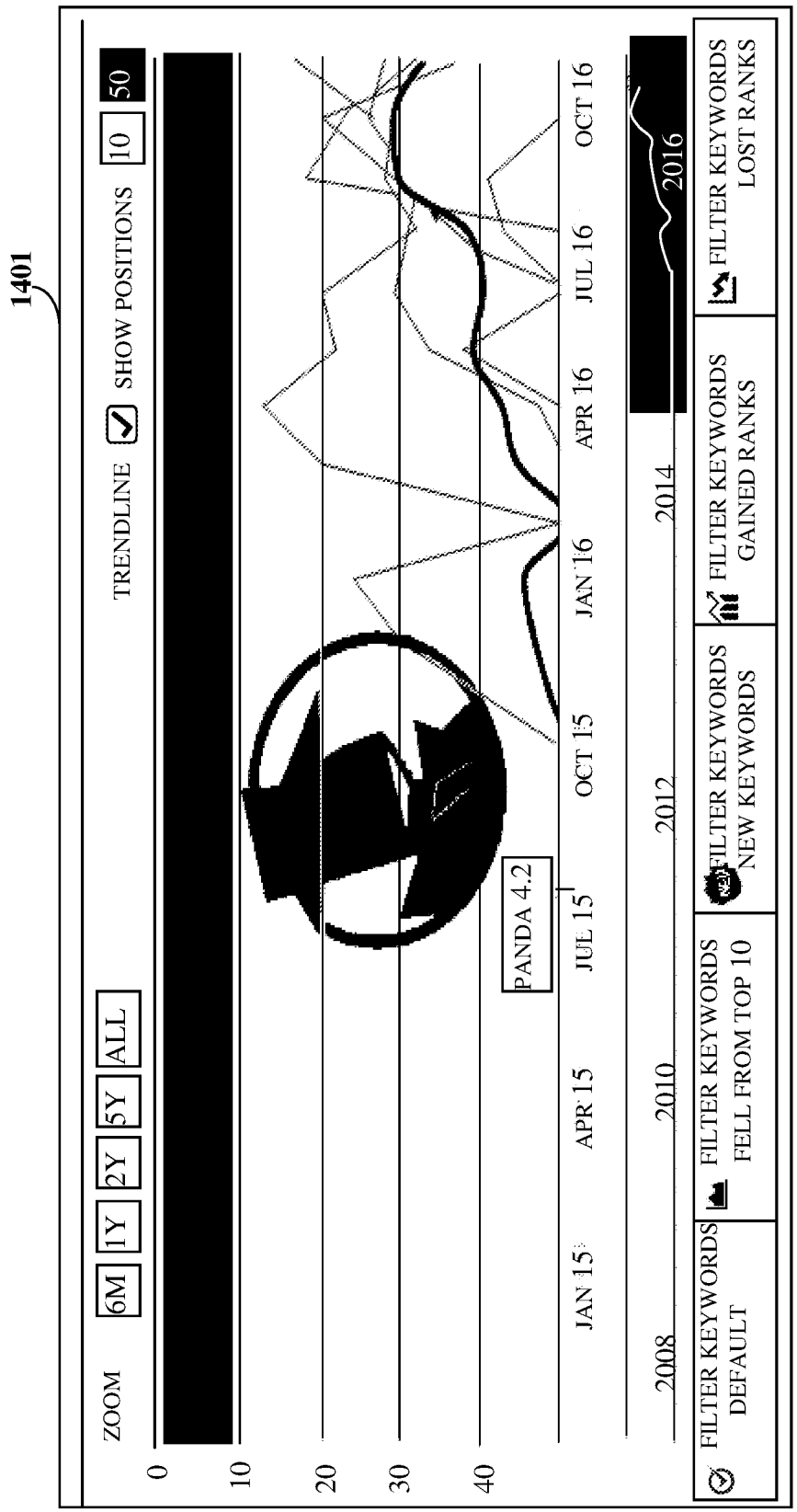
FIG. 14 exemplarily illustrates a screenshot of a graphical user interface showing performance of a website over a period of time, after validation and coding of the website by the content validation and coding system.

FIG. 14 exemplarily illustrates a screenshot of a graphical user interface (GUI) 1401 showing performance of a website over a period of time, after validation and coding of the website by the content validation and coding system (CVCS). Due to the CVCS implementation on the website, the performance of the website determined by website traffic and website rankings increases over a span of time as exemplarily illustrated on the GUI 1401 in FIG. 14. The increase in the website traffic and the website rankings is due to the implementation of the CVCS without paid advertising. The CVCS implements the coding process on the website for search engine optimization.

Figure 15:
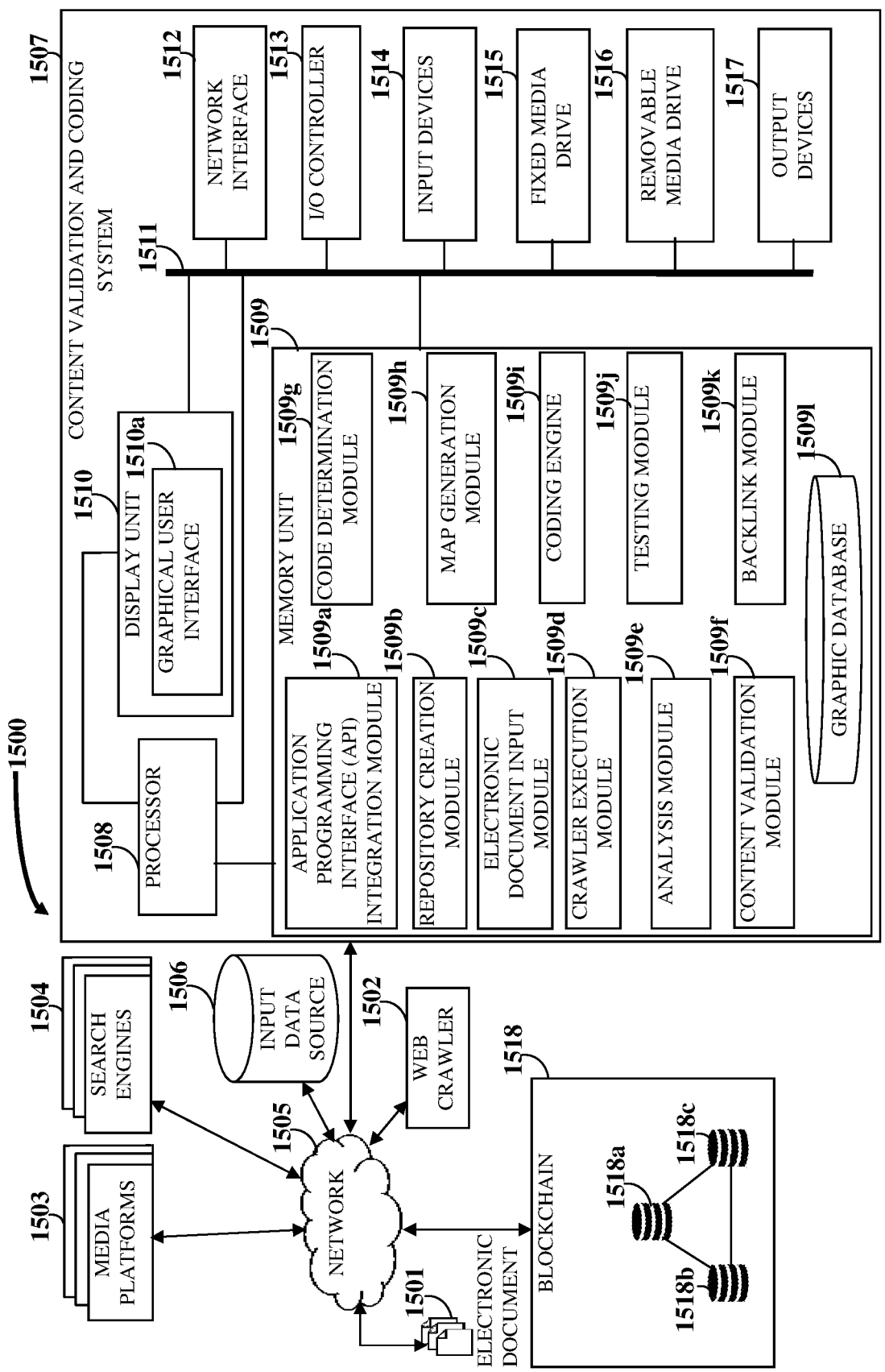
FIG. 15 exemplarily illustrates a system comprising the content validation and coding system for validating and coding content of an electronic document for search engine optimization.

FIG. 15 exemplarily illustrates a system 1500 comprising the content validation and coding system (CVCS) 1507 for validating and coding content of an electronic document 1501, for example, a website, for search engine optimization. The CVCS 1507 is a computer system that is programmable using a high level computer programming language. In an embodiment, the CVCS 1507 is implemented on a computing device, for example, one or more of a personal computer, a tablet computing device, a mobile computer, a smartphone, a portable computing device, a laptop, a touch centric device, a workstation, a server, a portable electronic device, a network enabled computing device, an interactive network enabled communication device, any other suitable computing equipment, combinations of multiple pieces of computing equipment, etc., using programmed and purposeful hardware. In an embodiment, the CVCS 1507 is configured as a cloud computing based platform implemented as a service. For example, the CVCS 1507 is configured as a software as a service (SaaS) platform or a cloud based software as a service (CSaaS) platform that performs content validation and coding for search engine optimization.

In an embodiment, the content validation and coding system (CVCS) 1507 communicates with an input data source 1506, a web crawler 1502, search engines 1504, and media platforms 1503 via a network 1505, for example, a short range network or a long range network. The CVCS 1507 interfaces with the input data source 1506, the web crawler 1502, the search engines 1504, and the media platforms 1503 to implement the search engine optimization service by validating and coding content of the electronic document 1501, and therefore more than one specifically programmed computing system is used for implementing the search engine optimization service. The network 1505 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the content validation and coding system (CVCS) 1507 is accessible to users, for example, through a broad spectrum of technologies and devices such as personal computers with access to the internet, internet enabled cellular phones, tablet computing devices, etc.

As exemplarily illustrated in FIG. 15, the content validation and coding system (CVCS) 1507 comprises a non-transitory computer readable storage medium, for example, a memory unit 1509 for storing programs and data, and at least one processor 1508 communicatively coupled to the non-transitory computer readable storage medium. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 1508. The non-transitory computer readable storage medium is configured to store computer program instructions defined by modules, for example, 1509a, 1509b, 1509c, 1509d, 1509e, 1509f, 1509g, 1509h, 1509i, 1509j, 1509k, etc., of the CVCS 1507. The modules, for example, 1509a, 1509b, 1509c, 1509d, 1509e, 1509f, 1509g, 1509h, 1509i, 1509j, 1509k, 1509l, etc., of the CVCS 1507 are installed and stored in the memory unit 1509 of the CVCS 1507. The memory unit 1509 is used for storing program instructions, applications, and data. The memory unit 1509 is, for example, a random access memory (RAM) or another type of dynamic storage device that stores information and instructions for execution by the processor 1508. The memory unit 1509 also stores temporary variables and other intermediate information used during execution of the instructions by the processor 1508. The CVCS 1507 further comprises a read only memory (ROM) or another type of static storage device that stores static information and instructions for the processor 1508.

The processor 1508 is configured to execute the computer program instructions defined by the modules, for example, 1509a, 1509b, 1509c, 1509d, 1509e, 1509f, 1509g, 1509h, 1509i, 1509j, 1509k, etc., of the content validation and coding system (CVCS) 1507. The processor 1508 refers to any of one or more microprocessors, central processing unit (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. In an embodiment, the processor 1508 is implemented as a processor set comprising, for example, a programmed microprocessor and a math or graphics co-processor. The processor 1508 is selected, for example, from the Intel® processors such as the Itanium® microprocessor or the Pentium® processors, Advanced Micro Devices (AMD®) processors such as the Athlon® processor, UltraSPARC® processors, microSPARC® processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The CVCS 1507 disclosed herein is not limited to employing a processor 1508. In an embodiment, the CVCS 1507 employs a controller or a microcontroller. The processor 1508 executes the modules, for example, 1509a, 1509b, 1509c, 1509d, 1509e, 1509f, 1509g, 1509h, 1509i, 1509j, 1509k, etc., of the CVCS 1507.

As exemplarily illustrated in FIG. 15, the content validation and coding system (CVCS) 1507 further comprises a display unit 1510, a data bus 1511, a network interface 1512, an input/output (I/O) controller 1513, input devices 1514, a fixed media drive 1515 such as a hard drive, a removable media drive 1516 for receiving removable media, output devices 1517, etc. The display unit 1510, via the graphical user interface (GUI) 1510a, displays information, display interfaces, user interface elements such as input fields, buttons, swipable arrows, icons, etc., for example, for receiving a uniform resource locator (URL) of the electronic document 1501 for validating, coding, and testing of the electronic document 1501, for displaying the identified structured data and content of the electronic document 1501, displaying the result of validation performed by the CVCS 1507, etc. The display unit 1510 comprises, for example, a video display, a liquid crystal display, a plasma display, an organic light emitting diode (OLED) based display, etc. The CVCS 1507 renders the GUI 1510a on the display unit 1510 to receive user inputs, the user's entry of the URL of the electronic document 1501, corrections to the errors identified by the CVCS 1507, etc. The display unit 1510 displays the GUI 1510a. The GUI 1510a is, for example, one of a webpage of a website hosted by the CVCS 1507, an online web interface, a web based downloadable application interface, a mobile based downloadable application interface, etc. In an embodiment, the GUI 1510a allows a user of the CVCS 1507 to input, for example, a URL of a website to be optimized. The input devices 1514 are used for inputting data into the CVCS 1507 and for routine maintenance of the CVCS 1507. The user uses the input devices 1514 to provide inputs, for example, URLs, code corrections, etc., to the CVCS 1507. The input devices 1514 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc. The output devices 1517 output the results of operations performed by the CVCS 1507. For example, the CVCS 1507 renders the results of validation of the content of the electronic document 1501 to the user of the CVCS 1507 using the output devices 1517.

The data bus 1511 permits communications between the modules, for example, 1508, 1509, 1510, 1512, 1513, 1514, 1515, 1516, 1517, etc., of the content validation and coding system (CVCS) 1507. The network interface 1512 enables connection of the CVCS 1507 to the network 1505. In an embodiment, the network interface 1512 is provided as an interface card also referred to as a "line card". The network interface 1512 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The I/O controller 1513 controls input actions and output actions performed by the CVCS 1507.

The modules of the content validation and coding system (CVCS) 1507 comprise an application programming interface (API) integration module 1509a, a repository creation module 1509b, an electronic document input module 1509c, a crawler execution module 1509d, an analysis module 1509e, a content validation module 1509f, a code determination module 1509g, a map generation module 1509h, a coding engine 1509i, and a testing module 1509j. The API integration module 1509a integrates the CVCS 1507 with APIs of multiple search engines 1504 and/or multiple media platforms 1503. The API integration module 1509a implements API key integration for accessing the APIs of the search engines 1504 and the media platforms 1503. An example of a code snippet of the API integration module 1509a executed by the processor 1508 of the CVCS 1507 for integrating the CVCS 1507 with the APIs of the search engines 1504 and the media platforms 1503 is provided below:

```
<script type="application/ld+json">
{ "@context" : "http://schema.org",
    "@type" : "Organization",
    "legalName" : "Elite SEM",
    "url" : "http://elitesem.com/",
    "contactPoint" : [{
        "@type" : "ContactPoint",
        "telephone" : "+1-646-350-2789",
        "contactType" : "customer service"
    }]
    "logo" : "http://elitesem.com/wp-content/uploads/2014/03/Elite_SEM_Logo_2014.png",
    "sameAs" : [ "http://www.facebook.com/EliteSEM",
        "http://www.twitter.com/elitesem",
        "http://plus.google.com/+Elitesem",
        "https://www.youtube.com/user/EliteSEMInc",
        "http://www.linkedin.com/company/elite-sem",
        "https://www.wikidata.org/wiki/Q20736641"]
}
</script>
<script type="application/ld+json">
{
    "@context" : "http://schema.org",
    "@type" : "WebSite",
    "name" : "Elite SEM",
    "url" : "http://elitesem.com/",
    "potentialAction" : {
        "@type" : "SearchAction",
        "target" : "http://elitesem.com/?s={search_term}",
        "query-input" : "required name=search_term"
    }
}
</script>
<ol itemscope itemtype="http://schema.org/BreadcrumbList">
    <li itemprop="itemListElement" itemscope
            itemtype="http://schema.org/ListItem">
        <a itemprop="item" href="https://example.com/">
            <span itemprop="name">Home</span></a>
        <meta itemprop="position" content="1" />
    </li>
    >
    <li itemprop="itemListElement" itemscope
            itemtype="http://schema.org/ListItem">
        <a itemprop="item" href="https://example.com/activewear/">
            <span itemprop="name">Activewear</span></a>
        <meta itemprop="position" content="2" />
    </li>
    >
    <li itemprop="itemListElement" itemscope
            itemtype="http://schema.org/ListItem">
        <a itemprop="item" href="https://example.com/activewear/tops/">
            <span itemprop="name">Tops</span></a>
        <meta itemprop="position" content="3" />
    </li>
</ol>
```

An example of a code snippet of the application programming interface (API) integration module 1509a executed by the processor 1508 of the content validation and coding system (CVCS) 1507 for integrating the CVCS 1507 with APIs of media platforms 1503, for example, Facebook® of Facebook, Inc., and Twitter® of Twitter, Inc., is provided below:

```
Facebook:
<!-- Load Facebook SDK for JavaScript -->
<div id="fb-root"></div>
<script>(function(d, s, id) {
var js, fjs = d.getElementsByTagName(s)[0];
if (d.getElementById(id)) return;
js = d.createElement(s); js.id = id;
js.src = "https://connect.facebook.net/en_US/sdk.js#xfbml=1";
fjs.parentNode.insertBefore(js, fjs);
}(document, 'script', 'facebook-jssdk'));</script>
<div id="fb-root"></div>
<script>(function(d, s, id) {
var js, fjs = d.getElementsByTagName(s)[0];
if (d.getElementById(id)) return;
```

-continued

```
js = d.createElement(s); js.id = id;
js.src =
"https://connect.facebook.net/en_US/sdk.js#xfbml=1&version=v2.6";
fjs.parentNode.insertBefore(js, fjs);
}(document, 'script', 'facebook-jssdk'));</script>
<!-- Your embedded comments code -->
<div class="fb-comment-embed"
    data-
href="https://www.facebook.com/zuck/posts/
10102735452532991?comment_id=1070233703036185"
    data-width="500"></div>
Twitter:
<script>window.twttr = (function(d, s, id) {
    var js, fjs = d.getElementsByTagName(s)[0],
    t = window.twttr || { };
    if (d.getElementById(id)) return t;
    js = d.createElement(s);
    js.id = id;
    js.src = "https://platform.twitter.com/widgets.js";
    fjs.parentNode.insertBefore(js, fjs);
    t._e = [ ];
```

```
t.ready = function(f) {
  t._e.push(f);
};
  return t;
}(document, "script", "twitter-wjs"));</script>
twttr.widgets.createTweet(
  '20',
  document.getElementById('container'),
  {
    theme: 'dark'
  }
);
```

The repository creation module 1509b creates a categorized repository of schema codes using one or more collaborative schema data sources as disclosed in the detailed description of FIG. 1. The electronic document input module 1509c receives an electronic document 1501 to be coded with the schema codes in the created categorized repository from the input data source 1506, for example, a server that hosts the electronic document 1501. The electronic document input module 1509c renders the received electronic document 1501 to the web crawler 1502. The crawler execution module 1509d executes the web crawler 1502 for crawling and indexing the received electronic document 1501 and content related to the received electronic document 1501 from one or more of the search engines 1504 and/or one or more of the media platforms 1503 via the application programming interfaces (APIs). The web crawler 1502 browses the world wide web for content and also crawls the search engines 1504 and the media platforms 1503 and combines the content onto one platform to provide the content validation and coding system (CVCS) 1507 with the full indexing capability of the combined content. An example of a code snippet of the crawler execution module 1509d executed by the processor 1508 of the CVCS 1507 for executing the web crawler 1502 for crawling and indexing the received electronic document 1501 and content related to the received electronic document 1501 from the search engines 1504 and/or the media platforms 1503 via the APIs is provided below:

```
function collectInternalLinks($) {
var allRelativeLinks = [ ];
var allAbsoluteLinks = [ ];
var relativeLinks = $("a[href^='/']");
relativeLinks.each(function( )
{
allRelativeLinks.push($(this).attr('href'));
});
var absoluteLinks = $("a[href^='http']");
absoluteLinks.each(function( )
{
allAbsoluteLinks.push($(this).attr('href'));
});
console.log("Found " + allRelativeLinks.length + " relative links");
  console.log("Found " + allAbsoluteLinks.length + " absolute links");
}
var request = require('request');
var cheerio = require('cheerio');
var URL = require('url-parse');
var START_URL = "http://www.sample.com";
var SEARCH_WORD = "stemming";
var MAX_PAGES_TO_VISIT = 10;
var pagesVisited = { };
var numPagesVisited = 0;
var pagesToVisit = [ ];
var url = new URL(START_URL);
var baseUrl = url.protocol + "//" + url.hostname;
pagesToVisit.push(START_URL);
crawl( );
```

```
function crawl( ) {
if(numPagesVisited >= MAX_PAGES_TO_VISIT)
{
console.log("Reached max limit of number of pages to visit.");
return;
}
var nextPage = pagesToVisit.pop( );
if (nextPage in pagesVisited) {
// We've already visited this page, so repeat the crawl
crawl( );
}
else
{
// New page we haven't visited
visitPage(nextPage, crawl);
}
}
function visitPage(url, callback) {
  // Add page to our set
pagesVisited[url] = true;
  numPagesVisited++;
  // Make the request
console.log("Visiting page " + url);
  request(url, function(error, response, body) {
// Check status code (200 is HTTP OK)
console.log("Status code: " + response.statusCode);
if(response.statusCode !== 200) {
callback( );
return;
}
// Parse the document body
var $ = cheerio.load(body);
var isWordFound = searchForWord($, SEARCH_WORD);
  if(isWordFound)
{
console.log('Word ' + SEARCH_WORD + ' found at page ' + url);
}
else
{
collectInternalLinks($);
// In this short program, our callback is just calling crawl( )
callback( );
}
});
}
function searchForWord($, word) {
    var bodyText = $('html > body').text( ).toLowerCase( );
    return(bodyText.indexOf(word.toLowerCase( )) !== -1);
}
function collectInternalLinks($) {
var relativeLinks = $("a[href^='/']");
console.log("Found " + relativeLinks.length + " relative links on page");
relativeLinks.each(function( ) {
pagesToVisit.push(baseUrl + $(this).attr('href'));
});
}
```

The analysis module 1509e analyzes the crawled and indexed electronic document and content to identify the structured data and the content in the received electronic document 1501. In an embodiment, the analysis module 1509e identifies and fixes errors in the structured data in the received electronic document 1501 automatically. An example of a code snippet of the analysis module 1509e executed by the processor 1508 of the content validation and coding system (CVCS) 1507 for identifying structured data is provided below:

```
<div itemscope itemtype="http://schema.org/NewsArticle">
  <meta itemscope itemprop="mainEntityOfPage"
itemType="https://schema.org/WebPage" itemid="https://google.com/article"/>
  <h2 itemprop="headline">Article headline</h2>
  <h3 itemprop="author" itemscope itemtype="https://schema.org/Person">
  By <span itemprop="name">John Doe</span>
  </h3>
  <span itemprop="description">A most wonderful article</span>
  <div itemprop="image" itemscope itemtype="https://schema.org/ImageObject">
  <img src="https://google.com/thumbnail1.jpg"/>
  <meta itemprop="url" content="https://google.com/thumbnail1.jpg">
  <meta itemprop="width" content="800">
  <meta itemprop="height" content="800">
  </div>
  <div itemprop="publisher" itemscope itemtype="https://schema.org/Organization">
  <div itemprop="logo" itemscope itemtype="https://schema.org/ImageObject">
    <img src="https://google.com/logo.jpg"/>
    <meta itemprop="url" content="https://google.com/logo.jpg">
    <meta itemprop="width" content="600">
    <meta itemprop="height" content="60">
  </div>
<meta itemprop="name" content="Google">
  </div>
  <meta itemprop="datePublished" content="2015-02-05T08:00:00+08:00"/>
  <meta itemprop="dateModified" content="2015-02-05T09:20:00+08:00"/>
</div>
Json:
<script type="application/ld+json">
{
  "@context": "http://schema.org",
  "@type": "NewsArticle",
  "mainEntityOfPage": {
  "@type": "WebPage",
  "@id": "https://google.com/article"
  },
  "headline": "Article headline",
  "image": [
  "https://example.com/photos/1x1/photo.jpg",
  "https://example.com/photos/4x3/photo.jpg",
  "https://example.com/photos/16x9/photo.jpg"
  ],
  "datePublished": "2015-02-05T08:00:00+08:00",
  "dateModified": "2015-02-05T09:20:00+08:00",
  "author": {
  "@type": "Person",
  "name": "John Doe"
  },
  "publisher": {
  "@type": "Organization",
  "name": "Google",
  "logo": {
    "@type": "ImageObject",
    "url": "https://google.com/logo.jpg"
  }
  },
  "description": "A most wonderful article"
}
</script>
```

The content validation module 1509f validates the identified content based on analytic criteria as disclosed in the detailed description of FIG. 1. An example of a code snippet of the content validation module 1509f executed by the processor 1508 of the content validation and coding system (CVCS) 1507 for validating the identified content based on the analytic criteria is provided below:

```
_gaq.push(['_setCustomVar',
    1,  // This custom var is set to slot #1. Required parameter.
    'Items Removed',  // The name acts as a kind of category for the user activity. Required parameter.
    'Yes',  // This value of the custom variable. Required parameter.
    2 //  Sets the scope to session-level. Optional parameter.
]);

_gaq.push(['_trackEvent',
    'Shopping', // category of activity
    'Item Removal', // Action
]);
```

An example of an async code snippet of the content validation module 1509f executed by the processor 1508 of the content validation and coding system (CVCS) 1507 for validating the identified content based on analytic criteria is provided below:

```
gaq.push(['_setCustomVar',
    1,  // This custom var is set to slot #1. Required parameter.
    'Section',  // The top-level name for your online content categories. Required parameter.
```

```
    'Life & Style', // Sets the value of "Section" to "Life & Style" for
    this particular aricle.
Required parameter.
    3   // Sets the scope to page-level. Optional parameter.
]);
```

Another example of a code snippet of the content validation module 1509f executed by the processor 1508 of the content validation and coding system (CVCS) 1507 for validating the identified content based on analytic criteria is provided below:

```
<project xmlns="http://maven.apache.org/POM/4.0.0"
    xmlns:xsi="http://www.w3.org/2001/XMLSchema-instance"
    xsi:schemaLocation="http://maven.apache.org/POM/4.0.0
    http://maven.apache.org/maven-v4_0_0.xsd">
    <modelVersion>4.0.0</modelVersion>
    <groupId>org.xeustechnologies.treeing</groupId>
    <artifactId>treeing</artifactId>
    <name>Crawl, index and search</name>
    <version>0.0.1-SNAPSHOT</version>
    <description>Crawl, index and search web content</description>
    <dependencies>
        <dependency>
            <groupId>org.apache.lucene</groupId>
            <artifactId>lucene-core</artifactId>
            <version>3.0.0</version>
        </dependency>
        <dependency>
            <groupId>xerces</groupId>
            <artifactId>xerces</artifactId>
            <version>2.4.0</version>
        </dependency>
        <dependency>
            <groupId>nekohtml</groupId>
            <artifactId>nekohtml</artifactId>
            <version>1.9.6.2</version>
        </dependency>
        <dependency>
            <groupId>junit</groupId>
            <artifactId>junit</artifactId>
            <version>4.8.2</version>
            <scope>test</scope>
        </dependency>
        <dependency>
            <groupId>org.xeustechnologies</groupId>
            <artifactId>esl4j-core</artifactId>
            <version>1.0</version>
        </dependency>
    </dependencies>
</project>
```

The code determination module 1509g determines optimal schema codes from the created categorized repository and/or dynamically generated supplementary schema codes for application to the validated content as disclosed in the detailed description of FIG. 1. In an embodiment, the code determination module 1509g facilitates dynamic generation of the supplementary schema codes using a plug-in tool. An example of a code snippet of the code determination module 1509g executed by the processor 1508 of the content validation and coding system (CVCS) 1507 for determining optimal schema codes for application to the validated content is provided below:

```
function getAccountByName( ) {
    var accountName = 'INSERT_ACCOUNT_NAME_HERE';
    var accounts = Analytics.Management.Accounts.list( );
    for (var i = 0; i < accounts.items.length; i++) {
        if (accountName == accounts.items[i].name) {
            Logger.log('Account ID: %s, Name = %s', accounts.items[i].id,
                accounts.items[i].name);
        }
    }
    return;
}
function getSnippetStats( ) {
    var campaignIterator = AdWordsApp.campaigns( )
        .withCondition('Name =
        "INSERT_CAMPAIGN_NAME_HERE"')
        .get( );
    if (campaignIterator.hasNext( )) {
        var campaign = campaignIterator.next( );
        // Retrieve the campaign's snippets. Retrieving an ad group's
        // snippets is similar.
        var snippetsIterator = campaign.extensions( ).snippets( ).get( );
        while (snippetsIterator.hasNext( )) {
            var snippet = snippetsIterator.next( );
            // You can also request reports for pre-defined date ranges. See
            // https://developers.google.com/adwords/api/docs/guides/awql,
            // DateRangeLiteral section for possible values.
            var stats = snippet.getStatsFor('LAST_MONTH');
            Logger.log(snippet.getHeader( ) + ', ' + stats.getClicks( ) + ', ' +
                stats.getImpressions( ));
        }
    }
}
```

The map generation module 1509h generates a structured data code map of the determined optimal schema codes to be coded in the received electronic document 1501. An example of a code snippet of the map generation module 1509h executed by the processor 1508 of the content validation and coding system (CVCS) 1507 for generating a structured data code map of the determined optimal schema codes to be coded in the received electronic document 1501 is provided below:

```
<script type="application/ld+json">
{
    "@context": "http://schema.org",
    "@type": "Organization",
    "url": "http://www.example.com",
    "name": "Unlimited Ball Bearings Corp.",
    "contactPoint": {
        "@type": "ContactPoint",
        "telephone": "+1-401-555-1212",
        "contactType": "Customer service"
    }
}
</script>
<script type="application/ld+json">
{
    "@context": "http://schema.org/",
    "@type": "Recipe",
    "name": "Grandma's Holiday Apple Pie",
    "author": "Elaine Smith",
    "image": "http://images.edge-generalmills.com/56459281-6fe6-4d9d-984f-385c9488d824.jpg",
    "description": "A classic apple pie.",
    "aggregateRating": {
        "@type": "AggregateRating",
        "ratingValue": "4",
        "reviewCount": "276",
        "bestRating": "5",
        "worstRating": "1"
    },
    "prepTime": "PT30M",
    "totalTime": "PT1H",
    "recipeYield": "8",
```

```
"nutrition": {
    "@type": "NutritionInformation",
    "servingSize": "1 medium slice",
    "calories": "230 calories",
    "fatContent": "1 g",
    "carbohydrateContent": "43 g",
},
"recipeIngredient": [
    "1 box refrigerated pie crusts, softened as directed on box",
    "6 cups thinly sliced, peeled apples (6 medium)",
    "..."
],
"recipeInstructions": [
    "1...",
    "2..."
    ]
}
</script>
```

The map generation module 1509*h* also dynamically generates one or more sitemaps from the generated structured data code map. The map generation module 1509*h* renders the dynamically generated sitemaps to external intelligence systems for allowing optimal recognition and indexing of the received electronic document 1501. An example of a sitemap dynamically generated by execution of the map generation module 1509*h* by the processor 1508 of the content validation and coding system (CVCS) 1507 is provided below:

```
<?xml version="1.0" encoding="UTF-8" ?>
<urlset xmlns="http://www.sitemaps.org/schemas/sitemap/0.9"
xmlns:xsi="http://www.w3.org/2001/XMLSchema-instance"
xsi:schemaLocation="http://www.sitemaps.org/schemas/sitemap/0.9
http://www.sitemaps.org/schemas/sitemap/0.9/sitemap.xsd">
<!-- created with Free Online Sitemap Generator www.xml-sitemaps.com
-->
<url>
<loc>http://www.metasensemarketing.com/</loc>
    <lastmod>1970-01-01T00:00:00+00:00</lastmod>
<changefreq>daily</changefreq>
    </url>
<url>
<loc>http://www.metasensemarketing.com/why-metasense.html</loc>
    <lastmod>1970-01-01T00:00:00+00:00</lastmod>
    <changefreq>daily</changefreq>
</url>
    <url>
    <loc>http://www.metasensemarketing.com/solutions.html</loc>
    <lastmod>1970-01-01T00:00:00+00:00</lastmod>
    <changefreq>daily</changefreq>
    </url>
    <url>
    <loc>http://www.metasensemarketing.com/resources.html</loc>
    <lastmod>1970-01-01T00:00:00+00:00</lastmod>
    <changefreq>daily</changefreq>
    </url>
- <url>
    <loc>http://www.metasensemarketing.com/people-helped.html</loc>
    <lastmod>1970-01-01T00:00:00+00:00</lastmod>
    <changefreq>daily</changefreq>
    </url>
- <url>
    <loc>http://www.metasensemarketing.com/contact.html</loc>
    <lastmod>1970-01-01T00:00:00+00:00</lastmod>
    <changefreq>daily</changefreq>
    </url>
- <url>
    <loc>http://www.metasensemarketing.com/seo-smm-sem-ppc-promotion.html</loc>
    <lastmod>1970-01-01T00:00:00+00:00</lastmod>
    <changefreq>daily</changefreq>
    </url>
- <url>
    <loc>http://www.metasensemarketing.com/e-commerce-development.html</loc>
    <lastmod>1970-01-01T00:00:00+00:00</lastmod>
    <changefreq>daily</changefreq>
    </url>
- <url>
    <loc>http://www.metasensemarketing.com/care-plan.html</loc>
    <lastmod>1970-01-01T00:00:00+00:00</lastmod>
    <changefreq>daily</changefreq>
    </url>
- <url>
    <loc>http://www.metasensemarketing.com/xtreme-listing.html</loc>
    <lastmod>1970-01-01T00:00:00+00:00</lastmod>
    <changefreq>daily</changefreq>
    </url>
```

```
- <url>
   <loc>http://www.metasensemarketing.com/responsive-web-design.html</loc>
   <lastmod>1970-01-01T00:00:00+00:00</lastmod>
   <changefreq>daily</changefreq>
  </url>
- <url>
   <loc>http://www.metasensemarketing.com/mobile-apps.html</loc>
   <lastmod>1970-01-01T00:00:00+00:00</lastmod>
   <changefreq>daily</changefreq>
  </url>
- <url>
   <loc>http://www.metasensemarketing.com/videos-production.html</loc>
   <lastmod>1970-01-01T00:00:00+00:00</lastmod>
   <changefreq>daily</changefreq>
  </url>
- <url>
   <loc>http://www.metasensemarketing.com/creative-design.html</loc>
   <lastmod>1970-01-01T00:00:00+00:00</lastmod>
   <changefreq>daily</changefreq>
  </url>
- <url>
   <loc>http://www.metasensemarketing.com/white-paper.html</loc>
   <lastmod>1970-01-01T00:00:00+00:00</lastmod>
   <changefreq>daily</changefreq>
  </url>
- <url>
   <loc>http://www.metasensemarketing.com/terms-conditions.html</loc>
   <lastmod>1970-01-01T00:00:00+00:00</lastmod>
   <changefreq>daily</changefreq>
  </url>
- <url>
   <loc>http://www.metasensemarketing.com/privacy-policy.html</loc>
   <lastmod>1970-01-01T00:00:00+00:00</lastmod>
   <changefreq>daily</changefreq>
  </url>
- <url>
   <loc>http://www.metasensemarketing.com/awards-recognitions.html</loc>
   <lastmod>1970-01-01T00:00:00+00:00</lastmod>
   <changefreq>daily</changefreq>
  </url>
- <url>
   <loc>http://www.metasensemarketing.com/testimonials.html</loc>
   <lastmod>1970-01-01T00:00:00+00:00</lastmod>
   <changefreq>daily</changefreq>
  </url>
 </urlset>
```

The coding engine 1509i codes the validated content with the determined optimal schema codes within the identified structured data of the received electronic document 1501 using the generated structured data code map for search engine optimization as disclosed in the detailed description of FIG. 1. An example of a code snippet of the coding engine 1509i executed by the processor 1508 of the content validation and coding system (CVCS) 1507 for coding the validated content with the determined optimal schema codes within the identified structured data of the received electronic document 1501 using the generated structured data code map for search engine optimization is provided below:

```
$string = preg_replace("/[^a-zA-Z0-9]/", "", $string);
<plug-in className="org.apache.struts.validator.ValidatorPlugIn">
    <set-property property="pathnames" value="/technology/WEB-INF/
    validator-rules.xml, /WEB-INF/validation.xml"/>
</plug-in>
package com.pcs.necronomicon
import org.apache.struts.validator.ValidatorForm;
public class LogonForm extends ValidatorForm {
    private String username;
    private String password;
    public String getUsername( ) {
        return username;
    }
```

-continued

```
    public void setUsername(String username) {
        this.username = username;
    }
    public String getPassword( ) {
        return password;
    }
    public void setPassword(String password) {
        this.password = password;
    }
}
```

The coding engine 1509i codes the validated content with the determined optimal schema codes within the identified structured data of the received electronic document 1501 in a direct mode or an automated mode using a plugin tool. The testing module 1509j is in communication with the coding engine 1509i for testing the electronic document 1501 with the coded content and fixing the errors in the electronic document 1501.

In an embodiment, the content validation and coding system (CVCS) 1507 implements a blockchain 1518, that is, a distributed database that maintains a continuously growing list of records called blocks used for performing multiple functions in the validation and coding of content of the electronic document 1501. In an embodiment, the CVCS

1507 provides an application programming interface (API) for block chain development to provide added security during coding of the electronic document 1501 for search engine optimization. The blockchain 1518 creates an ordered, back-linked list of records referred as "blocks", which are linked and secured using cryptography. A mathematical notation referred as a "hash" identifies each block and links back to the previous block. The sequences of hashes linking each block create a chain where any changes made to a block will change the hash of that block, which is recomputed and stored in the next block. This changes the hash of the next block, which is also recomputed and so on until the end of the chain. The CVCS 1507 implements the blockchain 1518 in a distributed network. The CVCS 1507 implements the blockchain 1518 to provide a secure interface between a first website and a second website to allow the CVCS 1507 to implement coding using the determined optimal schema codes. The blocks in the blockchain 1518 implemented by the CVCS 1507 are hypertext markup language (HTML) coding updates that are transferred from the CVCS 1507 to the second website. The blockchain 1518 adds security in validating and coding the received electronic document 1501. The CVCS 1507 uses the blockchain 1518 to secure a data transaction between the CVCS 1507 and a recipient website, that is, the received electronic document 1501.

In an embodiment, the content validation and coding system (CVCS) 1507 communicates with the block chain 1518 comprising multiple nodes 1518*a*, 1518*b*, and 1518*c* via the network 1505. In this embodiment, the CVCS 1507 further comprises a backlink module 1509*k*, in communication with a distributed database or the blockchain 1518, for rendering backlinks to the content of the electronic document 1501 from the search engines 1504 and the media platforms 1503 over the network 1505 via one or more application programming interfaces.

In another embodiment, the content validation and coding system (CVCS) 1507 comprises a graphic database 1509I for linking and relating the content of the received electronic document 1501 with content related to the received electronic document 1501 from all the search engines 1504 and media platforms 1503 combined. The graphic database 1509I is a database that uses graph structures for semantic queries with nodes, edges, and properties to represent and store data. The graphic database 1509I implements a graph or an edge or a relationship that directly relates data items stored in a data store. The relationships allow data in the data store to be linked together directly, and in many cases retrieved with a single operation. In an embodiment, the CVCS 1507 utilizes the graphic database 1509*l* for performing data visualization and rendering a visual map of the identified structured data to contextually correlate syntax and meaning of the identified structured data. The modules 1509*a*, 1509*b*, 1509*c*, 1509*d*, 1509*e*, 1509*f*, 1509*g*, 1509*h*, 1509*i*, 1509*j*, 1509*k*, etc., of the CVCS 1507 communicate with the graphic database 1509I for linking and relating the crawled electronic document and content to the determined optimal schema codes.

In an embodiment, the graphic database 1509*l* of the content validation and coding system (CVCS) 1507 can be any storage area or medium that can be used for storing data and files. In an embodiment, the graphic database 1509I can be, for example, any of a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the graphic database 1509I can also be a location on a file system of the CVCS 1507. In another embodiment, the graphic database 1509I can be an external database remotely accessed by the CVCS 1507 respectively, via the network 1505. In another embodiment, the graphic database 1509I is configured as a cloud based database implemented in a cloud computing environment, where computing resources are delivered as a service over the network 1505.

Computer applications and programs are used for operating the content validation and coding system (CVCS) 1507. The programs are loaded onto the fixed media drive 1515 and into the memory unit 1509 of the CVCS 1507 via the removable media drive 1516. In an embodiment, the computer applications and programs are loaded into the memory unit 1509 directly via the network 1505. The processor 1508 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google Inc., the Windows Phone® operating system of Microsoft Corporation, the BlackBerry® operating system of BlackBerry Limited, the iOS operating system of Apple Inc., the Symbian™ operating system of Symbian Foundation Limited, etc. The CVCS 1507 employs the operating system for performing multiple tasks. The operating system is responsible for management and coordination of activities and sharing of resources of the CVCS 1507. The operating system further manages security of the CVCS 1507, peripheral devices connected to the CVCS 1507, and network connections. The operating system employed in the CVCS 1507 recognizes, for example, inputs provided by a user of the CVCS 1507, using one of the input devices 1514, the output devices 1517, files, and directories stored locally on the fixed media drive 1515. The operating system in the CVCS 1507 executes different programs using the processor 1508. The processor 1508 and the operating system together define a computer platform for which application programs in high level programming languages are written.

The processor 1508 retrieves instructions defined by the application programming interface (API) integration module 1509*a*, the repository creation module 1509*b*, the electronic document input module 1509*c*, the crawler execution module 1509*d*, the analysis module 1509*e*, the content validation module 1509*f*, the code determination module 1509*g*, the map generation module 1509*h*, the coding engine 1509*i*, the testing module 1509*j*, and the backlink module 1509*k* of the content validation and coding system (CVCS) 1507, for performing respective functions disclosed above. The processor 1508 retrieves instructions for executing the modules, for example, 1509*a*, 1509*b*, 1509*c*, 1509*d*, 1509*e*, 1509*f*, 1509*g*, 1509*h*, 1509*i*, 1509*j*, 1509*k*, etc., of the CVCS 1507 from the memory unit 1509. A program counter determines the location of the instructions in the memory unit 1509. The program counter stores a number that identifies the current position in the program of each of the modules, for example, 1509*a*, 1509*b*, 1509*c*, 1509*d*, 1509*e*, 1509*f*, 1509*g*, 1509*h*, 1509*i*, 1509*j*, 1509*k*, etc., of the CVCS 1507. The instructions fetched by the processor 1508 from the memory unit 1509 after being processed are decoded. The instructions are stored in an instruction register in the processor 1508. After processing and decoding, the processor 1508 executes the instructions, thereby performing one or more processes defined by those instructions.

At the time of execution, the instructions stored in the instruction register are examined to determine the operations to be performed. The processor 1508 then performs the specified operations. The operations comprise arithmetic operations and logic operations. The operating system performs multiple routines for performing a number of tasks required to assign the input devices 1514, the output devices 1517, and the memory unit 1509 for execution of the modules, for example, 1509a, 1509b, 1509c, 1509d, 1509e, 1509f, 1509g, 1509h, 1509i, 1509j, 1509k, etc., of the content validation and coding system (CVCS) 1507. The tasks performed by the operating system comprise, for example, assigning memory to the modules, for example, 1509a, 1509b, 1509c, 1509d, 1509e, 1509f, 1509g, 1509h, 1509i, 1509j, 1509k, etc., of the CVCS 1507, and to data used by the CVCS 1507, moving data between the memory unit 1509 and disk units, and handling input/output operations. The operating system performs the tasks on request by the operations and after performing the tasks, the operating system transfers the execution control back to the processor 1508. The processor 1508 continues the execution to obtain one or more outputs. The outputs of the execution of the modules, for example, 1509a, 1509b, 1509c, 1509d, 1509e, 1509f, 1509g, 1509h, 1509i, 1509j, 1509k, etc., of the CVCS 1507 are displayed to a user of the CVCS 1507 on the display unit 1510 via the graphical user interface (GUI) 1510a and/or through the output devices 1517.

For purposes of illustration, the detailed description refers to the content validation and coding system (CVCS) 1507 being run locally as a single computer system; however the scope of the method and system 1500 disclosed herein is not limited to the CVCS 1507 being run locally as a single computer system via the operating system and the processor 1508, but may be extended to run remotely over the network 1505 by employing a web browser and a remote server, a mobile phone, or other electronic devices. In an embodiment, one or more portions of the CVCS 1507 are distributed across one or more computer systems (not shown) coupled to the network 1505.

The non-transitory computer readable storage medium disclosed herein stores computer program codes comprising instructions executable by at least one processor 1508 for validating and coding content of the electronic document 1501 for search engine optimization. The computer program codes comprise a first computer program code for integrating with application programming interfaces (APIs) of multiple search engines 1504 and multiple media platforms 1503; a second computer program code for creating a categorized repository of schema codes using one or more collaborative schema data sources; a third computer program code for receiving the electronic document 1501 to be coded with the schema codes in the created categorized repository from the input data source 1506; a fourth computer program code for executing the web crawler 1502 for crawling and indexing the received electronic document 1501 and content related to the received electronic document 1501 from one or more of the search engines 1504 and/or one or more of the media platforms 1503 via one or more of the APIs; a fifth computer program code for identifying structured data and content in the received electronic document 1501 by performing an analysis of the crawled and indexed electronic document and content; a sixth computer program code for validating the identified content based on analytic criteria; a seventh computer program code for determining optimal schema codes from the created categorized repository and/or the dynamically generated supplementary schema codes for application to the validated content; an eighth computer program code for generating a structured data code map of the determined optimal schema codes to be coded in the received electronic document 1501; a ninth computer program code for coding the validated content with the determined optimal schema codes within the identified structured data of the received electronic document 1501 using the generated structured data code map for search engine optimization.

In an embodiment, the eighth computer program code comprises a tenth computer program code for dynamically generating one or more sitemaps from the generated structured data code map and rendering the dynamically generated sitemaps to external intelligence systems for allowing optimal recognition and indexing of the received electronic document 1501. In another embodiment, the fifth computer program code comprises an eleventh computer program code for identifying and fixing errors in the structured data in the received electronic document 1501 automatically. In another embodiment, the computer program codes further comprise a twelfth computer program code for testing the electronic document 1501 with the coded content and fixing errors in the electronic document 1501.

The computer program codes further comprise one or more additional computer program codes for performing additional steps that may be required and contemplated for validating and coding content of an electronic document 1501 for search engine optimization. In an embodiment, a single piece of computer program code comprising computer executable instructions performs one or more steps of the method disclosed herein for validating and coding content of an electronic document 1501 for search engine optimization. The computer program codes comprising computer executable instructions are embodied on the non-transitory computer readable storage medium. The processor 1508 of the content validation and coding system (CVCS) 1507 retrieves these computer executable instructions and executes them. When the computer executable instructions are executed by the processor 1508, the computer executable instructions cause the processor 1508 to perform the steps of the method for validating and coding content of an electronic document 1501 for search engine optimization.

It will be readily apparent in different embodiments that the various methods, algorithms, and computer programs disclosed herein are implemented on non-transitory computer readable storage media appropriately programmed for computing devices. The non-transitory computer readable storage media participate in providing data, for example, instructions that are read by a computer, a processor or a similar device. In different embodiments, the "non-transitory computer readable storage media" also refer to a single medium or multiple media, for example, a centralized database, a distributed database, and/or associated caches and servers that store one or more sets of instructions that are read by a computer, a processor or a similar device. The "non-transitory computer readable storage media" also refer to any medium capable of storing or encoding a set of instructions for execution by a computer, a processor or a similar device and that causes a computer, a processor or a similar device to perform any one or more of the methods disclosed herein. Common forms of the non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C #, Java®, JavaScript®, Fortran, Ruby, Perl®, Python®, Visual Basic®, hypertext preprocessor (PHP), Microsoft® .NET, Objective-C®, Hadoop® of the Apache Software Foundation, the Solidity contract oriented programming language, Lisp, ArcGIS® of Environmental Systems Research Institute, Inc., etc. Other object-oriented, functional, scripting, and/or logical programming languages can also be used. In an embodiment, the computer program codes or software programs are stored on or in one or more mediums as object code. In another embodiment, various aspects of the method and the content validation and coding system (CVCS) 1507 disclosed herein are implemented in a non-programmed environment comprising documents created, for example, in a hypertext markup language (HTML), an extensible markup language (XML), or other format that render aspects of the graphical user interface (GUI) 1510*a* or perform other functions, when viewed in a visual area or a window of a browser program. In another embodiment, various aspects of the method and the CVCS 1507 disclosed herein are implemented as programmed elements, or non-programmed elements, or any suitable combination thereof.

Where databases are described such as the graphic database 1509I and the block chain 1518, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the content validation and coding system (CVCS) 1507, the databases are integrated to communicate with each other for enabling simultaneous updates of data linked across the databases, when there are any updates to the data in one of the databases.

The method and the content validation and coding system (CVCS) 1507 disclosed herein can be configured to work in a network environment comprising one or more computers that are in communication with one or more devices via the network 1505. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to the network 1505. Each of the computers and the devices executes an operating system, examples of which are disclosed above. While the operating system may differ depending on the type of computer, the operating system provides the appropriate communications protocols to establish communication links with the network 1505. Any number and type of machines may be in communication with the computers.

The method and the content validation and coding system (CVCS) 1507 disclosed herein are not limited to a particular computer system platform, processor, operating system, or network. In an embodiment, one or more aspects of the method and the CVCS 1507 disclosed herein are distributed among one or more computer systems, for example, servers configured to provide one or more services to one or more client computers, or to perform a complete task in a distributed system. For example, one or more aspects of the method and the CVCS 1507 disclosed herein are performed on a client-server system that comprises components distributed among one or more server systems that perform multiple functions according to various embodiments. These components comprise, for example, executable, intermediate, or interpreted code, which communicate over the network 1505 using a communication protocol. The method and the CVCS 1507 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the content validation and coding system (CVCS) 1507 disclosed herein. While the method and the CVCS 1507 have been described with reference to various embodiments, it is understood that the words, which have been used herein, are words of description and illustration, rather than words of limitation. Furthermore, although the method and the CVCS 1507 have been described herein with reference to particular means, materials, and embodiments, the method and the CVCS 1507 are not intended to be limited to the particulars disclosed herein; rather, the method and the CVCS 1507 extend to all functionally equivalent structures, methods and uses, such as are within the scope of the appended claims. While multiple embodiments are disclosed, it will be understood by those skilled in the art, having the benefit of the teachings of this specification, that the method and the CVCS 1507 disclosed herein are capable of modifications and other embodiments may be effected and changes may be made thereto, without departing from the scope and spirit of the method and the CVCS 1507 disclosed herein.

We claim:

1. A method for validating and coding content of an electronic document for search engine optimization, said method employing a content validation and coding system comprising at least one processor configured to execute computer program instructions for performing said method comprising:
   integrating said content validation and coding system with application programming interfaces of a plurality of search engines and a plurality of media platforms;
   creating a categorized repository of schema codes using one or more collaborative schema data sources by said content validation and coding system, said schema codes comprising structured data tags in a markup language code;
   receiving said electronic document to be coded with said schema codes in said created categorized repository from an input data source by said content validation and coding system;
   executing a web crawler for crawling and indexing said received electronic document and content related to said received electronic document from one of:
   one or more of said search engines, one or more of said media platforms, and any combination thereof, by said content validation and coding system via one or more of said application programming interfaces;
   identifying structured data and content in said received electronic document by said content validation and coding system by performing an analysis of said crawled and indexed electronic document and content;
   validating said identified content by said content validation and coding system based on analytic criteria;
   determining optimal schema codes from one or more of said created categorized repository and dynamically generated supplementary schema codes by said content validation and coding system for application to said validated content;
   generating a structured data code map of said determined optimal schema codes to be coded in said received electronic document by said content validation and coding system, said generated structured data code map defining an optimal placement of said determined optimal schema codes in said received electronic document; and
   coding said validated content with said determined optimal schema codes within said identified structured data of said received electronic document using said generated structured data code map by said content validation and coding system for said search engine optimization.

2. The method of claim 1, wherein said electronic document is one of a website, a webpage of said website, and an electronic mail.

3. The method of claim 1, further comprising dynamically generating one or more sitemaps from said generated structured data code map by said content validation and coding system and rendering said dynamically generated one or more sitemaps to external intelligence systems by said content validation and coding system for allowing optimal recognition and indexing of said received electronic document.

4. The method of claim 1, wherein said analysis of said crawled and indexed electronic document and content comprises identifying and fixing errors in said structured data in said received electronic document automatically by said content validation and coding system.

5. The method of claim 1, further comprising testing said electronic document with said coded content and fixing errors in said electronic document by said content validation and coding system.

6. The method of claim 1, wherein said supplementary schema codes are dynamically generated by said content validation and coding system using a plugin tool.

7. The method of claim 1, wherein said validated content is coded with said determined optimal schema codes within said identified structured data of said received electronic document by said content validation and coding system in one of a direct mode and an automated mode using a plugin tool.

8. A content validation and coding system for validating and coding content of an electronic document for search engine optimization, said content validation and coding system comprising:
   a non-transitory computer readable storage medium configured to store computer program instructions defined by modules of said content validation and coding system; and
   at least one processor communicatively coupled to said non-transitory computer readable storage medium, said at least one processor configured to execute said computer program instructions defined by said modules of said content validation and coding system, said modules comprising:
   an application programming interface integration module for integrating said content validation and coding system with application programming interfaces of a plurality of search engines and a plurality of media platforms;
   a repository creation module for creating a categorized repository of schema codes using one or more collaborative schema data sources, said schema codes comprising structured data tags in a markup language code;
   an electronic document input module for receiving said electronic document to be coded with said schema codes in said created categorized repository from an input data source;
   a crawler execution module for executing a web crawler for crawling and indexing said received electronic document and content related to said received electronic document from one of: one or more of said search engines, one or more of said media platforms, and any combination thereof, via one or more of said application programming interfaces;
   an analysis module for identifying structured data and content in said received electronic document by performing an analysis of said crawled and indexed electronic document and content;
   a content validation module for validating said identified content based on analytic criteria;
   a code determination module for determining optimal schema codes from one or more of said created categorized repository and dynamically generated supplementary schema codes for application to said validated content;
   a map generation module for generating a structured data code map of said determined optimal schema codes to be coded in said received electronic document, said generated structured data code map defining an optimal placement of said determined optimal schema codes in said received electronic document; and a coding engine for coding said validated content with said determined optimal schema codes within said identified structured data of said received electronic document using said generated structured data code map for said search engine optimization.

9. The content validation and coding system of claim 8, wherein said map generation module dynamically generates one or more sitemaps from said generated structured data code map and renders said dynamically generated one or more sitemaps to external intelligence systems for allowing optimal recognition and indexing of said received electronic document.

10. The content validation and coding system of claim 8, wherein said analysis module identifies and fixes errors in said structured data in said received electronic document automatically.

11. The content validation and coding system of claim 8, wherein said modules further comprise a testing module in communication with said coding engine for testing said electronic document with said coded content and fixing errors in said electronic document.

12. The content validation and coding system of claim 8, wherein said supplementary schema codes are dynamically generated using a plugin tool.

13. The content validation and coding system of claim 8, wherein said coding engine codes said validated content with said determined optimal schema codes within said identified structured data of said received electronic document in one of a direct mode and an automated mode using a plugin tool.

14. The content validation and coding system of claim 8, wherein said modules further comprise a backlink module, in communication with a distributed database, for rendering backlinks to said content of said electronic document from said search engines and said media platforms over a network via said one or more of said application programming interfaces.

15. The content validation and coding system of claim 8, wherein said modules further comprise a graphic database for linking and relating said crawled electronic document and content to said determined optimal schema codes.

16. The content validation and coding system of claim 8, wherein said electronic document is one of a website, a webpage of said website, and an electronic mail.

17. A non-transitory computer readable storage medium having embodied thereon, computer program codes comprising instructions executable by at least one processor for validating and coding content of an electronic document for search engine optimization, said computer program codes comprising:

a first computer program code for integrating with application programming interfaces of a plurality of search engines and a plurality of media platforms;

a second computer program code for creating a categorized repository of schema codes using one or more collaborative schema data sources, said schema codes comprising structured data tags in a markup language code;

a third computer program code for receiving said electronic document to be coded with said schema codes in said created categorized repository from an input data source, wherein said electronic document is one of a website, a webpage of said website, and an electronic mail;

a fourth computer program code for executing a web crawler for crawling and indexing said received electronic document and content related to said received electronic document from one of: one or more of said search engines, one or more of said media platforms, and any combination thereof, via one or more of said application programming interfaces;

a fifth computer program code for identifying structured data and content in said received electronic document by performing an analysis of said crawled and indexed electronic document and content;

a sixth computer program code for validating said identified content based on analytic criteria;

a seventh computer program code for determining optimal schema codes from one or more of said created categorized repository and dynamically generated supplementary schema codes for application to said validated content;

an eighth computer program code for generating a structured data code map of said determined optimal schema codes to be coded in said received electronic document, said generated structured data code map defining an optimal placement of said determined optimal schema codes in said received electronic document; and a ninth computer program code for coding said validated content with said determined optimal schema codes within said identified structured data of said received electronic document using said generated structured data code map for said search engine optimization.

18. The non-transitory computer readable storage medium of claim 17, wherein said eighth computer program code comprises a tenth computer program code for dynamically generating one or more sitemaps from said generated structured data code map and rendering said dynamically generated one or more sitemaps to external intelligence systems for allowing optimal recognition and indexing of said received electronic document.

19. The non-transitory computer readable storage medium of claim 17, wherein said fifth computer program code comprises an eleventh computer program code for identifying and fixing errors in said structured data in said received electronic document automatically.

20. The non-transitory computer readable storage medium of claim 17, wherein said computer program codes further comprise a twelfth computer program code for testing said electronic document with said coded content and fixing errors in said electronic document.

* * * * *